United States Patent [19]
Folsom

[11] Patent Number: 5,423,183
[45] Date of Patent: Jun. 13, 1995

[54] HYDRAULIC MACHINE WITH WEDGE-SHAPED SWASHPLATE

[75] Inventor: Lawrence R. Folsom, Decatur, Ga.

[73] Assignee: Advanced Power Technology, Inc.

[21] Appl. No.: 93,192

[22] Filed: Jul. 13, 1993

Related U.S. Application Data

[63] Continuation-in-part of Ser. No. 640,645, Jan. 14, 1991, abandoned.

[51] Int. Cl.$^6$ .................... F16D 31/02; F01B 13/04
[52] U.S. Cl. ........................ 60/492; 60/413; 60/488; 60/491; 92/12.2; 92/71
[58] Field of Search ........... 60/484, 485, 487, 488, 60/490, 491, 492, 413; 91/499, 500, 502, 505; 92/12.2, 71

[56] References Cited

U.S. PATENT DOCUMENTS

| | | | |
|---|---|---|---|
| 1,648,000 | 11/1927 | Lee | 91/505 X |
| 2,832,198 | 4/1958 | Pichon | 60/492 |
| 3,204,411 | 9/1965 | Stockton | 60/492 |
| 3,291,068 | 12/1966 | Wiggermann | 91/505 X |
| 3,601,981 | 8/1971 | Ifield | 60/488 X |
| 3,602,105 | 8/1971 | Slusher | 91/505 X |
| 3,654,761 | 4/1972 | Eickmann | 60/488 |
| 3,740,954 | 6/1973 | Young | 60/489 |
| 4,493,189 | 1/1985 | Slater | 60/492 X |
| 4,495,768 | 1/1985 | Valavaara | 60/488 X |
| 4,901,529 | 2/1990 | Iino et al. | 60/487 X |

*Primary Examiner*—Edward K. Look
*Assistant Examiner*—John Ryznic
*Attorney, Agent, or Firm*—J. Michael Neary

[57] ABSTRACT

A continuously variable transmission includes a pump (258) driven by an input shaft (256) against a wedge-shaped swashplate (260). Hydraulic fluid pressurized in the pump flows through ports (402) in a pump cylinder block (422) into kidney-shaped slots (406) in the swashplate (260), and from there flows into and pressurizes a series of cylinders (394) in a motor cylinder block (366). The pump and motor exert first and second components of torque on a swashplate (260) in the rotational direction on the input shaft (256), and the hydraulic system pressure in the swashplate slots exerts a third component of torque in the same direction on the swashplate (260). The third torque component is a product of the hydraulic system pressure and the differential area of the two ends of the high pressure slot (406P) at the narrow and thick sides of the wedge-shaped swashplate (260). The swashplate (260) drives an output shaft (266) through an output sleeve (264) pinned to the outside peripheral edge (416) of the swashplate (260). The input/output ratio of the transmission is controlled by controlling the tilt angle of the swashplate (260) with a control sleeve (268), coupled at one end to the swashplate (260) through a coupling mechanism (267) and coupled at the other end through a bearing (528) to an axially movable control cylinder (270). The axial position of the control cylinder (270) is hydraulically controlled by a follower valve system (269) which moves the control cylinder (270) to positions uniquely corresponding to positions of a manually or automatically positioned control rod (636).

43 Claims, 32 Drawing Sheets

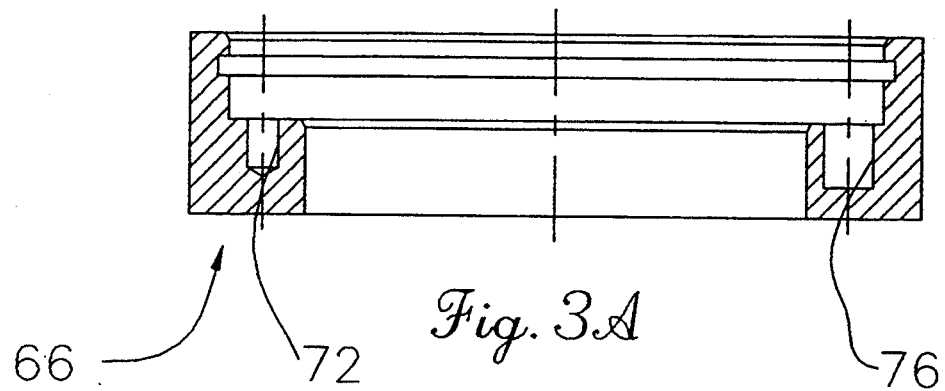
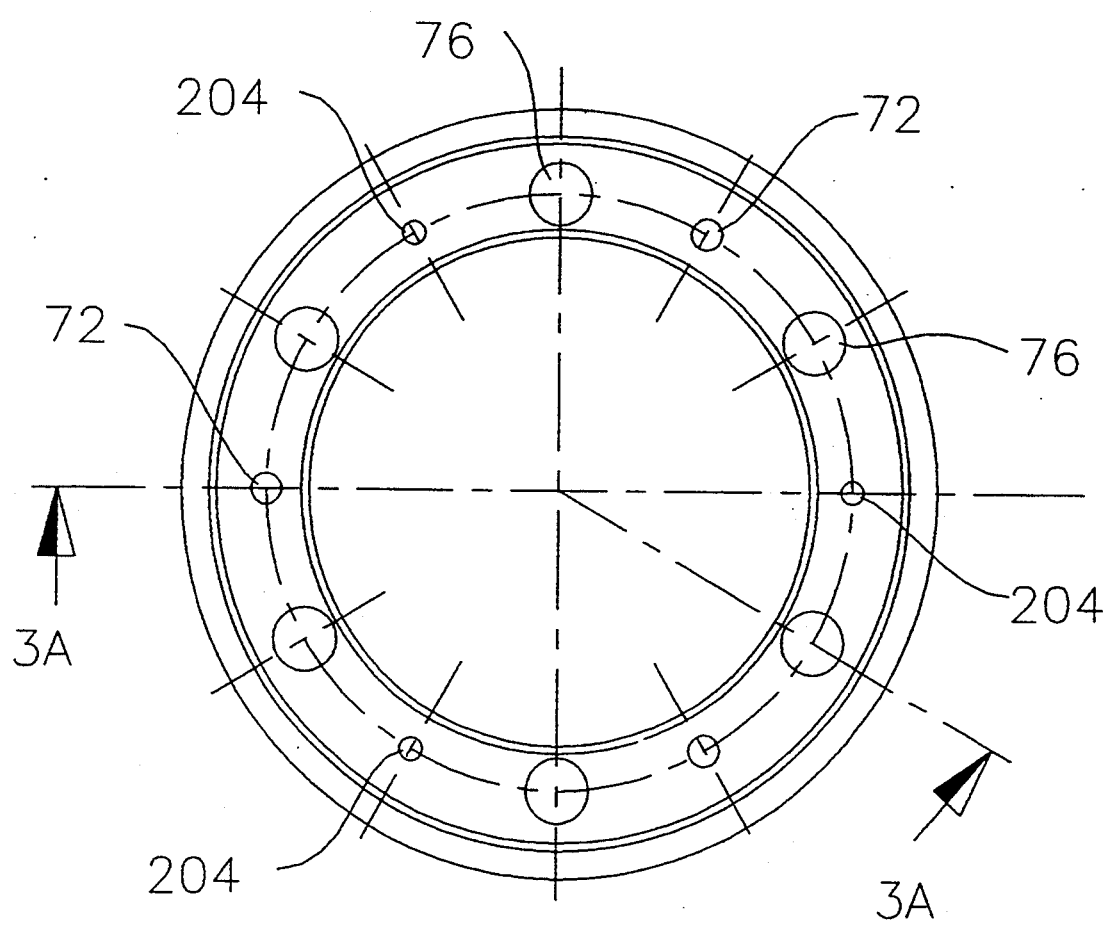

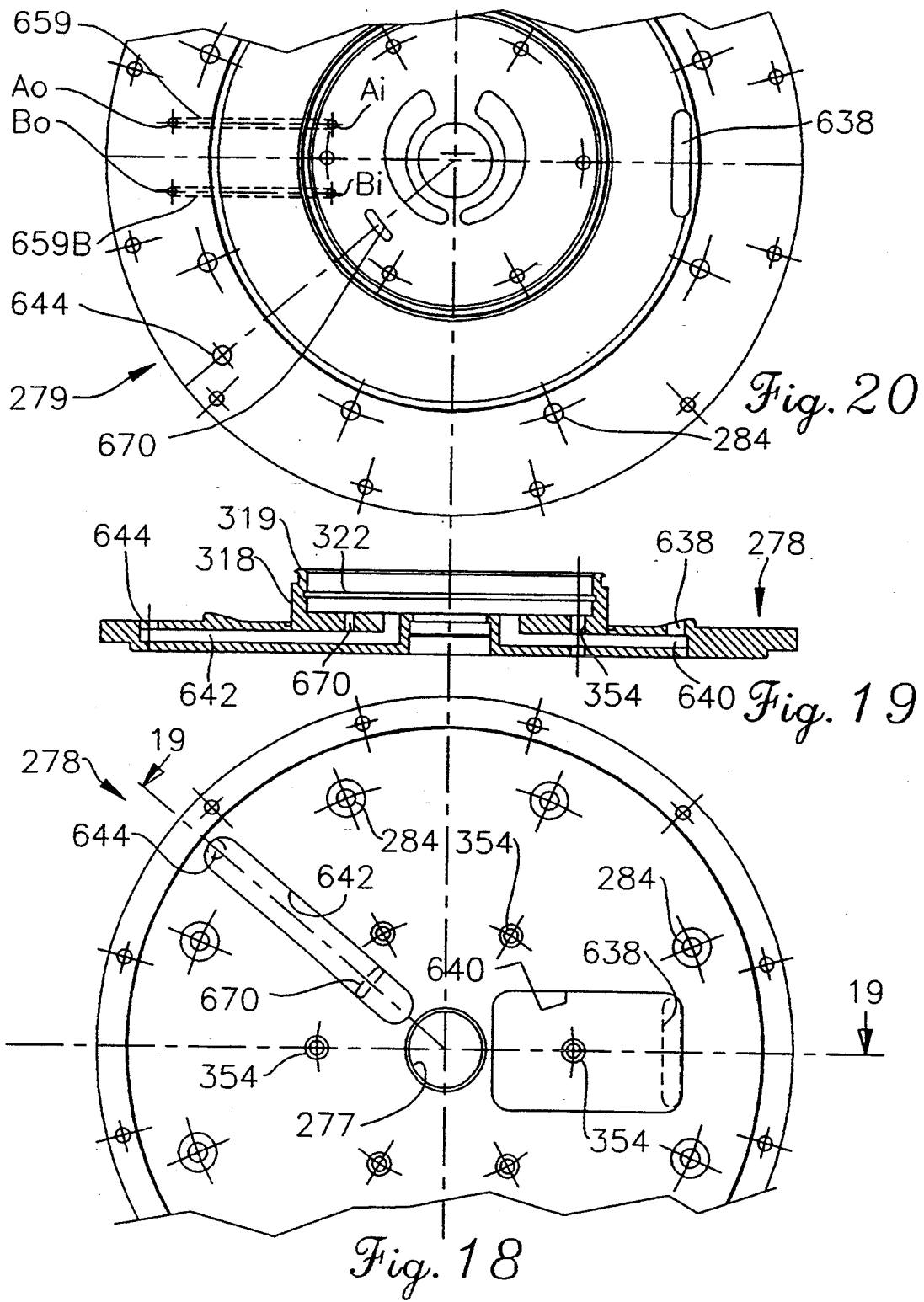

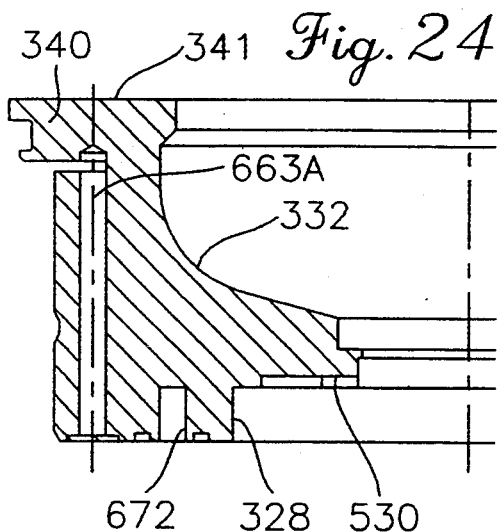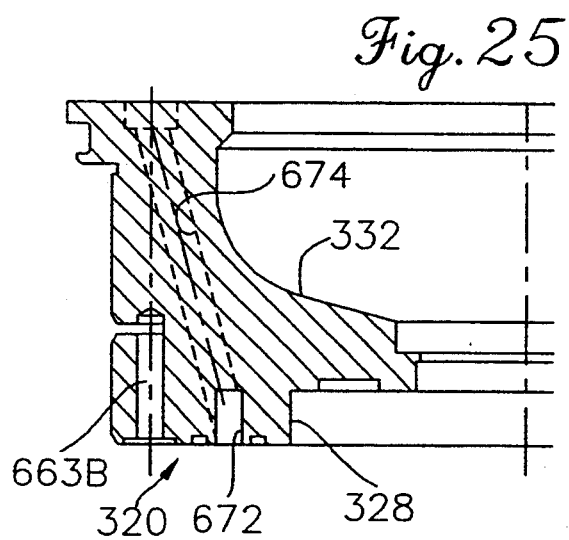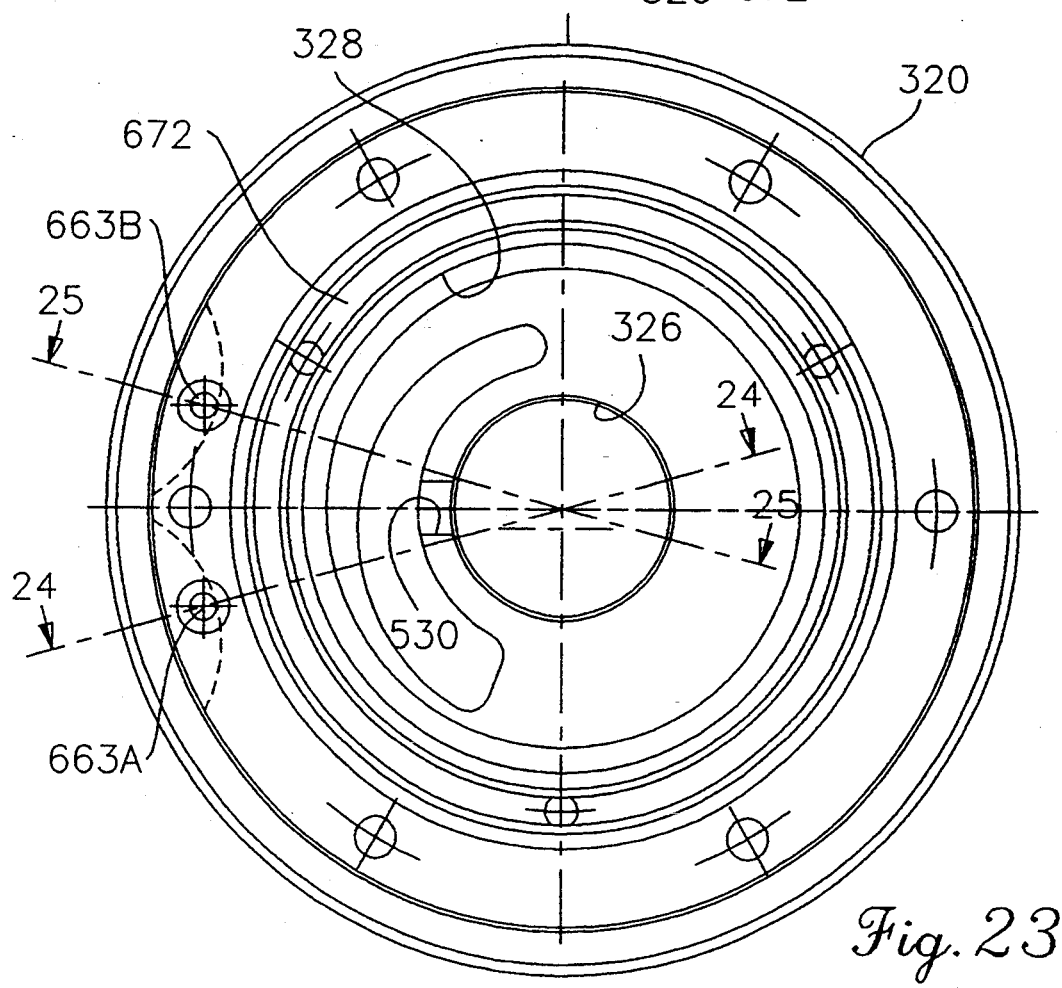

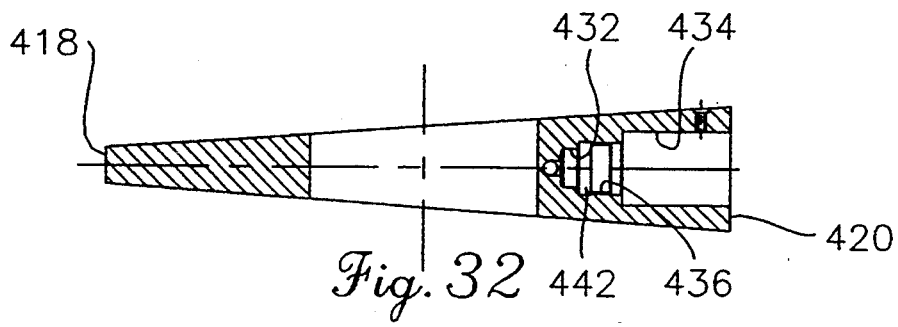
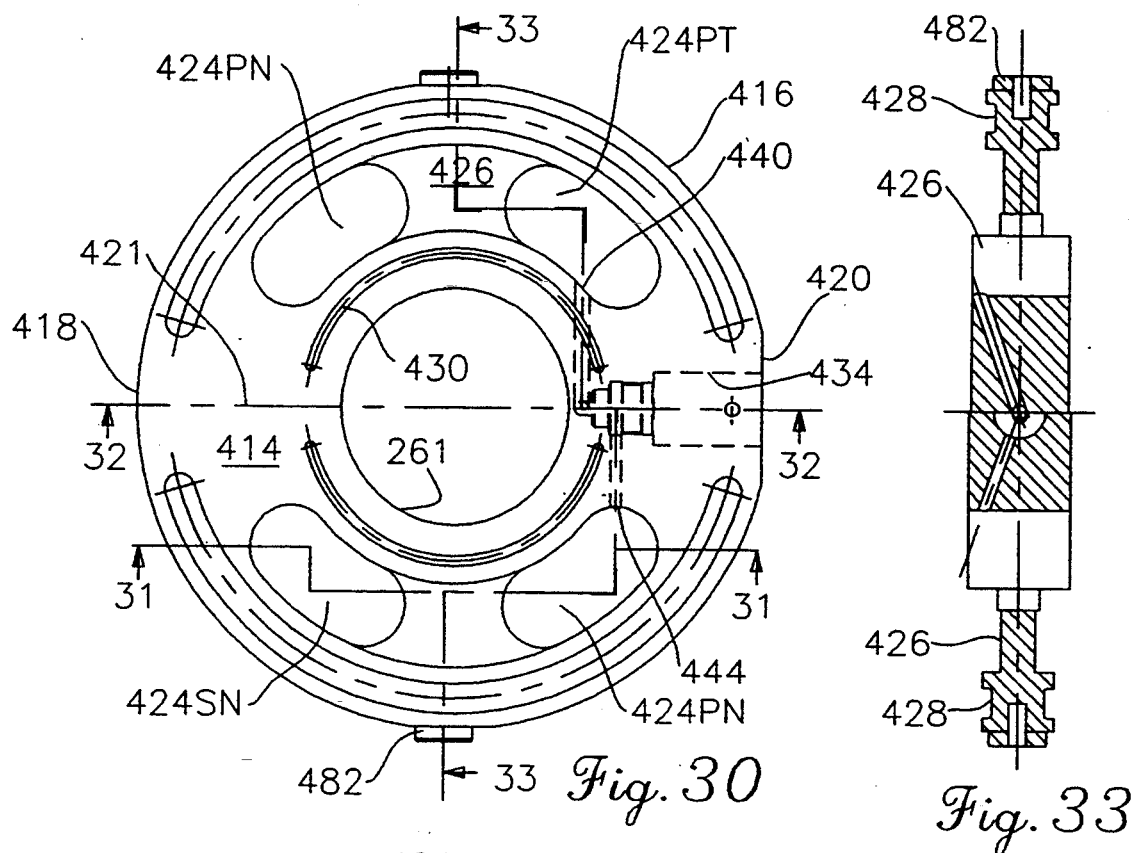
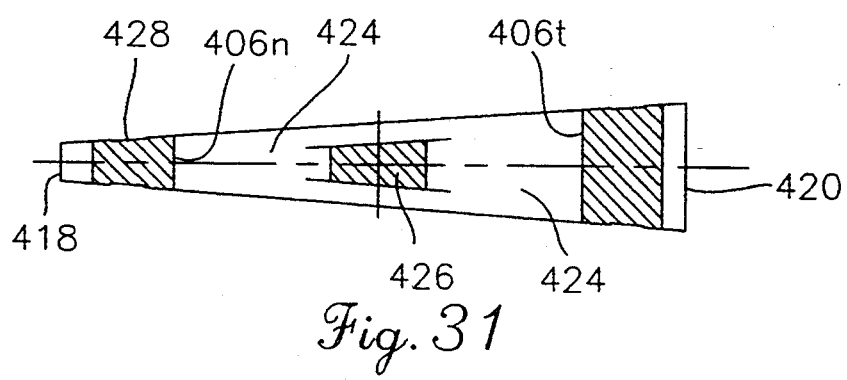

HYDRAULIC MACHINE WITH WEDGE-SHAPED SWASHPLATE

BACKGROUND OF THE INVENTION

This application is a continuation-in-part of U.S. patent application Ser. No. 640,645, filed Jan. 14, 1991, now abandoned and is based on International Application No PCT/US92/00259, filed on Jan. 14, 1992.

This invention relates to hydrostatic power branching transmissions, and more particularly to a hydrostatic power branching transmission that is efficient, uncomplicated, reliable and practical.

A large variety of variable speed drive mechanisms are described in the literature or are currently commercially available. The mechanisms find application in fields as diverse as computers, machine tools, recreational vehicles, construction equipment, and automobiles. They all share the basic function of converting a rotational speed and torque at the input shaft to a variable speed and torque at the output shaft.

The motor vehicle is an ideal application for an infinitely variable speed drive mechanism because of the improved economy that can be obtained by running the vehicle's prime mover, such as an internal combustion engine at, or nearly at, its optimum operating point. Moreover, the potential market is enormous: it has been estimated that the annual world-wide market for automotive transmissions in the 15 years before 2005 will be in the vicinity of 47 million vehicles.

Although numerous infinitely variable transmissions and continuously variable transmissions have been proposed for automotive application, none has proven completely satisfactory. Traction devices have been unable to demonstrate acceptable life at the power levels required and the transient torque conditions occurring in a normal automotive driving cycle.

Rubber belt variator transmissions similar to snowmobile transmissions have found limited application in special automotive areas, such as the mini cars produced in Europe. One auto maker produces a compact car which uses a DAF belt variator transmission. Life and efficiency for these devices are marginal at best, even in light vehicles with engine power on the order of only ten to fifteen horsepower. The most common application for this type of transmission is the snowmobile, where component life is not expected to exceed 100 hours.

A metal belt variator transmission, known as the "Van Doorne" transmission, has received considerable publicity in the automotive press. This transmission is unique in that the power is transmitted by compression through the metal belt segments rather than by tension in the belt which is the usual method. Several production automobiles were introduced in Europe with the Van Doorne transmission in 1987, but the applications reported to-date have been limited in size to vehicles with engines of no more than 1.6 liters. The performance of vehicles equipped with the Van Doorne transmission is comparable to those equipped with conventional automatic transmissions despite the relatively poor 91% efficiency of the transmission. This is believed to be due to the efficiencies gained by operating the vehicle engine at its optimum operating point for much of the driving cycle.

Hydrostatic transmissions have existed for years and have been developed to a high degree of sophistication. These devices are in wide use in agriculture and construction equipment, mining and other off-the-road vehicles, and in small garden tractors. A conventional hydrostatic transmission is comprised of two principal elements: a hydraulic pump driven by the prime mover, and a hydraulic motor powered by hydraulic fluid pressurized by the pump for driving the load. Either or both of these elements may be variable displacement to achieve the variable gear ratio of the transmission. Regardless of the configuration selected, the overall system efficiency can be no better than the product of the efficiencies of the individual elements. For example, if both the pump and motor are 95% efficient, the hydrostatic unit cannot achieve efficiency greater than $(0.95 \times 0.95) = 90\%$ and in practice it is usually less than this because of flow losses in the hydraulic lines coupling the two elements. This efficiency does not compare favorably with conventional automatic transmissions which are capable of operation at steady state efficiency levels on the order of 97% to 98% with torque converter lock-up. Moreover, hydrostatic transmissions tend to be noisy, especially at the higher gear ratios where flow rate is greatest.

The integrated hydrostatic transmission is a step in the right direction. It combines the motor and pump in one unit to minimize fluid flow losses. However, none of the hydrostatic transmissions marketed to-date overcome the condition which degrades their efficiency and contribute to their noisiness, namely, the peak power rating of the transmission is attained at maximum pressure and flow. As a consequence, hydraulic losses associated with pressure, which consist of leakage and fluid compression and expansion will be highest at maximum power throughput. Also, viscous flow losses which are proportional to fluid velocities are greatest at peak power/speed when the flow and pressure are at their highest levels.

The fact that hydrostatic transmissions have not been introduced into production for automotive use is probably due to three main reasons: 1) high cost, 2) noise, and (3) poor efficiency. However, modern production techniques have been developed that would make it possible to produce a hydrostatic transmission designed specifically for automotive application at a cost approximately comparable to that of a conventional automatic transmission. The second and third factors, namely, noise and efficiency, have been the key factors discouraging adoption of a hydrostatic transmission by the automotive industry.

One effort to overcome some of the disadvantages of the conventional hydrostatic transmission is the power branching transmission. An early example of such a transmission is shown in U.S. Pat. No. 3,175,363 to Hans Molly. The power branching transmission was intended to reduce the fluid flow losses associated with the hydrostatic transmission, particularly as the transmission ratio moves toward unity, by mechanically transmitting a portion of the input power to the output shaft. Since the proportion of mechanically transmitted power increases to 100% at a 1:1 transmission ratio, the hydraulic losses are potentially much less in a power branching transmission.

Unfortunately, attempts to commercialize the power branching hydrostatic transmission have been unsuccessful, probably because of the great complexity of the system which would compromise performance and increase cost to an uncompetitive level versus the conventional transmission. Also, the prior art power branching transmissions have not been able to achieve a+dynamic balance of the rotating elements which would be a serious shortcoming since substantial vibration levels at operating speed would not be acceptable.

Thus, the transmission art has long needed a hydrostatic transmission that incorporates the advantages of the integrated hydrostatic transmission while markedly reducing the losses associated with the conventional hydrostatic transmission.

SUMMARY OF INVENTION

Accordingly, it is an object of this invention to provide a dynamically balanced power branching transmission in which fluid losses are reduced to near zero at maximum-power throughput for steady state operating conditions, resulting in overall operation efficiencies comparable or superior to conventional automatic transmissions, but which enable the engine to maintain an operating level at or near its optimum operating point.

This and other objects of the invention are attained in a power branching transmission which uses a common valve/swashplate for both the pump and motor elements, and achieves dynamic balance of the rotating assembly and transmission ratio control in an efficient and simple manner.

DESCRIPTION OF THE DRAWINGS

The invention and its many attendant objects and advantages will become more clear upon reading the following description of the preferred embodiment in conjunction with the following drawings, wherein:

FIGS. 2-12 are drawings of some of the parts of the machine shown in FIG. 1, as follows:

FIG. 2 is an elevation of the transmission mounting flange

FIG. 3 is an elevation of the output face of the seal ring 66;

FIG. 3A is a section along lines 3A—3A in FIG. 3;

FIG. 4 is an axial elevation of the output face of the seal annulus 98;

FIG. 5 is a longitudinal sectional elevation of the drive sleeve 110;

FIG. 6 is a longitudinal sectional elevation of the balance sleeve 144;

FIG. 7 is an axial elevation of the retainer plate 132;

FIG. 8 is an axial elevation of the port plate 136;

FIG. 9 is an axial elevation of the input and output face (they are both the same) of the swashplate 22;

FIG. 10 is a lateral sectional elevation of the swashplate

FIG. 11 is a longitudinal sectional elevation of the swashplate position control sleeve 164;

FIG. 12 is an axial elevation of the input end of the swashplate position control sleeve 164;

FIG. 18 is a partial end elevation of the outside of a mounting flange on the left hand end of the transmission shown in FIG. 16.

FIG. 19 is a sectional elevation along lines 19—19 in FIG. 18.

FIG. 20 is an elevation of the inside face of the mounting flange shown in FIG. 18;

FIG. 23 is an elevation of the rearwardly facing surface of a pump housing shown in FIG. 16.

FIG. 24 is a partial sectional elevation of the pump housing along lines 24—24 in FIG. 23.

FIG. 25 is a partial sectional elevation of the pump housing along lines 25—25 in FIG. 23.

FIG. 30 is an end elevation of the pump-side face of the swashplate shown in FIG. 16.

FIG. 31 is a sectional elevation of the swashplate along lines 31—31 in FIG. 30.

FIG. 32 is a sectional elevation of the swashplate on a vertical longitudinal plane through the longitudinal axis of the machine, along lines 32—32 in FIG. 30.

FIG. 33 is a sectional elevation of the swashplate along lines 33—33 in FIG. 30.

DESCRIPTION OF THE PREFERRED EMBODIMENT

Figure 1:
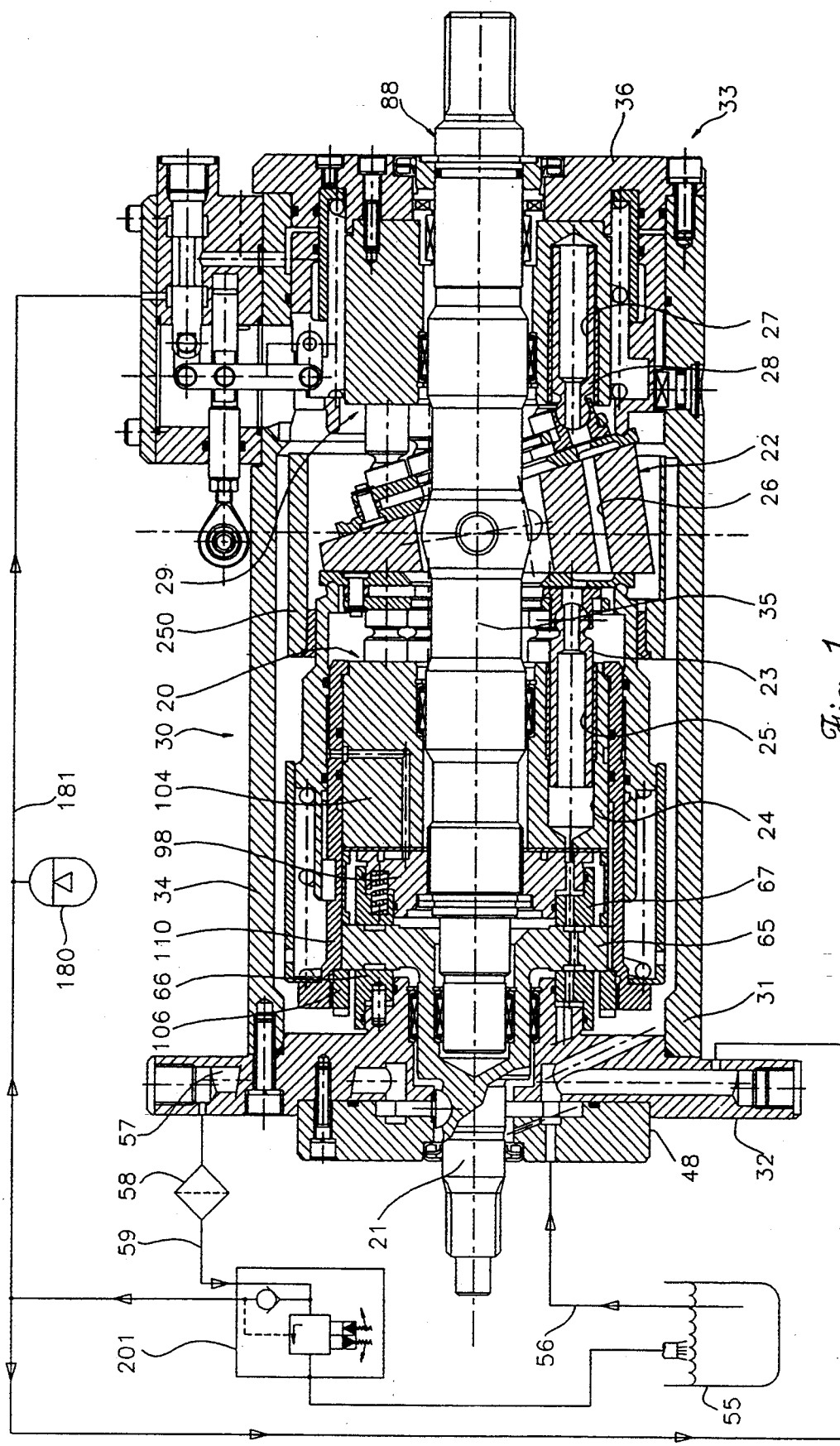
FIG. 1 is a sectional elevation of a hydrostatic transmission in accordance with this invention.

The machine, shown in cross section in FIG. 1, will be explained first in a top level description, and then will be described in a detailed explanation of the structure and function of each part of the machine. The machine described herein is a hydrostatic transmission that includes a pump 20 driven by an input shaft 21. The pump 20 rotates against a swashplate 22, which causes pump pistons 23 in the pump 20 to reciprocate axially in the pump cylinders 24. The reaction torque from the pump 20 is transmitted to the swashplate 22 as a mechanical component of output torque through the swashplate to an output shaft 88 coupled to the swashplate. Hydraulic fluid pressurized by the pump 20 flows from the pump cylinders 24 directly through axial bores 25 in the pistons into slots 26 around the swashplate 22, and thence through similar axial bores 27 in pistons 28 in a hydraulic motor 29 on the other side of the swashplate 22. The hydraulic motor 29, thus pressurized by fluid input directly from the pump 20, exerts a hydromechanical component of torque on the swashplate 22. A third component of torque is exerted by the fluid in the swashplate slots directly on the differential area of the circumferentially facing surfaces of the slots. All three components of torque, the mechanical component from the pump reaction torque, the hydromechanical component from the hydraulic motor, and the pure fluid component from the differential slot area, are summed in the swashplate 22 and delivered to the output shaft 88.

The rotating elements of the machine are contained in a cylindrical housing 30 having an input end 31 mounted on a transmission mounting flange 32, and an output end 33 at the other end of the housing. The housing has a main cylindrical section 34 concentric with a main longitudinal axis 35 of the machine. The cylindrical section 34 is closed at the output end by an end closure 36 secured to the cylindrical section 34 by screws 40.

References to the "outer end" and to "outward" and the like will be meant herein to indicate the output side, or the right hand side of the machine, or its parts, as shown in FIG. 1. The terms "inner end" and "inward" refers to the input side, or left hand side in FIG. 1. Naturally, these references are merely for convenience and for ease of description and are not intended to have any limiting effect except to indicate relative position and otherwise as indicated.

A pump housing 48 is mounted on the inner side of the transmission mounting flange 32, centrically about the axis 35, by bolts 54. Scavenge pump 50 of the gear type is mounted within the housing 48. Lip seal 52 is secured by a press fit in a step 51 to a bore 53 in the housing through which the input shaft extends and seals the annular space between the bore 53 and the input shaft 21. The input shaft 21 is mounted concentrically on the axis 35 and extends through the bore 53 in the housing 48, projecting beyond the inner side of the housing 48 to terminate in a splined input end 49 which can be coupled to a prime mover such as an internal combustion engine.

The input shaft 21 is keyed to and drives the scavenge pump 50 to provide control flow and make-up hydraulic fluid to the hydraulic elements of the machine and to replace any fluid that leaks past the internal oil seals. The pump 50 draws oil from the oil sump (shown schematically as a separate container 55, but in the usual practical embodiment would be an oil pan on the housing 30) through an oil inlet line 56 and discharges the hydraulic fluid at scavenge pressure through a fluid supply passage 57 in the transmission mounting flange 32 to a filter 58. The filtered fluid passes through a fluid line 59 and connects through a valve 201 (to be described below) and a fluid line 47 to a fluid supply passage 60 in the transmission mounting flange and thence to a fluid distribution system to the pump cylinders 24, to be described below.

The input shaft 21 is enlarged at 61 and accurately turned, hardened, and polished to provide a bearing race for a bearing 62 provided between the bearing race 61 and a cylindrical bearing recess 63 in an axial boss 64 on the outer face of the mounting flange 32. Outward from the bearing race 61, the input shaft 21 terminates in a flat, radially extending seal disc 65 which rotates between two identical seal rings 66 and 67, shown in FIG. 3. The seal ring 66 is pinned to a shoulder 68 on the axial boss 64 by three pins 69 (only one of which is shown in FIG. 1) which fit into aligned pin holes 70 and 72 in the axial boss 64 and the seal ring 66, respectively. Six compression springs 74 (not shown for the seal disc 66 but one of which is shown in the identical seal disc 67) in aligned, equally spaced spring wells 76 in the axial boss 64 and the seal ring 66, respectively, urge the seal ring 66 axially against the seal disc 65 to preserve a fluid tight seal between them to minimize leakage of fluid from the scavenge fluid distribution system.

An axial cylindrical bearing bore 80 extends into the outer end of the input shaft 21, and includes a ground and polished inner bearing race 82 which receives a bearing 84 positioned between the race 82 and another bearing race 86 provided by grinding and polishing the inner end of an output shaft 88. The bearing 84 is held in place in its bearing race 82 against a shoulder 90 in the bearing bore 80 by a snap ring 92. The inner end of the bearing bore 80 terminates in a relief bore 94 which provides room for the grinding and polishing tools which finish the surface of the bearing surface 82.

The output shaft 88 is concentric with the input shaft 21 and the longitudinal axis 35 of the device, and terminates in a splined output end 96 to which a load can be coupled. The bearing 84 allows the input shaft and the output shaft to turn independently of each other while retaining their concentricity.

A seal annulus 98 is internally splined and engaged with a splined section 100 adjacent the inner end of the output shaft 88. An annular recess 97 fits over a snap ring 99 received in a groove in the output shaft 88 and an adjacent shear ring 95. The snap ring 99 and the shear ring 95 resist the axial push of the pump 20 on the seal annulus 98, and the close fit of the snap ring 99 in the recess 97 prevents the Snap ring from expanding under centrifugal force when the output shaft and seal annulus 98 are rotating. The outer stepped seal ring 67, identical in design to the seal ring 66 (but turned around so that its seal face also faces the seal disc 65), is nested with the inner stepped face of the seal annulus 98 and is pinned thereto with three equally spaced pins (not shown but identical to the pin 69 shown in the seal disc 66) to insure that the outer seal ring 67 rotates together with the seal annulus 98, but permits a slight axial movement between the two parts to enable the seal ring 67 to maintain an intimate sealing contact with the seal disc 65 despite wear and any possible non-normality of the face of the seal disc 65. The extra axial spline length on the spline section 100 shown in FIG. 1 accommodates a similar axial movement for the seal annulus 98. A series of six springs 74, equally spaced circumferentially in spring wells 76 around the seal ring 67 and the seal annulus 98, identical to the configuration of the seal ring 66 shown in FIG. 3, apply an axial separating force between the seal annulus 98 and the seal ring 67 to effect a fluid seal in the absence of system pressure. When the system is pressurized, the fluid pressure between the seal ring 67 and the seal annulus 98 forces them apart and into sealing contact with the facing surfaces on the seal disc 65 and the inner face 102 on the pump cylinder body 104. The sealing interface pressure is proportional to the pressure which the seals must seal against.

Figure 5A:
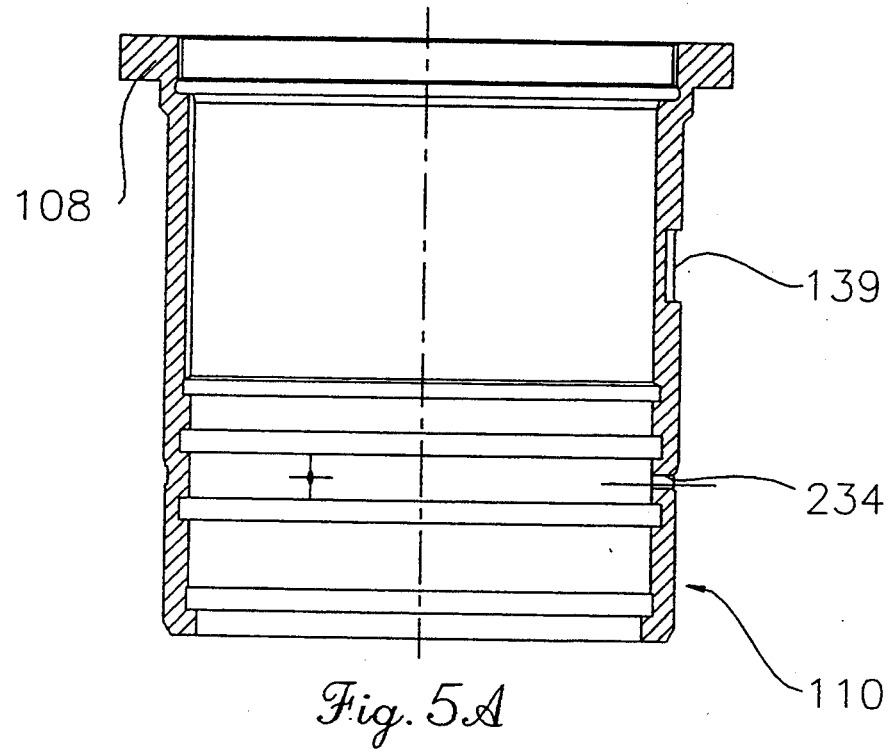
FIG. 5A is a section along lines 5a-5a in FIG. 5.
Figure 5:
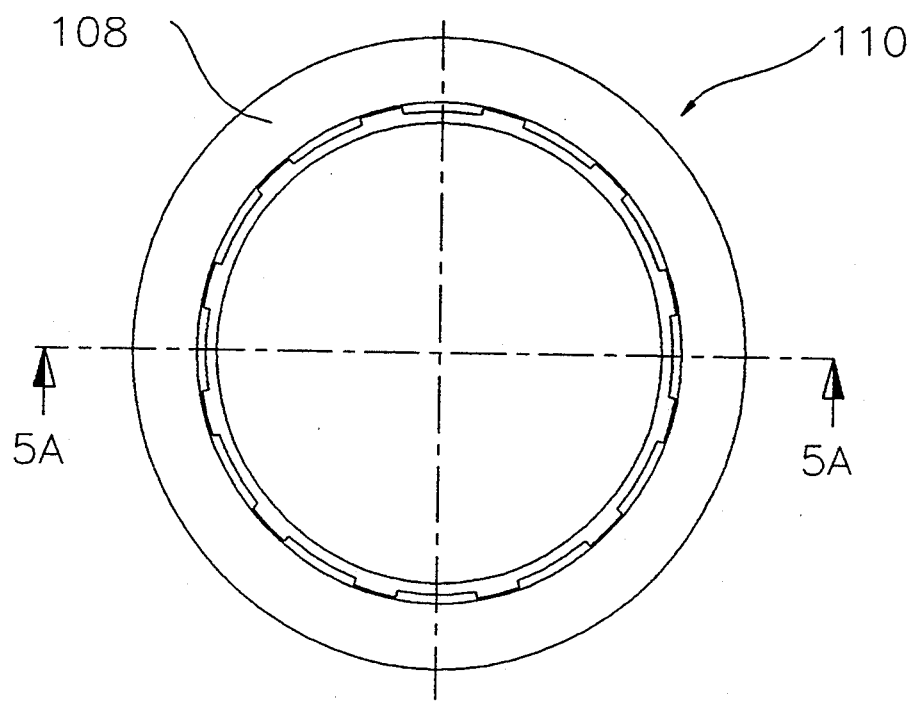
Figure 6A:
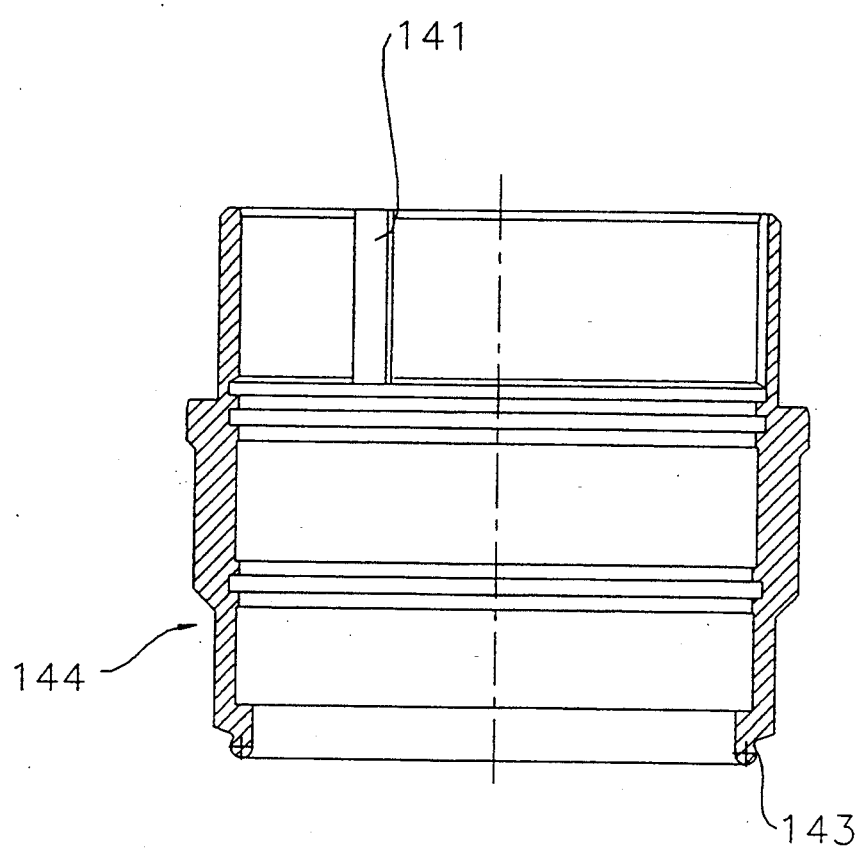
FIG. 6A is a section along lines 6A-6A in FIG. 6.
Figure 6:
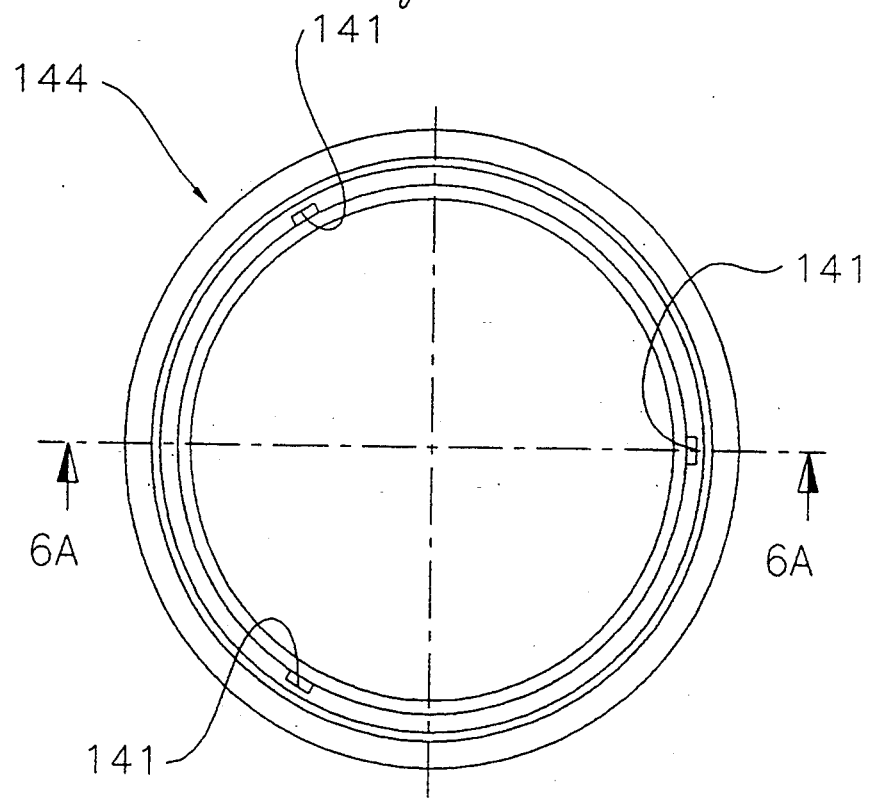

The seal annulus 98 and the seal ring 67 are positioned between the seal disc 65 and the inner face 102 of a pump cylinder body 104. The pump cylinder body 104 is fastened to the seal disc 65 by a ring nut 106 which is externally threaded and screwed into an internally threaded surface of a radially projecting foot 108 of a drive sleeve 110 shown in FIG. 5. The outer end of the drive sleeve 110 ends in a radially inwardly projecting lip 112 which engages an annular recess 114 in the peripheral edge of the outer end of the pump cylinder body 104 to clamp a spacer sleeve 111 between the seal disc 65 and the pump cylinder body 104 and hold the pump cylinder body axially against the seal annulus 98. The seal disc 65 is splined to the drive sleeve 110 at 118 so they rotate together about the axis 35. The internal splines on the drive sleeve 110 extend inward to and engage mating splines 120 on the pump cylinder body 104, so the pump cylinder body 104 is driven around the swashplate 22 by the seal disc 65 of the input shaft 21 acting through the drive sleeve 110.

Figure 7A:
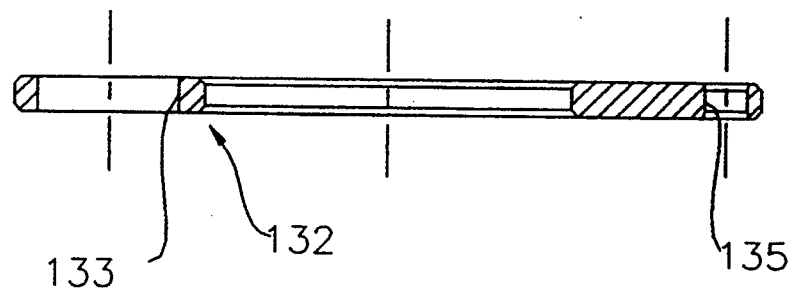
FIG. 7A is a section along lines 7A—7A in FIG. 7.
Figure 7:
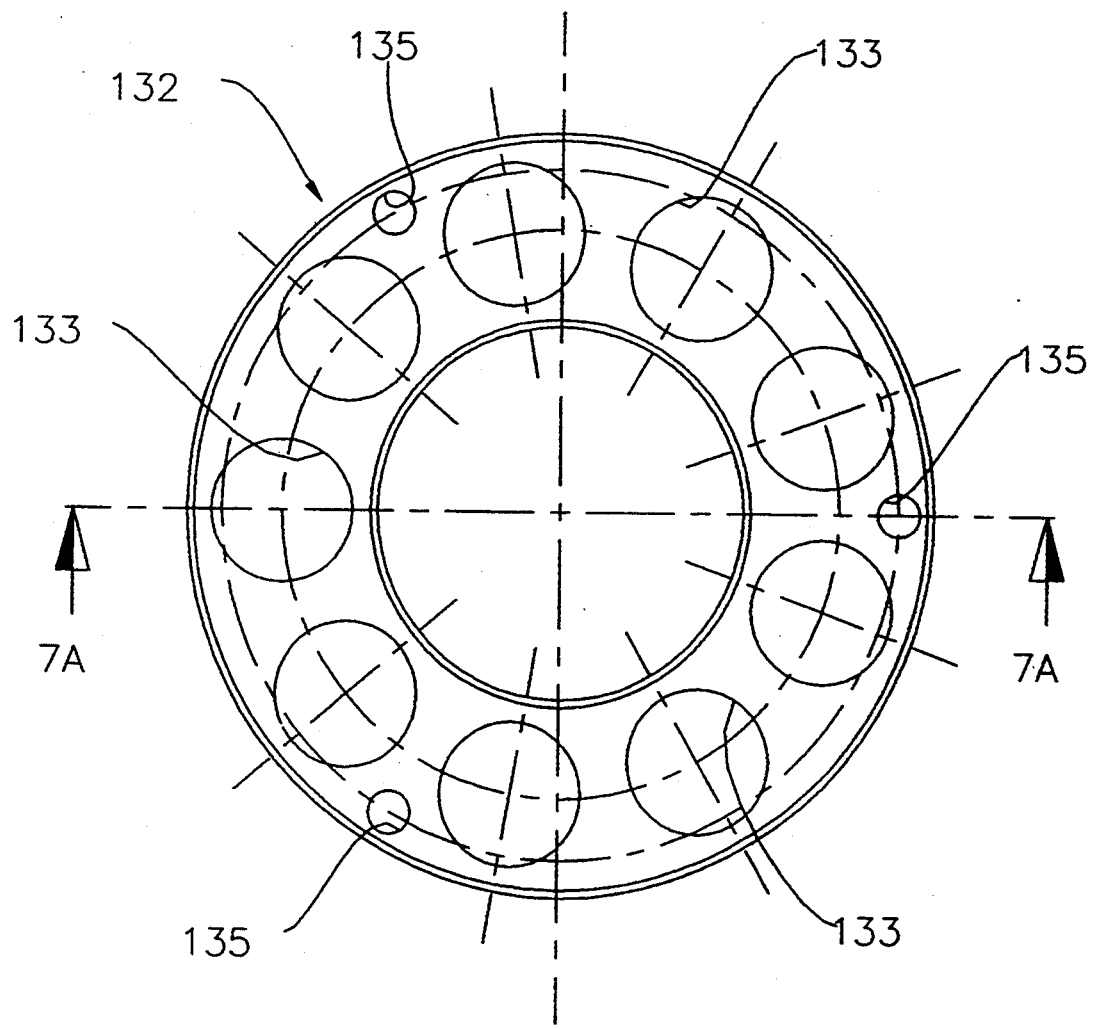

The pump cylinder body 104 has a series of axial cylinders 24, each of which contains a piston 23. Each piston 23 terminates at its outer end in a spherical head 126 which nests in a spherical seat 128 on an individual slipper 130, one for each piston head. A retainer plate 132, shown in FIG. 7, has enlarged holes 133 to receive the necks of the individual slippers 130 and bear against the inside of their flanges, the outside faces of which are pressed against a port plate 136, shown in FIG. 8. The retainer plate 132 is fastened to the port plate 136 with fasteners 134 through three equally spaced holes 135 in the retainer plate 132 and the port plate 136 to capture the slippers 130 and hold them in place against the port plate 136. The enlarged holes 133 allow the individual slippers 130 to follow an elliptical path around the port plate 136 when the swashplate 22 tilts to present an inclined input face 140 to the pump 20. Ports 137 in the port plate 136 pass fluid displaced from the pump cylinders 24 by the pistons, and elliptical recesses 138 in the output face of the port plate 136 ensure fluid communication through the port plate 136 to the slots 26 in 25 the swashplate 22 throughout the full angular range of the swashplate. This is illustrated in FIG. 1 wherein the radially outer edge of the recess 138 is aligned with the radially outer edge of the slot, whereas on the output face of the swashplate, the radially inner edge of the corresponding recess in the corresponding port plate is aligned with the radially inner edge of the slot 26, so communication is assured through the full range of adjustment motion of the swashplate 22. The swashplate position adjustment will be described below.

The port plate 136 is held against the input face 140 of the swashplate 22 which in turn is pivotally connected by a pivot pin 142 to the output shaft 88. The port plate 136 is held against the input face 140 of the swashplate 22 by an annular nose 143 on the outer end of a balance sleeve 144 which is slidably disposed on the drive sleeve 110 and keyed thereto by three equally spaced keys 139 received in three notches spaced around the drive sleeve. The keys slide into three keyways 141 spaced around the inside surface of the balance sleeve 144 to ensure that the balance sleeve 144 rotates with the drive sleeve 110.

A spring 146, compressed between the foot 108 of the drive sleeve 110 and an axially facing shoulder 147 on a radially projecting protuberance 151 on the balance sleeve 144, biases the balance sleeve 144 toward the output side and holds the port plate 136 against the input face 140 of the swashplate 22 in the absence of system pressure, e.g. at startup. The spring 146 is supported against radially outward bowing under centrifugal force by a spring retainer sleeve 149 which surrounds the spring 146 and telescopes over the protuberance 151, allowing the balance sleeve to slide axially within the spring retainer sleeve 149 when the machine changes ratio.

The annular nose 143 of the balance sleeve 144 has a convex spherical radius which mates with an annular recess 145 on the input face adjacent the outside circumference of the port plate 136. The annular recess 145 has a concave spherical radius surface corresponding in shape and size to the spherical radius of the annular nose 143 of the balance sleeve 144.

Figure 10:
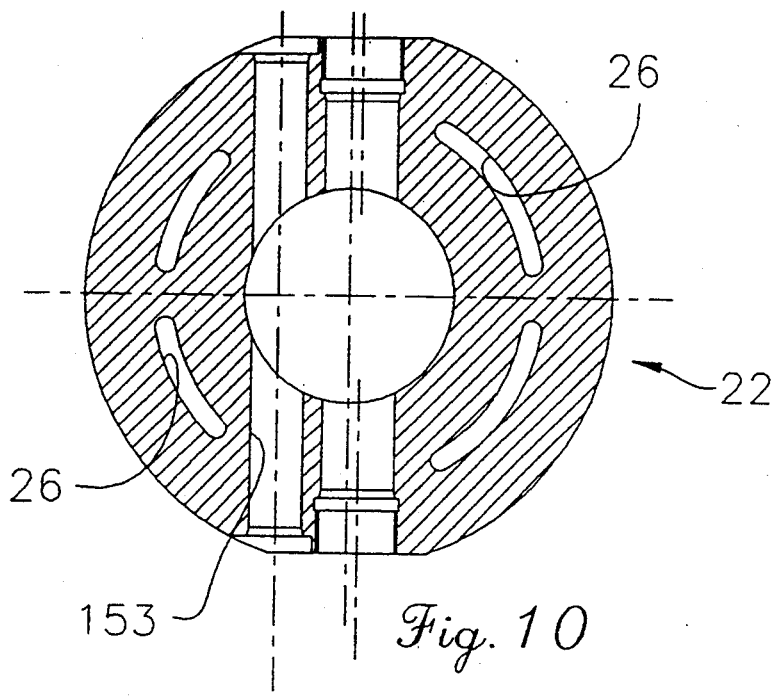

The swashplate 22 functions both as a swashplate and as a valve plate for control of hydraulic fluid under pressure from the pump 20 to the hydraulic motor 29 on the output side of the machine. As shown in FIGS. 1 and 10, the swashplate 22 is pinned to the output shaft 88 by the pivot pin 142 which is perpendicular to and intersects the axis 35, thereby permitting a substantial axial excursion of both ends of the swashplate when it is pivoted about the pivot pin 142 through a transverse bore 153 to effect the drive ratio changes in the transmission. The function of the swashplate 22 will be discussed in more detail below in connection with the description of the operation of the device.

Figure 8A:
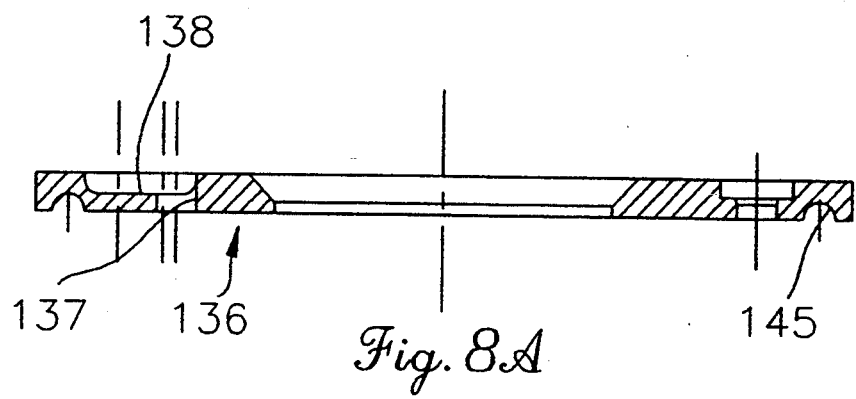
FIG. 8A is a section along lines 8A—8A in FIG. 8.
Figure 8:
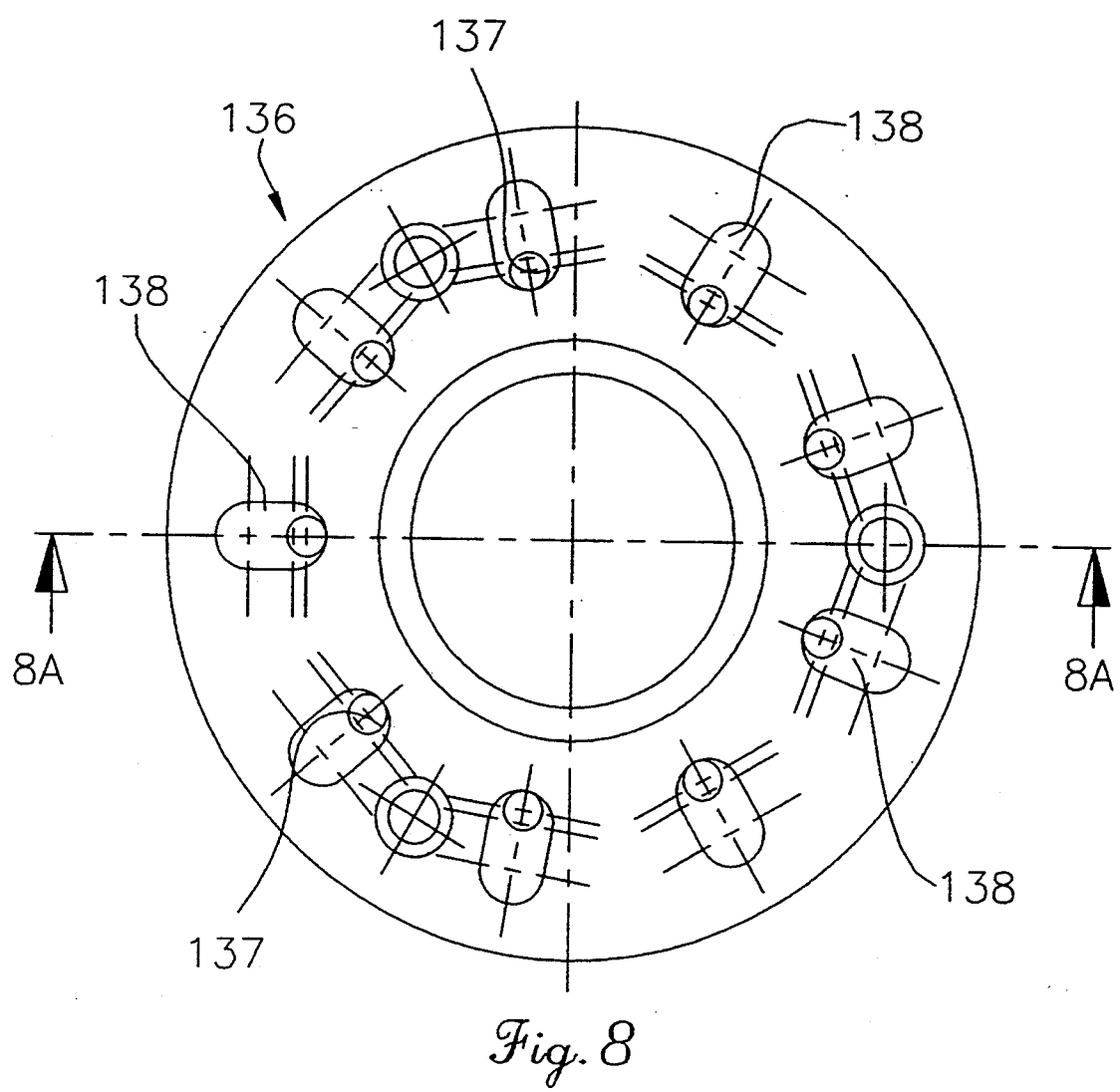

The hydraulic motor 29 has a motor cylinder block 148 which is secured to the inside surface of the end closure 36 by screws 150. The cylinders 38 in the motor cylinder block 148 each contains a piston 28 which is identical in shape and design to the pistons 23 in the pump 20. The pistons 28 have spherical heads 152 which seat in spherical recesses 154 in the necks of individual slippers 156, identical in design and shape to the slippers 130. A retainer plate 158 is fastened to a port plate 160 with fasteners 162 to hold the slippers 156 in place against the port plate 160 when system pressure is low, in the same manner as the retainer plate 132 and port plate 136 on the input side of the swashplate 22. The port plate 160 is identical in design to the port plate 136 on the input side of the swashplate 22, so FIG. 8 shows both port plates. The port plate 160 is held against the swashplate 22 by a swashplate position control sleeve 164.

Figure 11:
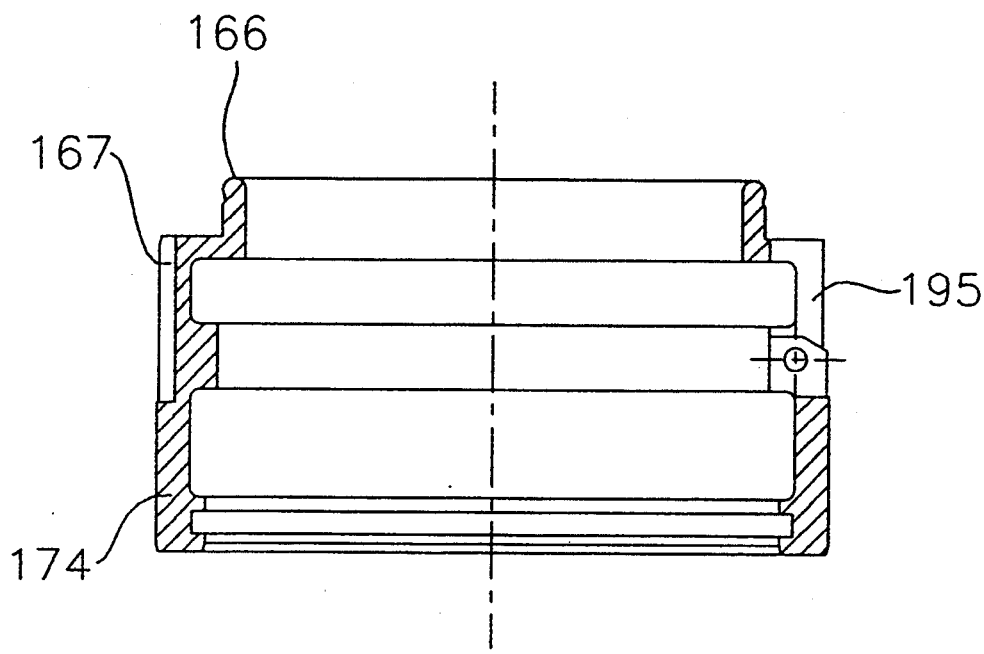
Figure 12:
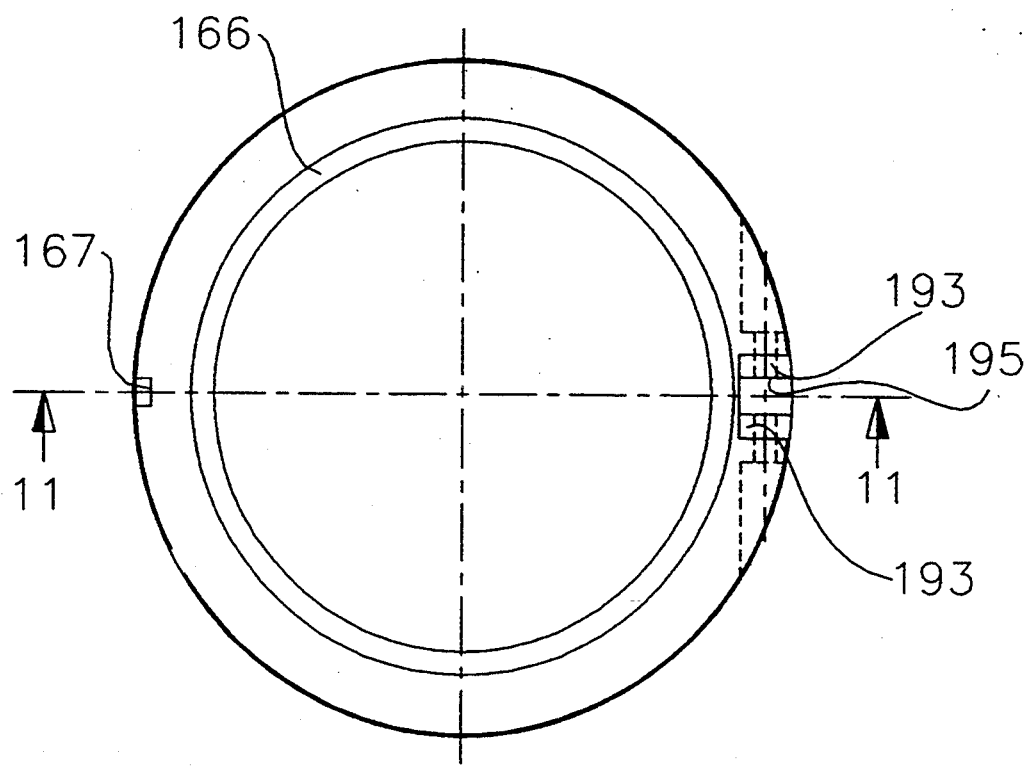

The angular position of the swashplate 22, and hence the transmission ratio of the machine, is controlled by the swashplate position control sleeve 164 shown in FIGS. 11 and 12 which is disposed coaxially around the motor cylinder block 148. An annular nose 166 at the inner end of the swashplate position control sleeve 164 is formed in a convex spherical radius which mates with a concave spherical recess 168 in the port plate 160 to maintain the seated relationship of the nose 166 in the recess 168 of the port plate 160 in operation.

The swashplate position control sleeve 164 is keyed against rotation about the axis 35 by a key 165 which fits into an elongated groove or keyway 167 to accommodate axial movement of the control sleeve 164. The key 165 is on the inner end of a plug 163 which fits into a hole in the housing 30 and is held in place by a snap ring 161. An "o"-ring seal in a groove around the plug 163 seals the plug in the hole against leakage of hydraulic fluid around the plug.

The axial position of the swashplate position control sleeve 164, and hence the angular position of the swashplate 22, is controlled by a swashplate control system 170 which operates by controlling the axial position of the swashplate position control sleeve 164. The system 170 includes an annular cylinder 172 bounded by the inner surface of the housing 30 and the outer surface of a cylinder sleeve 173, each of which surfaces are sealed to an annular ridge 175 on the end closure 36 by o-ring seals 169 and 171. An annular piston 174, on the outer end of the swashplate position control sleeve 164, is axially movable in the annular cylinder 172.

An inlet manifold 176 at one side of the annular cylinder 172 receives hydraulic fluid under pressure through an inlet passage 178 in the housing 30 into the annular cylinder 172 to push the annular piston 174 inward toward the swashplate 22. Since the spherical radius nose 166 of the swashplate position control sleeve 164 is engaged with the concave spherical radius recess 168 on the port plate 160, inward movement of the swashplate position control sleeve 164 pushes the swashplate 22 to rotate it clockwise and tilt its outer face toward a perpendicular orientation to the axis 35. The input surfaces exposed to system hydraulic fluid pressure on the pump side are sized to exceed the opposite or output surfaces on the pump side that are exposed to system pressure to avoid floating the pump port plate 136 and slippers 130 off the swashplate. Of course, the axial force exerted by the pistons on the slippers 130 and port plate 136 helps to hold the pump components against the swashplate 22, and holds the output face 179 of the swashplate 22 at the angle set by the position of the swashplate position control sleeve 164.

The swashplate position control sleeve 164 is moved toward the input end of the apparatus by hydraulic fluid delivered under pressure from an accumulator 180 through a line 181 to an annulus 182 in a control valve cylinder 184 bored in a control valve body 185 of a control spool valve 186. A control spool 188 in the spool valve cylinder 184 controls the flow of fluid in the cylinder 184. The position of the control spool 188 in the cylinder 184 of the spool valve 186 is controlled by a control rod 190 axially mounted in a pair of aligned bores in the control valve body 185 and a control valve housing 191. The control rod 190 can be connected to a control linkage (not shown) at a rod end connector 192 for operator or automatic control of the transmission ratio of the machine. The control rod 190 is connected to a link 194 intermediate its ends, which in turn are connected via connecting links 196 and 198 to the spool 188 and the control sleeve 164, respectively. The link 198 is pinned in a groove 195 between two ribs 193 machined out of the cylindrical body of the control sleeve 164.

Operation of the control valve 186 to control the transmission ratio of the machine is by control of the axial position of the control rod 190. If it is desired to change the transmission ratio from neutral or idle position shown in FIG. 1 to some intermediate ratio, the control rod 190 is pulled to the left in FIG. 1, causing the rocking link 194 to rotate about its connection to the inner end of the link 198. The rocking link 194 pulls the control spool 188 to the left through the interconnecting link 196 which, together with the link 198, accommodates the foreshortening of the rocking link 194 as projected on a vertical plane as it rocks about its connection to the control rod 190. The displaced control spool 188 allows fluid under pressure from the accumulator 180 to flow from the annulus 182 into narrow center portion of the spool valve cylinder and through the connecting passage 200 in the control valve body 185 and the inlet passage 178 to the inlet manifold 176 of the annular cylinder 172 where it acts on the axially facing surface of the annular piston 174 to push it to the left, forcing the swashplate position control sleeve 164 toward the input end of the apparatus. The movement of the swashplate position control sleeve toward the input end pushes the port plate 160 against the swashplate 22 and rocks the swashplate about its pivotal connection at the pivot pin 142 to change the angular position of the swashplate from the position shown in FIG. 1 to the 1:1 ratio position in which the outer face of the swashplate is normal to the axis 35 of the output shaft 88. As the swashplate control sleeve 164 moves to the left under influence of the pressurized fluid in the annular cylinder 172, it pushes the connecting link 198 to the left which rocks the rocking link 194 in a clockwise direction about its pivotal connection to the control rod 190, thus pushing the control spool 188 to the right, closing off fluid flow from the annulus 182 into the narrow portion of the valve cylinder 184. The position of the control sleeve 164 thus follows the position of the control rod 190.

When it is desired to change the transmission ratio back toward neutral, the control rod 190 is pushed toward the right. This causes the rocking link 194 to push the control spool 188 into the spool valve cylinder 184, sealing the annulus 182 and opening an annulus 183 adjacent the outer end of the narrow center portion of the spool valve cylinder 184. Fluid under pressure in the annular cylinder 172 can now flow back through the inlet manifold 176, the fluid passages 178 and 200, the spool valve cylinder 184 and into the annulus 183. A passage 197 connects the annulus 183 to an outlet opening 199 into the housing 30. The force of the pump cylinders 23 and the fluid pressure in the annular chamber 235 (to be described below) in the balance sleeve 144 will push the swashplate 22 toward the neutral position shown in FIG. 1, to the limit permitted by the position of the swashplate position control sleeve 164 under position control set by the position of the control rod 190.

The accumulator 180 stores pressure from the scavenge pump 50 to ensure that pressure will be available to operate the swashplate position control sleeve 164 even when input torque is not applied to operate the scavenge pump. The charging system for the accumulator 180 includes a valve 201 connected to the line 59 which runs from the output passage 57 from the scavenge pump 50 to the filter 58. The valve 201 includes a one-way portion that allows fluid to flow from the scavenge pump 50 into the accumulator 180 when the pressure in the line 181 is lower than the scavenge pump pressure, but does not permit fluid to flow out of the accumulator 180 back through the valve 201. When the accumulator line 181 pressure equals or exceeds the scavenge pump pressure, the valve 201 dumps the output of the scavenge pump into the sump 55.

In operation, input power, as from a prime mover such as an internal combustion engine, is input to the input shaft 21 in the form of rotary torque to the splined end 49. The input shaft 21 drives the seal disc 65, which, through the drive sleeve 110, drives the pump cylinder body 104 to rotate about the longitudinal axis 35. In the neutral position shown in FIG. 1, the input face of the swashplate 22 is perpendicular to the longitudinal axis 35 of the machine, so rotation of the pump cylinder 104 carrying the pump pistons 23 around the inner face of the swashplate 22, produces no axial motion of the pistons and therefore no pumping of hydraulic fluid. No torque is transmitted to the swashplate 22 in this position, illustrating an advantage to the use of this invention in a vehicle: there is no need for a separate clutch or torque converter.

When it is desired to apply torque to the output shaft. 88, the control rod 190 is moved to the left, allowing fluid under pressure from the accumulator 180 to flow through the line 181 and the annulus 182 into the annular cylinder 172, thus pushing the swashplate position control sleeve 164 toward the input side of the machine, thereby rotating the swashplate in a clockwise direction about pin 142. When the swashplate has reached the position set by the position of the control rod 190, the hydraulic fluid flow from the annulus 182 is shut off by the control spool 188, causing the annular piston 174 to stop at the position corresponding to the set position of the control rod 190. The position of the swashplate 22 is governed by the nose 166 of the swashplate control sleeve 164 engaged with the concave spherical radius recess 168 in the port plate 160, so the swashplate 22 is held at this angle until the control sleeve 164 is moved to another position.

At the new angular position of the input face of the swashplate 22, the rotation of the pump cylinder 104 now causes the pistons 23 on the suction side of the pump to extend axially out of the cylinders 24 under the pressure of fluid pumped into the cylinders 24 by the scavenge pump 50 as the pistons revolve around the swashplate 22 "down hill" toward its narrow side. As the pistons move outward, the scavenge pump 50 fills the cylinders 24 through a fluid feed channel formed by a series of connected fluid passages, shown aligned on an axis 202 in FIG. 1, but not necessarily so aligned to be connected because of the kidney-shaped groove 220 on the output face of the seal annulus 98 and the annular grooves 206 and 208 on the inner and outer faces of the seal disc 65. Fluid flows to this fluid feed channel from the scavenge pump fluid delivery line 59, through the valve 201 and the line 47 to the fluid passage 60 in the transmission mounting flange 32. This fluid feed channel, shown aligned on the axis 202, will be referred to hereafter as the "fluid feed channel 202." The fluid feed channel 202 always feeds the pump cylinders 24 which are in the suction phase of their cycle because the kidney-shaped groove 220 on the seal annulus 98 always is aligned with the "downhill" side of the swashplate 22 because of the fixed angular relationship between the seal annulus 98 and the swashplate 22 by virtue of their connection to the output shaft 88.

As shown in FIG. 3, the fluid feed channel 202 includes three axial fluid passages 204 in the seal ring 66 between the boss 64 on the transmission mounting flange 32 and the seal disc 65. The fluid passages 204 are in fact always aligned with three axially extending fluid passages in the axial boss 64 on the transmission mounting flange 32 which connect with the fluid supply line 60 because of the pinned connection of the seal ring 66 on the boss 64. An annular groove 206 on the inner side of the seal disc 65, and another annular groove 208 on the outer side of the seal disc 65, connect three passages through the seal disc 65 and extend the fluid feed channel 202 for scavenge fluid from the scavenge pump 50 across the seal disc 65. The fluid feed channel 202 extends through the seal ring 67 via three fluid passages 210 into an annular chamber 212 between the seal ring 67 and the seal annulus 98, in which the fluid is sealed against leakage by annular seals 214 and 216. The fluid pressure in the chamber 212 forces the seal annulus 98 against the input axial face 102 which is coated with a low friction surface such as Oilite or Teflon impregnated aluminum oxide to facilitate relative sliding motion at the interface and to seal against fluid loss from the kidney slots in the seal annulus 98, as explained below.

Figure 4B:
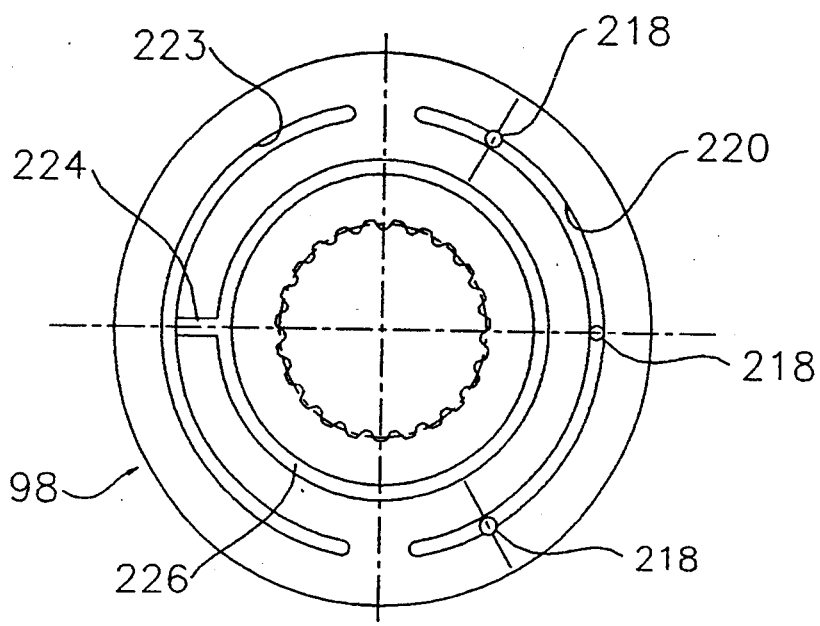
FIG. 4B is a plan view from the bottom of the structure shown in FIGS. 4 and 4A.
Figure 4A:
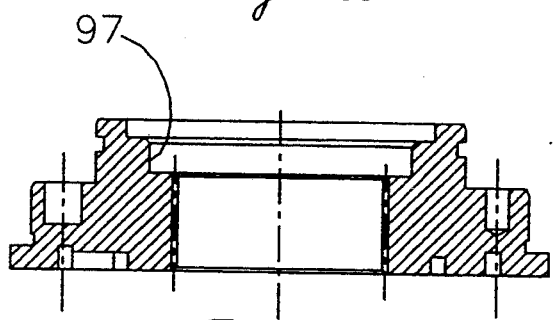
FIG. 4A is a section along lines 4A—4A in FIG. 4.
Figure 4:
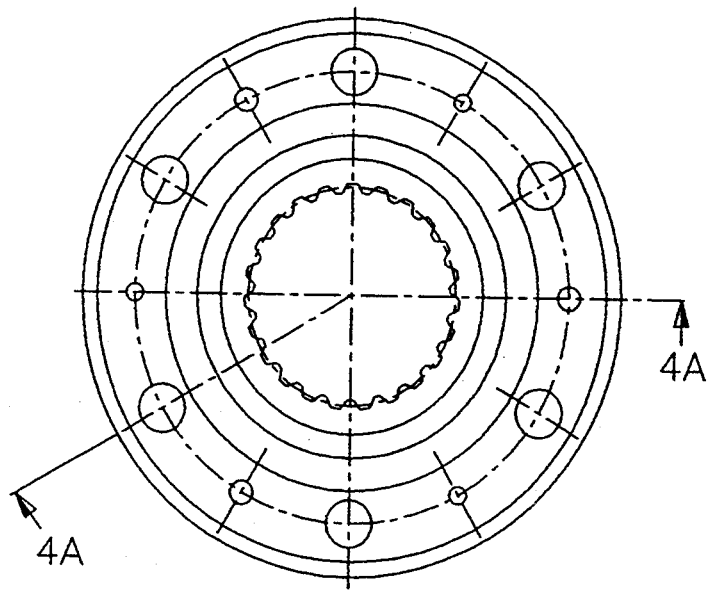

From the annular chamber 212, the fluid flows through three passages 218 in the seal annulus 98 and thence into a kidney shaped groove 220, shown in FIG. 4, in the outer side of the seal annulus 98 through which the fluid is distributed to holes 222 into the cylinders 24. Since the seal ring 66 and the mounting flange 32 are stationary relative to the case 34 of the machine, the groove 220 in the seal annulus 98, which is splined to and rotates with the output shaft 88, must be kidney shaped to cover sufficient angular extent to insure that the pump cylinders 24, during the suction cycle of the pump 20, are coupled with the discharge port of the scavenge pump 50 so that the pump cylinders are filled properly by the scavenge pump during the suction. stroke of the pump, which would be the portion of the rotation of the machine during which the pump pistons are moving "downhill" around the swashplate 22 toward its narrow end, and axially towards the output end of the machine. Correct "timing" of the kidney groove 220 is assured through proper orientation of the spline coupling 100 between the seal annulus 98 and the output shaft 88.

On the pressure or discharge phase of the pump cycle, the pistons are being carried around "uphill" toward the thicker end of the swashplate 22 and are being driven backward into the pump cylinders 24 by the inclined input face of the swashplate 22, displacing fluid from the pump cylinders 24. A portion of that displaced fluid is used to pressurize an annular chamber 235 in the balance sleeve 144, but that is a minor portion of the fluid discharge from the pump. This control fluid flow, which occurs only during a ratio change, leaves the cylinders 24 through the holes 222 in the input end of the pump cylinder body 104 and enters a kidney groove 223 in the seal annulus 98, shown in FIG. 4, thence through a radial slot 224 into an annular groove 226. Fluid flows through the annular groove 226 and into an axial fluid passage 228 in the pump cylinder body 104, thence out through a radial passage 230 to an annular groove 232 in the pump cylinder body from which it can flow through a hole 234 in the drive sleeve 110 into the annular chamber 235 between the balance sleeve 144 and the drive sleeve 110 bounded by seals 236 and 238.

The pressure in the annular chamber 235 exerts an axial force on the balance sleeve 144 toward the swashplate 22 which is proportional to system pressure, thus providing a counterclockwise moment on the swashplate 22 which biases it toward the neutral position. This axial force by the balance sleeve 144 counterbalances an otherwise unbalanced force exerted by the motor pistons 28 by virtue of their line of action which is outside the line of action of the pump pistons 23 when the swashplate 22 angle is between 0° and 10°. The longer moment arm of the forces exerted by the motor piston on the swashplate 22 about the pivot pin 142 at these positions of the swashplate 22 would produce an unbalanced moment on the swashplate, and the force exerted by the balance sleeve 144 counterbalances this otherwise unbalanced moment. At swashplate angle positions between 10° and 20°, the opposite unbalance force exerted by the pump pistons 23 is less because the system pressure begins to decline as the percentage of torque to the swashplate transmitted mechanically by the pump increases. That opposite unbalance force is counteracted by the swashplate position control sleeve 164.

Figure 9A:
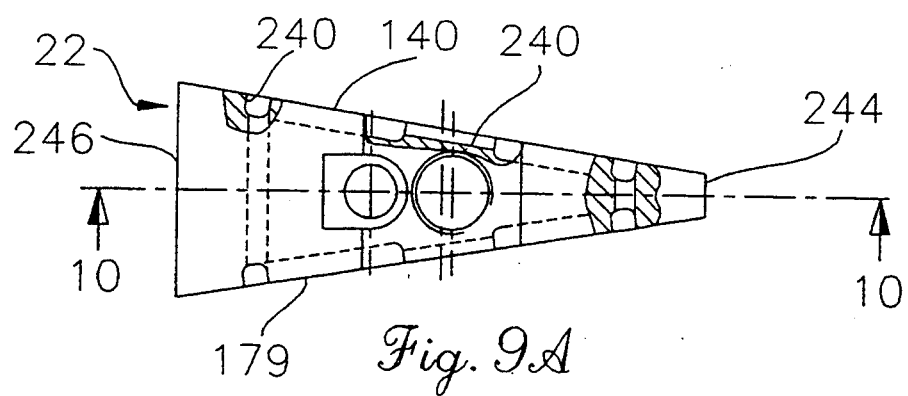
FIG. 9A is a section along lines 9A—9A in FIG. 9.
Figure 9:
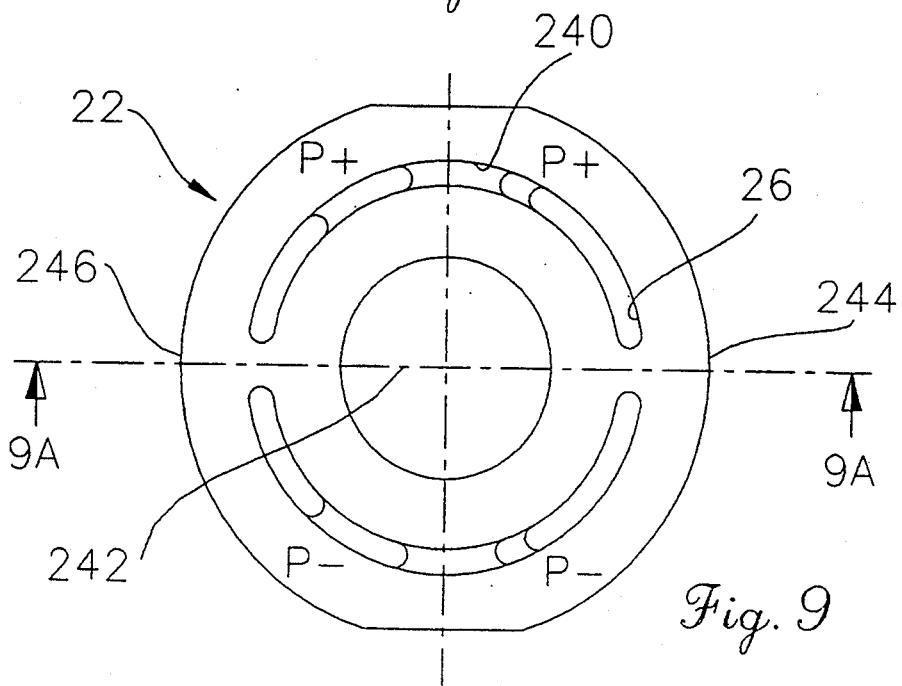

The main discharge from the pump 20 flows through the hollow core 25 of the pistons 23 and flows directly through the slippers 130 and port plate 136, into a groove 240, shown in FIG. 9, connecting the slots 26 in the high pressure P+ side of the swashplate 22. The P+ side of the swashplate is on one diametrical side of a diametrical centerline 242, running through the center of the narrow end 244 and the center of the thick end 246 of the swashplate. This P+ side of the swashplate is the side on which the pump pistons are running "uphill", that is, from the narrow end around toward the thick end. From the groove 240, the fluid passes through the slots 26 and through the ports 137 in the port plate 160 and the slippers 156 and through the hollow pistons 28 where it pressurizes the motor cylinders 38. The torque reaction load from the rotating pump pistons 25 is transmitted to the swashplate 22 as a mechanical component of torque from the pump which drives the swashplate 22 to rotate in the direction of rotation of the pump cylinder block 104. Since the swashplate 22 is mechanically coupled to the output shaft through the pivotal connection by the pivot pin 142, rotation of the swashplate drives the output shaft. In a conventional hydrostatic transmission, the pump torque would be reacted to the fixed housing of the unit and would not contribute to the output torque.

The fluid pressurized by the pump 20 displaces the motor pistons 28 toward the input side of the machine, exerting a force on the sloping side of the swashplate tending to drive the swashplate in the "uphill" direction. This produces a hydromechanical component of torque by the motor 29 on the swashplate 22 in the same direction as the pump rotation.

Thus, there is a mechanical component of torque exerted on the swashplate by the pump pistons 23 constituting the reaction torque of the pump on the swashplate 22 as the pump pistons 23 and the slippers 130 carried by the pump cylinder block 104 rotate around the swashplate, tending to drive the swashplate around with it in the same direction that the input shaft is rotating. Another component of torque exerted on the output shaft is the hydro-mechanical component exerted by the motor pistons 28 powered by hydraulic fluid pressurized by the pump pistons 23.

Figure 13:
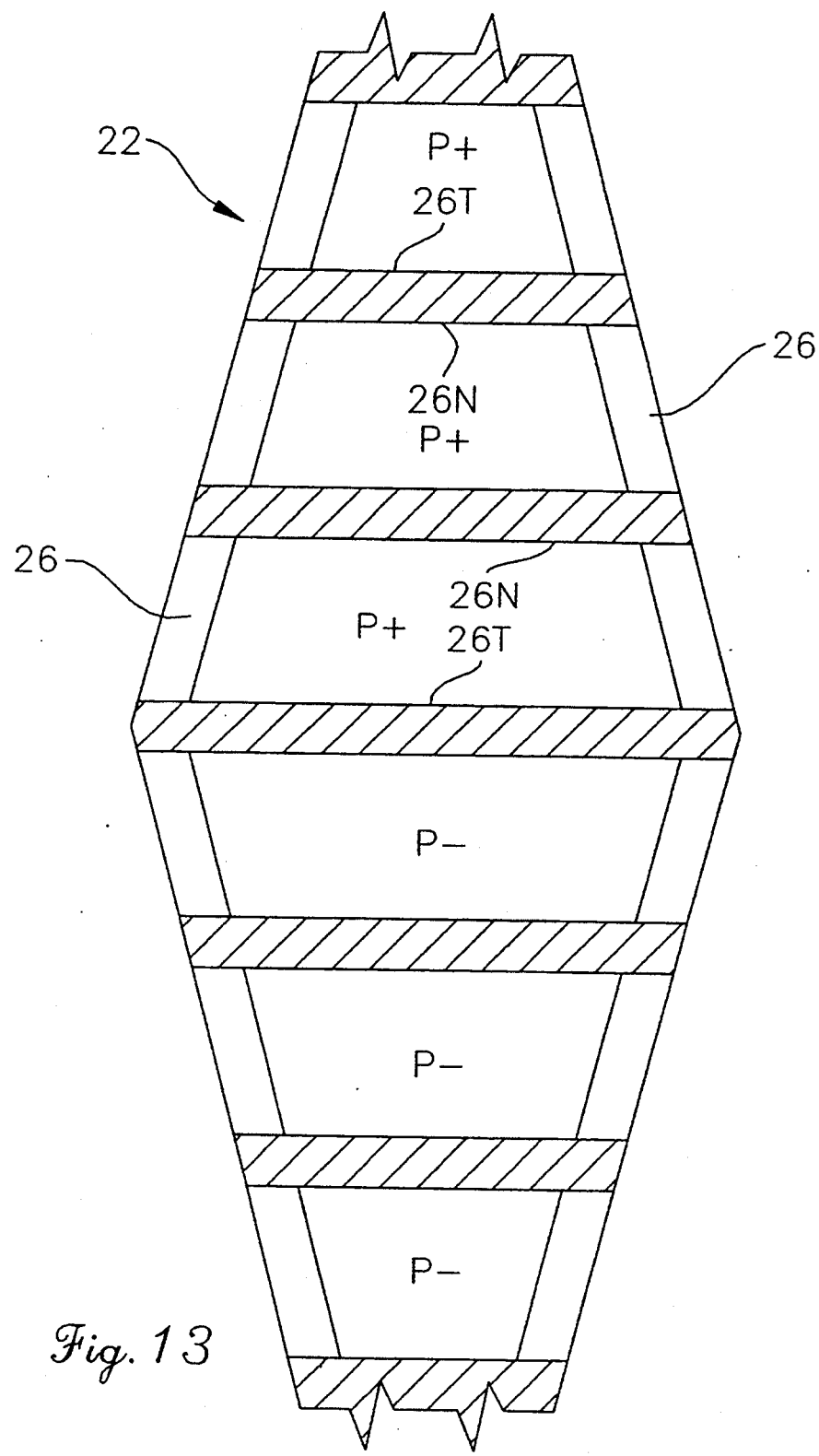
FIG. 13 is a developed view of the swashplate 22 shown in FIG. 10 along the centerline "13—13" through the slots.

A third component of torque exerted on the swashplate 22 is a pure hydraulic component exerted by the fluid pressure in the slots 26, as illustrated in FIG. 13, on the high pressure side P+ of the swashplate 22, against the circumferentially facing sides of the slots. As shown in FIG. 13, the slots are greater in area on the circumferential side 26T of the slot closer to the thicker end 246 of the swashplate 22 than on the side 26N closer to the narrow end 244, so there will be a net torque on the swashplate 22 equal to the differential area of the slots, that is, the area (26T−26N) by which the slots are greater in area on one circumferential side than on the other, multiplied by the system pressure and the mean radius of the slot from the axis 35 of the machine. This pure hydraulic component is to a small extent offset by the torque exerted on the other diametrical side P− of the swashplate against the identical differential area of the slots, but the pressure on that other diametrical side of the swashplate 22 is only at scavenge pump pressure, so it is a minor fraction of the torque in the output direction. A typical scavenge pump pressure might be 100 psi, while the system pressure would typically be on the order of 6000 psi. In a machine sized to operate in a 100 hp automobile, the differential area on the slots 26 could be on the order of 0.325 square inches, resulting in an output torque contributed by the hydraulic fluid acting on the differential area of the slots 26 of approximately 54 lb-feet per 1000 psi system pressure. This is a substantial proportion of the total torque output of the machine, amounting to as much as 80-85% of the total torque output, and it relieves the mechanical components of some of the stresses that they would otherwise have to carry to generate the same total torque output without the pure hydraulic component.

Figure 14:
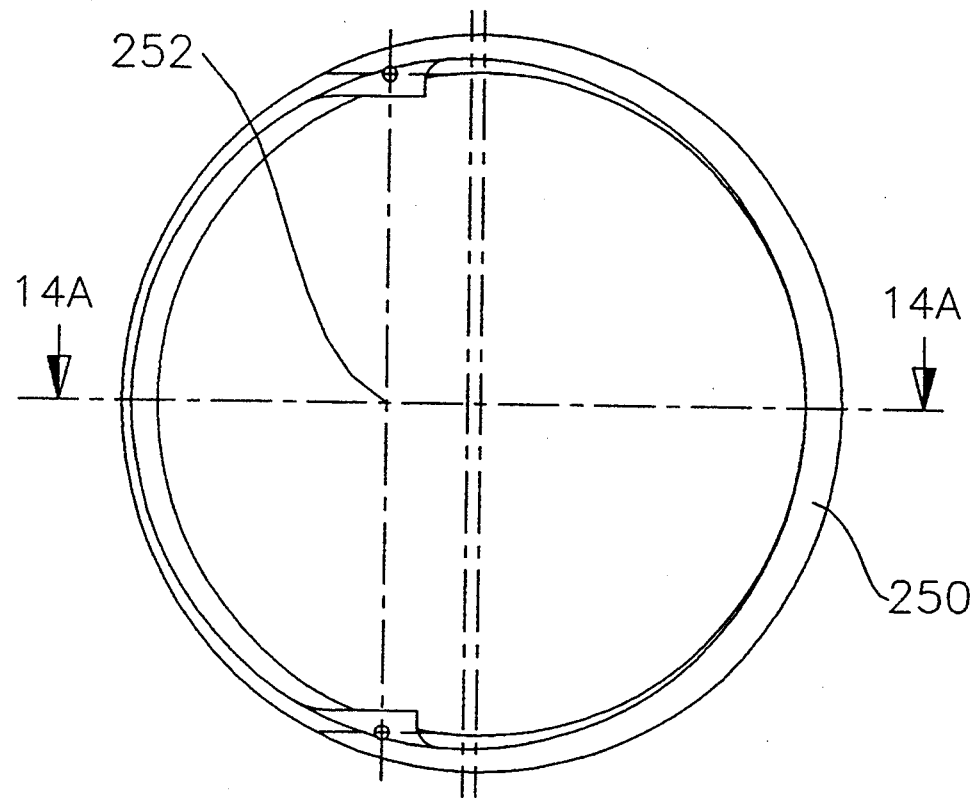
FIG. 14 is a longitudinal sectional elevation of the swashplate counterbalance 240.
Figure 14A:
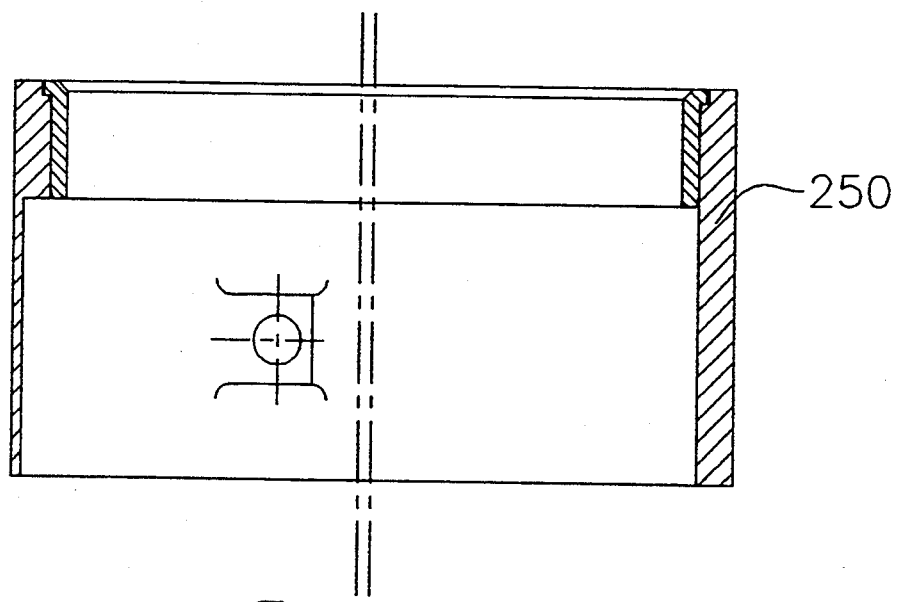
FIG. 14A is a section along lines 14A—14A in FIG. 14.

A swashplate counterbalance 250, shown in FIG. 14, has a mass equal to the mass of the swashplate, but is mounted with its center of mass 180 degrees opposite the center of mass of the swashplate 22. The eccentric mass distribution of the swashplate 22 rotating about the axis 35 would introduce an unbalanced force rotating at output shaft speed. This eccentric mass is balanced by the swashplate counterbalance 250 which is pivoted at a point 252 which represents the center of mass of the swashplate 22 and the parts connected thereto, thus assuring that the opposing equal unbalance forces will remain in a common axial plane for all swashplate angles.

Figure 15:
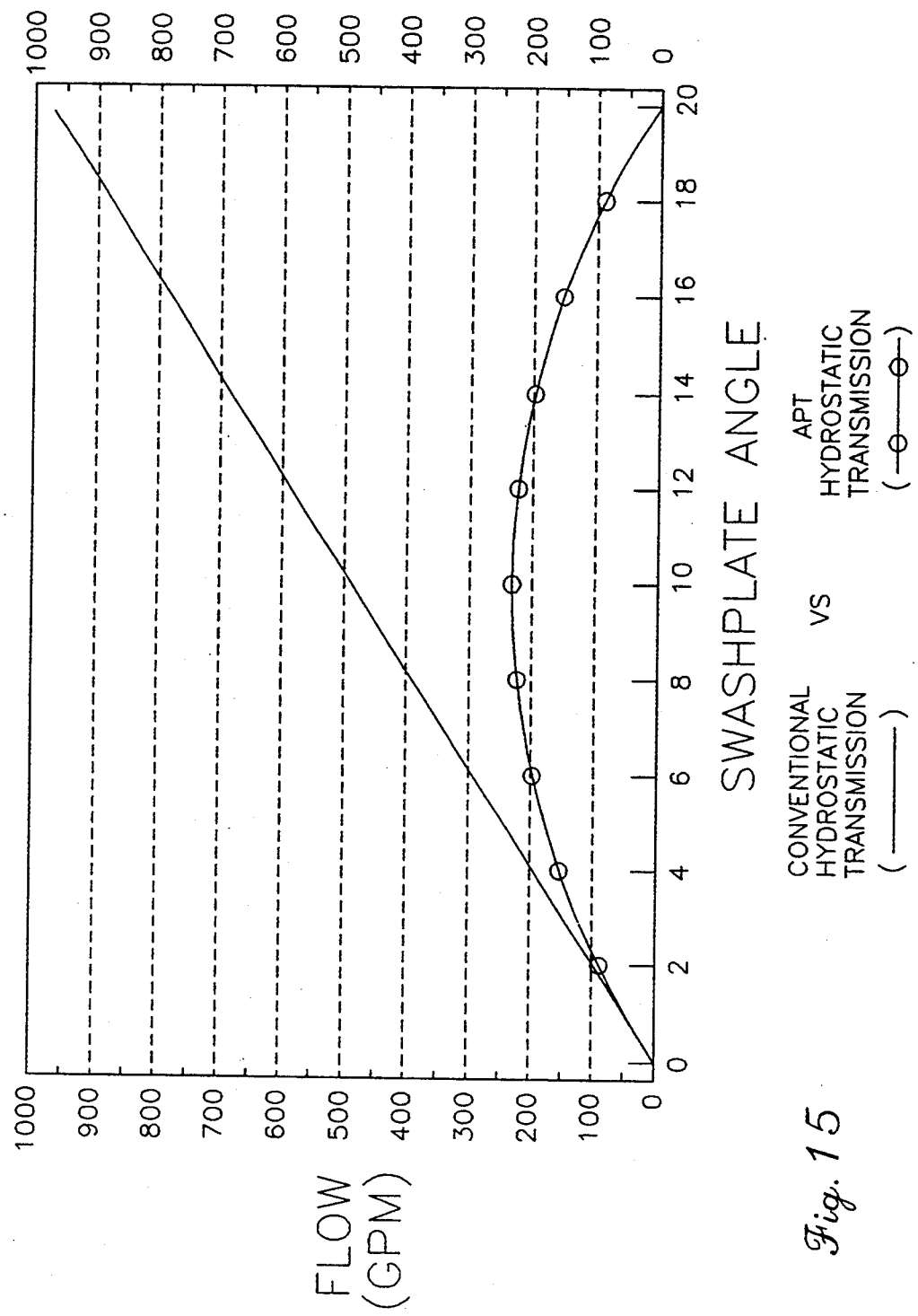
FIG. 15 is a graph showing a comparison of the fluid flow rate in a conventional hydrostatic transmission and this invention.

The fluid flow rate in this invention is compared with a conventional hydrostatic transmission in FIG. 15. In the conventional transmission, the fluid flow rate, illustrated by the straight diagonal line, increases linearly as output speed increases so that, at the highest transmission ratio, the fluid flow rate is maximum. This is a major disadvantage of conventional hydrostatic transmissions and is a principal reason that they have not been used in production automobiles. At high flow rates, the fluid flow losses are at their maximum and the annoying hydrostatic whine is also at a maximum.

The flow rate in this invention reaches a maximum at the intermediate position of the swashplate, and that maximum is only one fourth of the maximum flow rate of a conventional hydrostatic transmission. The flow rate is low because the pumping rate of the pump is a function of its speed relative to the swashplate, but the swashplate is rotating about the axis 35 in the same direction as the pump is rotating, so their speeds are subtracted to get the relative speed of the pump. The higher flow is not needed to obtain the same torque on the swashplate because of the mechanical component of torque contributed by the pump. At the higher relative speed of the pump around the swashplate, the flow rate is low because the shallow angle of the swashplate produces very little displacement in the pump.

Figure 1A:
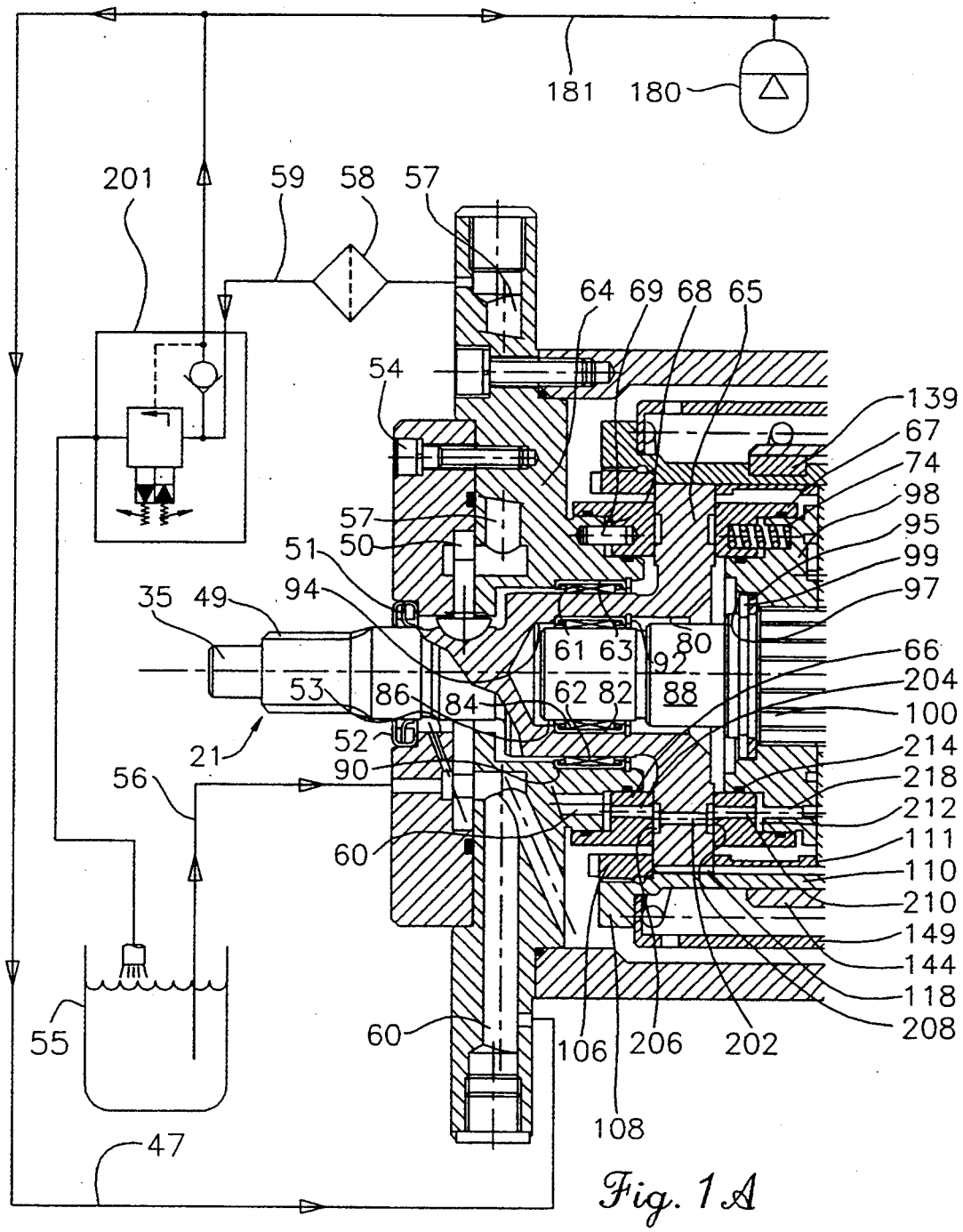
FIG. 1A is an enlarged sectional elevation of the left hand portion of the hydrostatic transmission shown in FIG. 1.
Figure 1B:
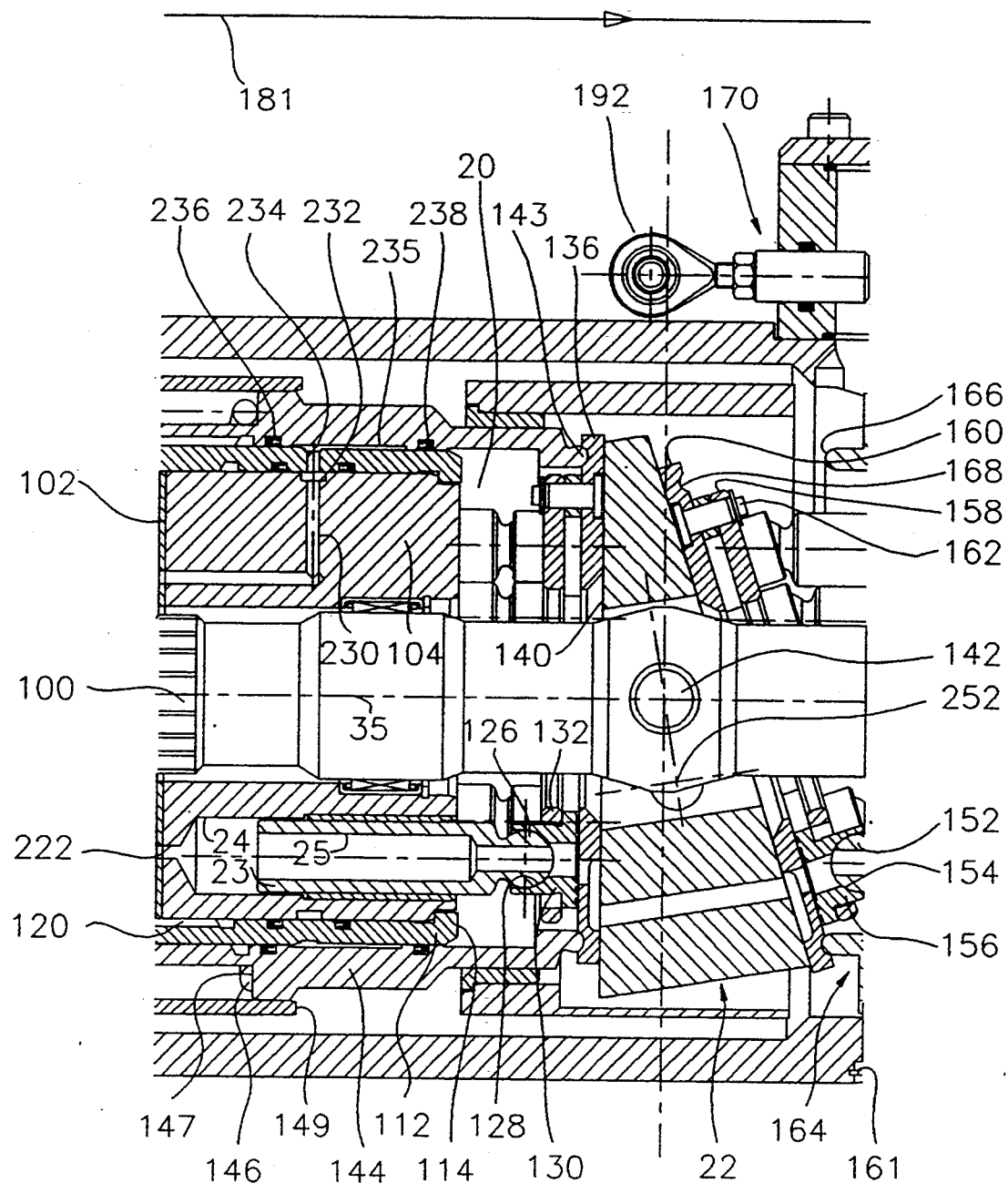
FIG. 1B is an enlarged sectional elevation of the central portion of the hydrostatic transmission shown in FIG. 1.
Figure 1C:
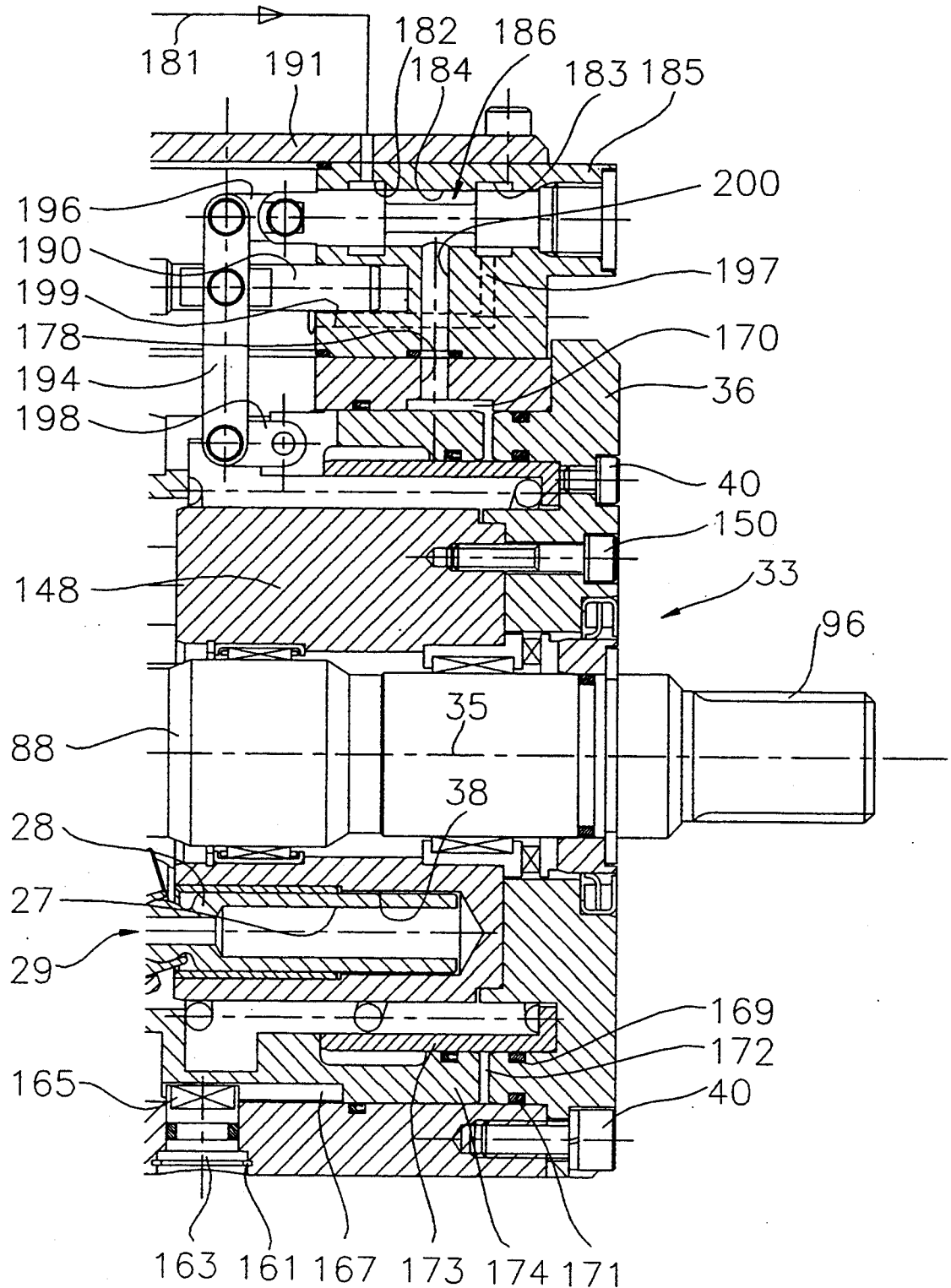
FIG. 1C is an enlarged sectional elevation of the right hand portion of the hydrostatic transmission shown in FIG. 1.
Figure 2B:
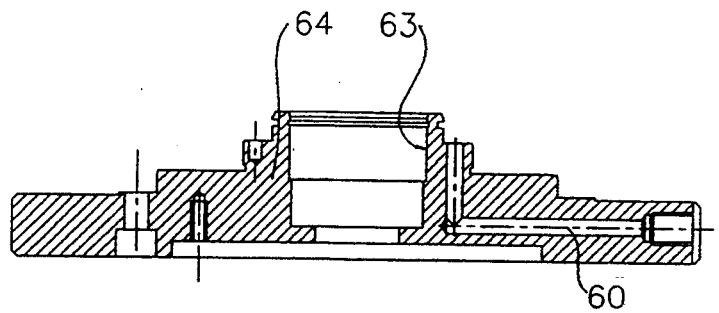
FIG. 2B is a section along lines 2B—2B in FIG. 2.
Figure 2:
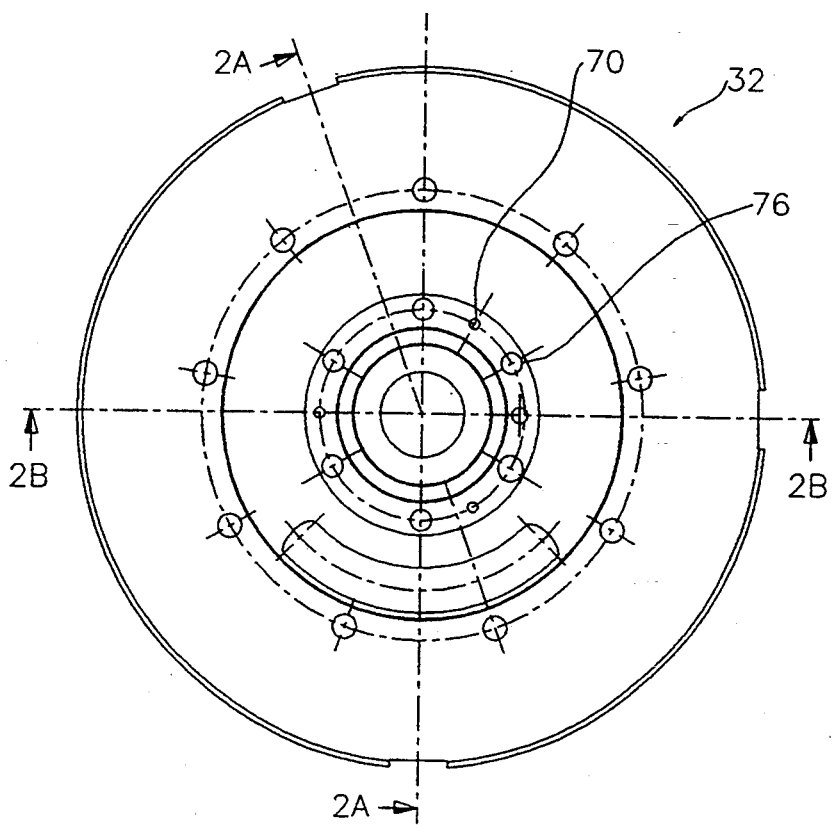
Figure 2A:
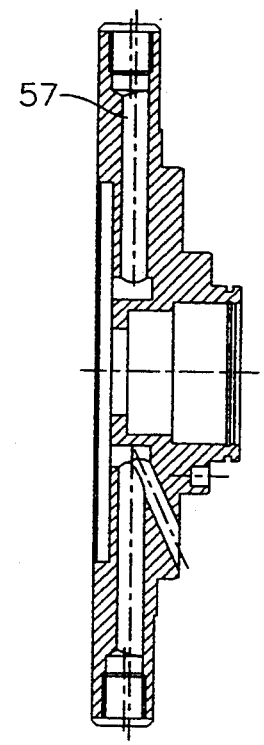
FIG. 2A is a section along lines 2A—2A in FIG. 2.
Figure 16:
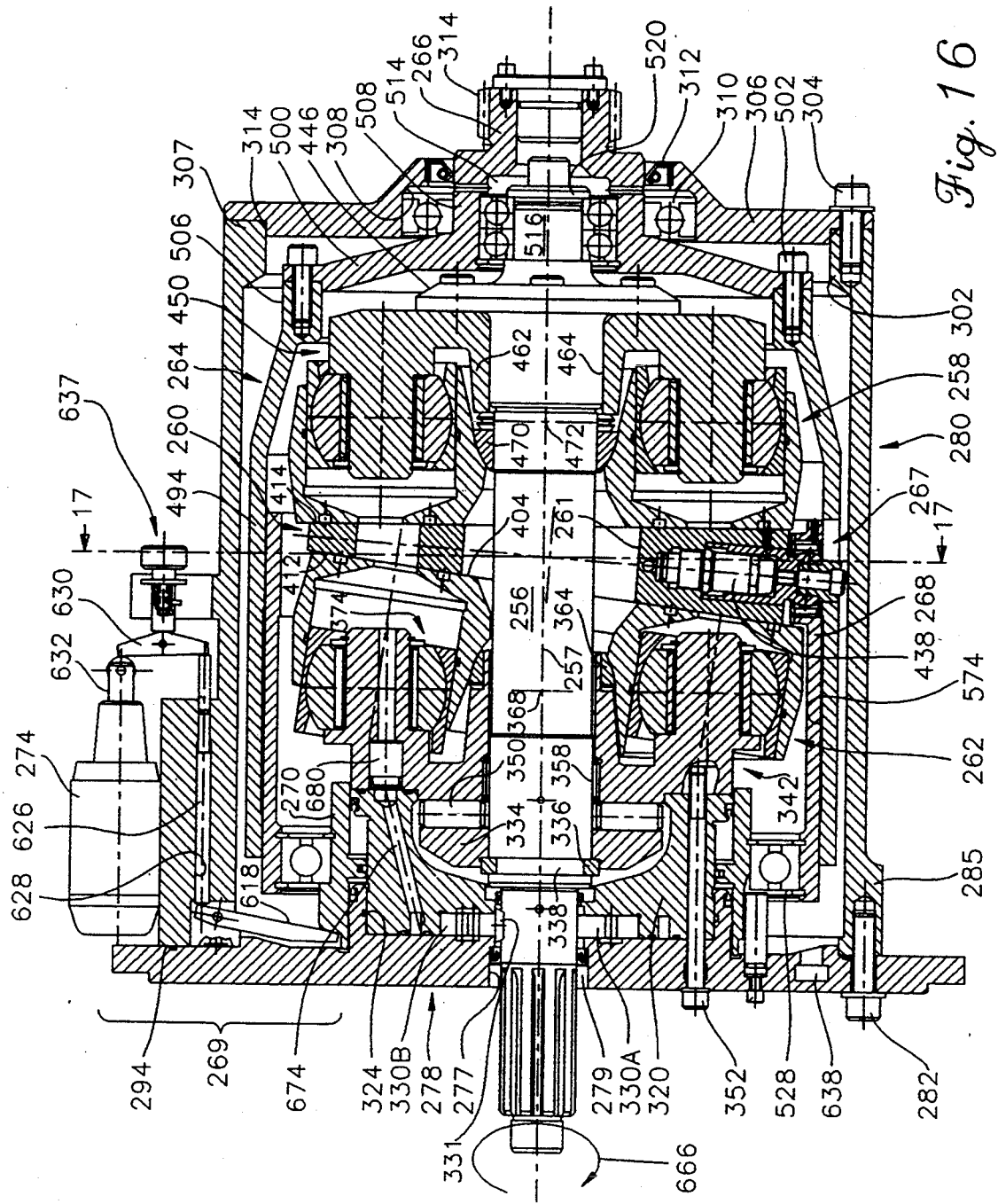
FIG. 16 is a cross-sectional elevation of a second embodiment of a hydrostatic transmission made according to the invention.

Turning now to FIG. 16, a second embodiment of the invention is shown which accomplishes the objects of the invention with a lower part count, a more compact design, lower production cost, and reduced frictional losses compared to the embodiment shown in FIGS. 1A-1C. The second embodiment will be described in the orientation shown in FIG. 16, and orientation language such as top, bottom, front, rear, inside and outside will be with respect to the orientation shown in FIG. 16. Of course, it will be understood that these orientation references are merely for the sake of convenience in describing the machine and are not to be taken in any limiting sense.

The second embodiment was designed for use in trucks and buses which are normally designed to have a longer component life than components for automobiles. Accordingly, the relative dimensions of the components in the second embodiment are designed for lower fluid pressure and longer component life. However, the design of the second embodiment could be modified to decrease its overall dimensions, and increase the operating system pressure of the fluid to achieve a higher specific power capacity at the expense of somewhat reduced service life.

The description of this embodiment will begin with an overall top level operation description, as was done for the embodiment of FIGS. 1A-1C, and then a detailed description of parts and their functions will follow.

The second embodiment of the invention is, like the first embodiment, a continuously variable transmission for transmitting power from, for example, a prime mover, to a system which utilizes rotational power at varying speeds. The second embodiment can produce rotational power at an output at speeds varying from zero to the speed of the input power source.

The continuously variable transmission of the second embodiment includes a housing 254 in which is mounted an input shaft 256 for rotation about a longitudinal axis 257. A pump 258 is coupled to the input shaft 256 and is engaged with a pump-side face of a wedge shaped annular swashplate 260. The input shaft 256 passes through a central axial opening 261 through the swashplate. A motor 262 is engaged with a motor-side face of the swashplate on the axial side thereof opposite the pump. When the face of the swashplate 260 in contact with the pump 258 is oriented at an oblique angle to the longitudinal axis 257 (not as shown in FIG. 16) rotation of the pump 258 around the swashplate 260 operates the pump to pressurize fluid contained in the pump cylinders. The pressurized fluid flows into one of two kidney shaped slots in the swashplate 260 and is conveyed through the slot into a motor 262 which is grounded to the housing 254. The pressurized fluid in the motor generates an axial force in against the swashplate, in opposition to the force exerted by the pump 258, to exert a torque on the swashplate 260 in the same direction as the reaction torque exerted by the pump 258 turning against the swashplate in the direction of the input shaft. In addition, the fluid pressure generated by the pump exerts a pure hydraulic component of torque on the differential area of the ends of the slot in the swashplate 260 in the same manner as that previously described in connection with the first embodiment of FIGS. 1A-1C.

Figure 17:
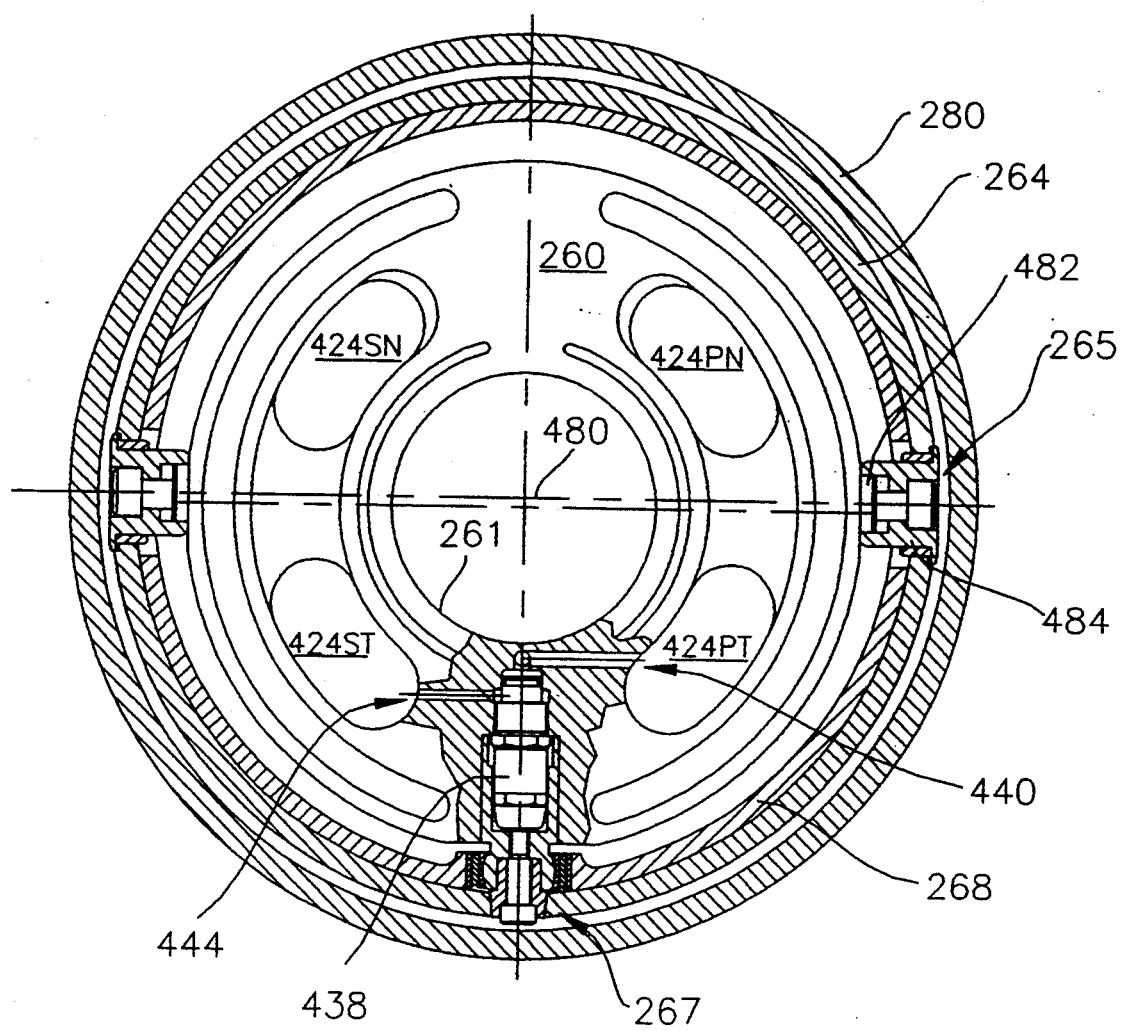
FIG. 17 is a sectional elevation along lines 17—17 of FIG. 16.

The swashplate 260 is coupled to an output sleeve 264 by a pair of drive pin assemblies 265, shown in FIG. 17, by which the swashplate drives the output sleeve 264 to rotate about the longitudinal axis 257. The output sleeve is connected to a flange of an output shaft 266 by which output torque is transmitted to the output shaft 266.

The angle of the swashplate 260 with respect to the longitudinal axis 257 is controlled by a swashplate angle control system including a control sleeve 268 and a follower valve system 269. The control sleeve 268 is coupled to the swashplate 260 by a coupling mechanism 267 at the forward end of the control sleeve 268, so axial movement of the control sleeve 268 will tilt the swashplate about the axis through the drive pin assemblies 265. The follower valve system 269 includes a control cylinder 270 linked to a spool valve 274. The control sleeve 268 is coupled to the control cylinder 270 by a bearing 276. The follower valve system 269 is effective to position the control cylinder 270 at any desired position which, by virtue of the coupling between the control sleeve and the control cylinder 270, positions the control sleeve 268 at any desired position and thereby achieves angle control of the swashplate 260 about an axis through the drive pin assemblies 265.

The input shaft 256 extends into the housing 254 through an axial bore 277 in a mounting flange 278 at the input or left hand end of the housing 254, and is sealed against leakage of oil between the bore 277 and the rotating input shaft 256 by an oil seal 279 in the mounting flange 278. The mounting flange 278 shown in FIGS. 18, 19 and 20, is fastened to a main cylindrical body 280 of the housing by a series of machine screws 282 extending through holes 284 in the flange and threaded into tapped holes in a thickened rear end rim 285 in the main cylindrical body 280. The mounting flange 278 is sealed to the cylindrical body 280 by a circumferential o-ring seal lying in a circumferential groove 286 just inside of the ring of holes 284 through the mounting flange 278.

Figure 21:
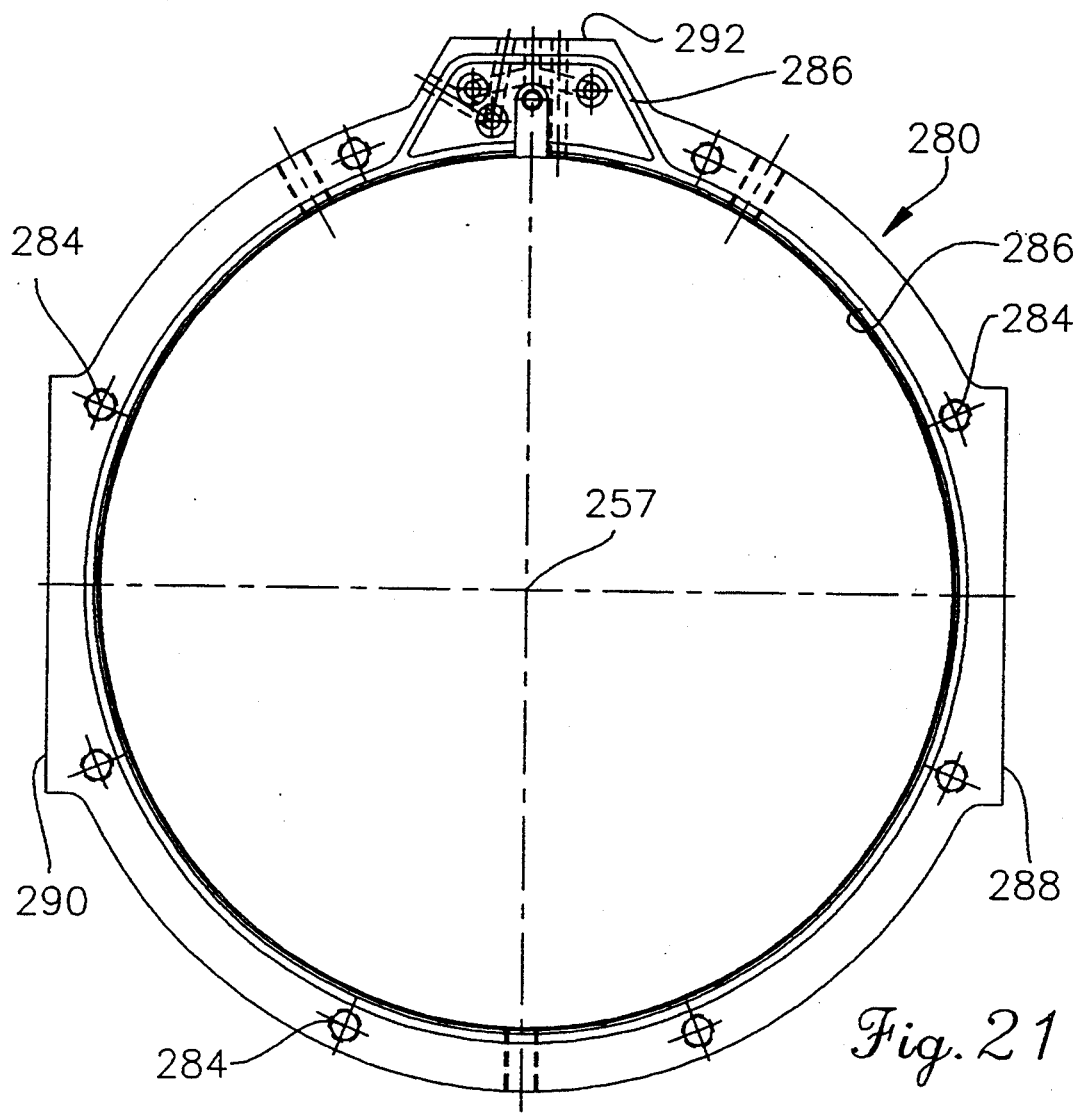
FIG. 21 is an end elevation of the left-hand end of a main housing body shown in FIG. 16.

The cylindrical body 280, shown in FIG. 21, has a pair of flat lands 288 and 290 on the two opposite sides of the cylindrical body for mounting on a supporting structure or for mounting another accessory structure to the transmission. The flat lands 288 and 290 both have a series of four holes drilled and tapped into them by which the transmission housing can be secured to the supporting structure can be secured to the transmission housing or the other structure can be attached. A flat top boss 292 is located on top of the cylindrical body 280 and has a front end 294 which is flush with the flat plane of the front of the cylindrical body 280. The groove 286 for the sealing o-ring between the mounting flange 278 and the cylindrical body 280 follows the outside profile of the boss 292, as shown most clearly in FIG. 22, to enclose the interface between the front end 294 of the boss 292 and the mounting flange 278.

The top surface of the boss 292 has four holes drilled into the surface, extending part way into the boss 292, and the holes are tapped to receive screws 298 to hold a spool valve 274 in place on top of the boss 292. A series of passages is drilled into the top of the boss to interconnect with the front face of the boss and provide fluid flow passages which connect with the interior of the spool valve 274 in a manner to be described below.

The main cylindrical body 280 of the housing 254 is thickened at the output end, as shown in FIG. 16, to provide a thickened rim 302 into which a series of holes are drilled and tapped to receive screws 304 to hold an end cap 306 in place on the main cylindrical body 280. A bearing pocket 308 in the end cap 306 holds a bearing 310 for supporting the output shaft 266, which extends through an opening 311 in the end cap 306. An oil seal 312 is seated in the opening 311 for preventing leakage of oil between the output shaft 266 and the opening 311. The end of the output shaft 266 is splined at 314 to provide means for connecting the output shaft to a mechanism to which the output torque from the transmission is to be transmitted.

The inside outer edge of the thickened rim 302 is beveled and captures an o-ring seal 314 between it and the corner of a cylindrical rabbet 307 on the end cap 306 to seal the end cap 306 to the main cylindrical body 280. The rabbet 307 centers the end cap 306 on the cylindrical body 280 during assembly.

A cylindrical ring 318, having a forwardly facing axial end surface 319 shown in FIG. 18, projects forwardly from the inside surface of the mounting flange 278 coaxially about the longitudinal axis 257 and receives with a snug fit a cylindrical charge pump housing 320 shown in FIG. 23. An annular grove 322 is machined in the inside surface of the cylindrical ring 318 to receive an o-ring seal 324 by which the charge pump housing 320 is sealed in the cylindrical ring 318. A bore 326 extending axially through the charge pump housing 320 receives the input shaft, and a cylindrical recess 328 communicating with bore 326 on the input side of the charge pump housing 320 receives a charge pump 330 of the gear rotor variety for providing a fluid under pressure for control and lubrication purposes. The charge pump includes an inner rotor 330A keyed to the input shaft 256 by a key 331 and an outer rotor 330B nested in cylindrical recesses 328 in the charge pump housing 320. These rotors coact to pressurize fluid which is distributed through a fluid distribution system to be described below.

An inwardly opening cavity 332 in the charge pump housing 320, shown in FIGS. 24 and 25, receives a thrust ring 334 mounted on the input shaft 256. An ample clearance is provided between the thrust ring 334 and the wall of the cavity 332 so that the thrust ring may rotate freely within the cavity without contacting the cavity walls. Two c-segments of a segmented ring 336 fit into a groove 338 in the input shaft 256 to transfer the thrust load from the input shaft 256 to the thrust ring 334, in a load path to be described below. The two semicircular c-rings of the retaining ring 336 are captured and retained in the groove 338 by a recess 339 in the rear surface of the thrust ring 344 when the thrust ring 334 is slid down the shaft 256 and over the two c-rings to hold them in the groove 338 and prevent them from flying radially outward under centrifugal force.

Figure 26:
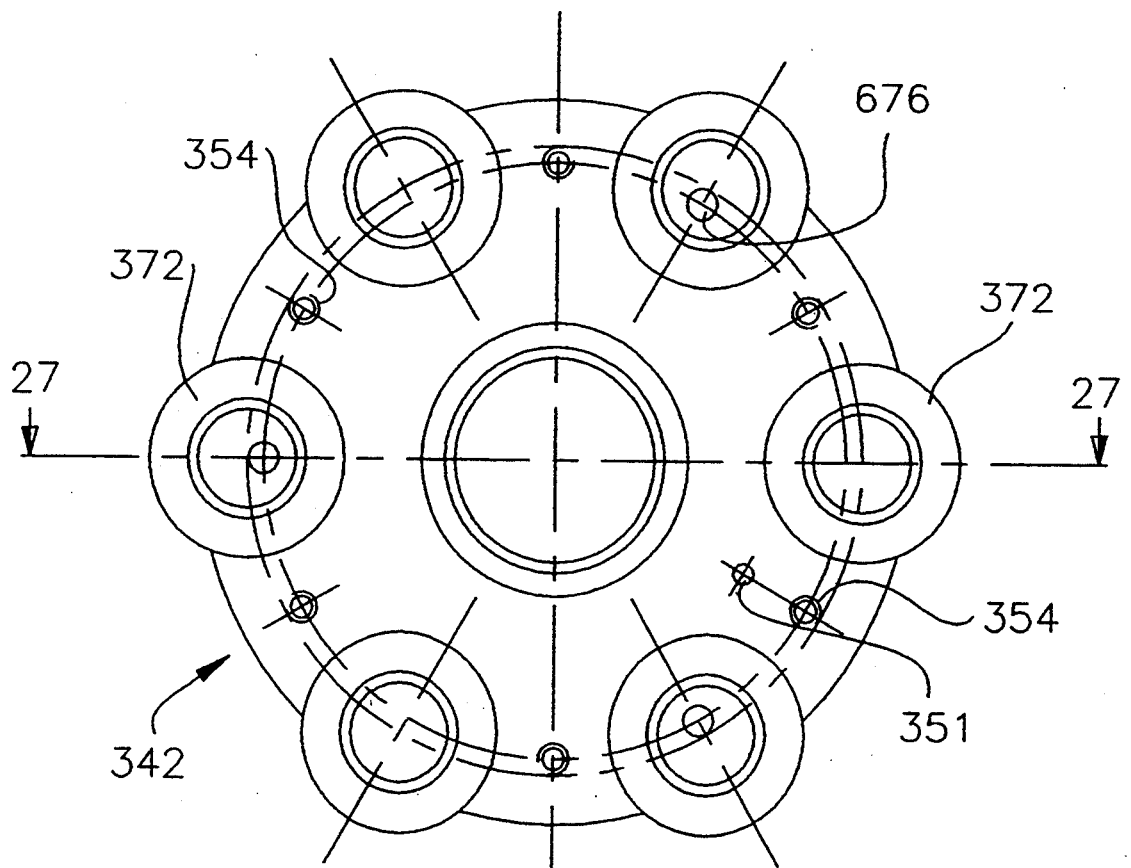
FIG. 26 is an end elevation of the forwardly facing side of a motor piston carrier shown in FIG. 16.
Figure 27:
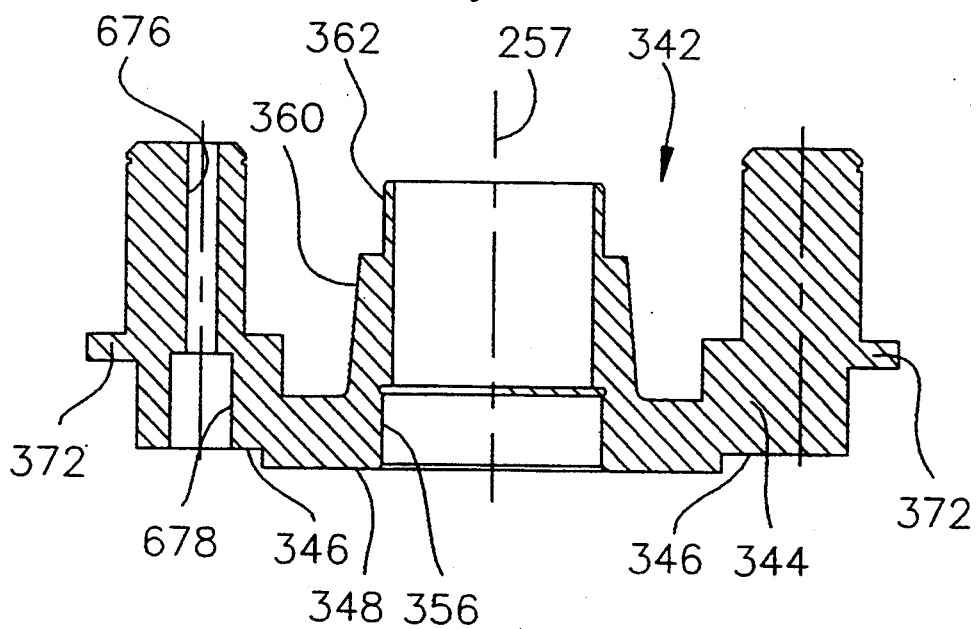
FIG. 27 is a sectional elevation of the motor piston carrier along lines 27—27 in FIG. 26.

The inner end of the charge pump housing 320 is enlarged to provide a plinth 340 having a flat axially facing forward surface 341 on which a motor piston carrier 342 is mounted. The motor piston carrier 342, shown in FIGS. 26 and 27, has a flat base 344 in which an annular rabbet 346 is machined to receive the plinth 340 and to center the motor piston carrier 342 concentrically about the longitudinal axis 257 when it is assembled to the plinth 340. A rearwardly facing surface 348 of the flat base 344 is ground smooth and flat to provide a race against which a thrust bearing 350 may run between the flat base 344 and the thrust ring 334. A hole 351 through the flat base 344 of the piston carrier 342 bleeds the cavity 332 so that lubrication and cooling oil pumped through a hole 349 in the input shaft 256, from an axial fluid flow channel in the input shaft 256, may flow freely over and around the thrust bearing 350 and then out through the hole 351.

A series of bolts 352 extend through aligned holes in the mounting flange 278 and the charge pump housing 320, and are threaded into aligned holes 354 in the motor piston carrier. 342 to secure the charge pump housing 320 and the motor piston carrier 342 in place against the mounting flange 278.

An axial bore 355 extends through the motor piston carrier 342. The input shaft 256 extends through the bore 355 and is supported radially on a needle bearing 358 mounted in a shallow cylindrical counter bore in the base 344 of the motor piston carrier 342. A central tube 360 projects from the flat base 344 of the motor piston carrier 342 and has a cylindrical recess 362 at its forward end to receive a spherical bearing 364 to guide a motor cylinder block 366 for nutating motion about a center of rotation 368 which coincides with the spherical center of the spherical bearing 364.

A series of mounting posts 370, each having an axially extending axis, is part of and projects forward from the flat base 344 of the motor piston carrier 342. A circular flange 372 surrounds each mounting post 370 to engage and axially support a spherical bushing assembly 374 which sits on each of the mounting posts 370. The spherical bushing assemblies, shown most clearly in FIG. 28, each include a spherical bushing 376 and a metal sleeve 378 which fits snugly onto its mounting post 370. An elastomeric sleeve 380 is bonded between the spherical bushing 376 and the metal sleeve 378. A piston 382 is swivelingly mounted on the spherical bushing 376. The piston 382 has a internal spherical cavity 384 and a flat front end 386. The piston 382 has a rearwardly depending skirt 388 in the interior surface of which is machined a cylindrical relief 390 and extending from the point of the maximum diameter of the internal spherical cavity 384 which is approximately midway down the length of the piston, all the way to the rear end of the piston 382. The lateral width of the cylindrical relief 390 is just slightly wider than the axial length of the spherical bushing assembly 374, so that the spherical bushing assembly 374 may be assembled to the piston 382 by orienting the axis of the spherical bushing assembly 90° to the axis of the piston, and inserting the spherical bushing assembly 374 up into the piston through the cylindrical relief 390. When the spherical bushing contacts the inside surface of the internal spherical cavity 384, the axis of the spherical bushing assembly is rotated to orient its axis to coincide with the axis of the piston 382.

Figure 28:
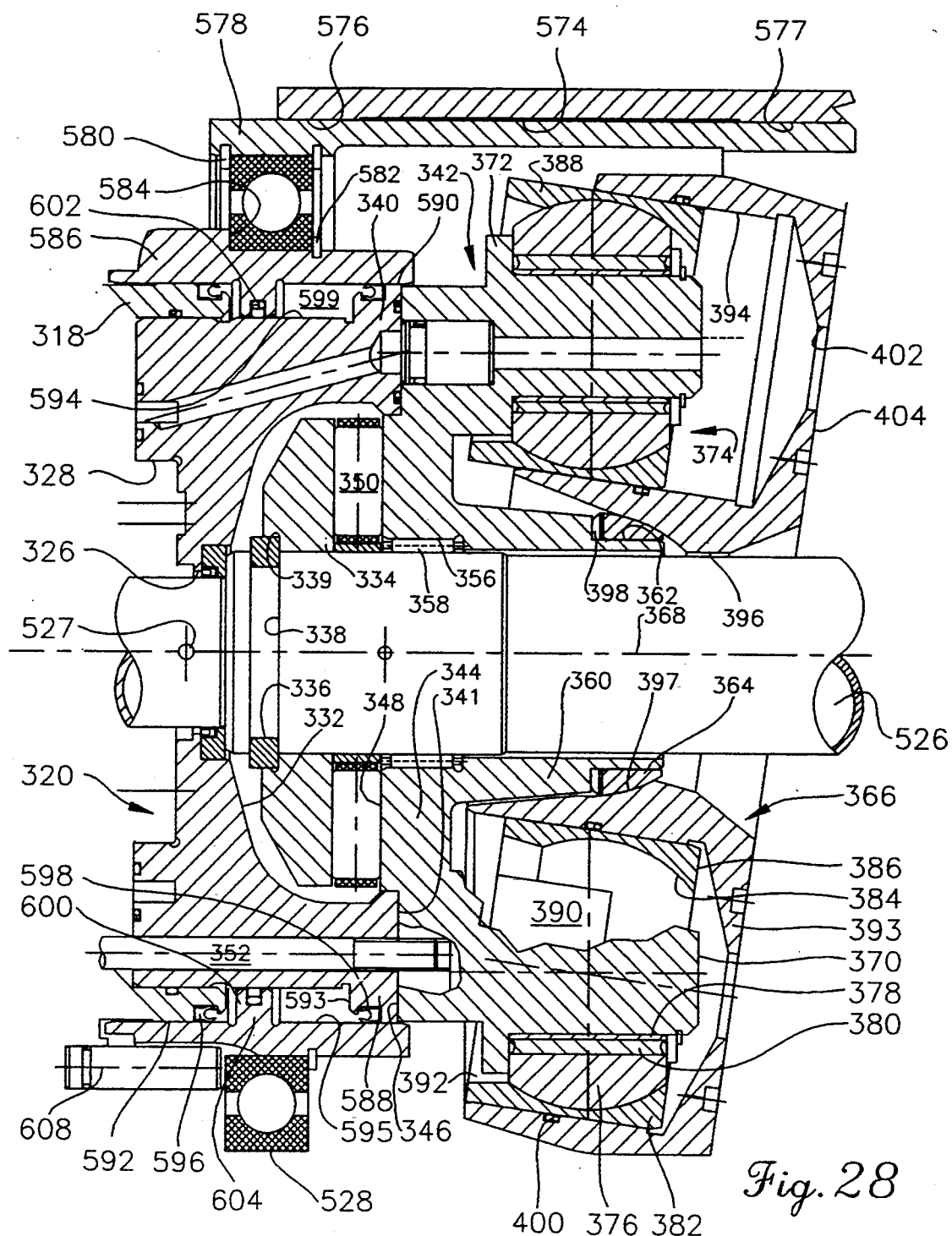
FIG. 28 is an enlarged sectional elevation of the motor shown in FIG. 16.

The internal spherical cavity 384 of the piston 382 is flared at 392 adjacent its rear end to provide clearance for the piston at its most extreme angle of tilt, as shown in FIG. 28, to prevent it from interfering with the piston mounting post 370 at the maximum tilt angle of the piston 382 as shown in FIG. 16.

Figure 29:
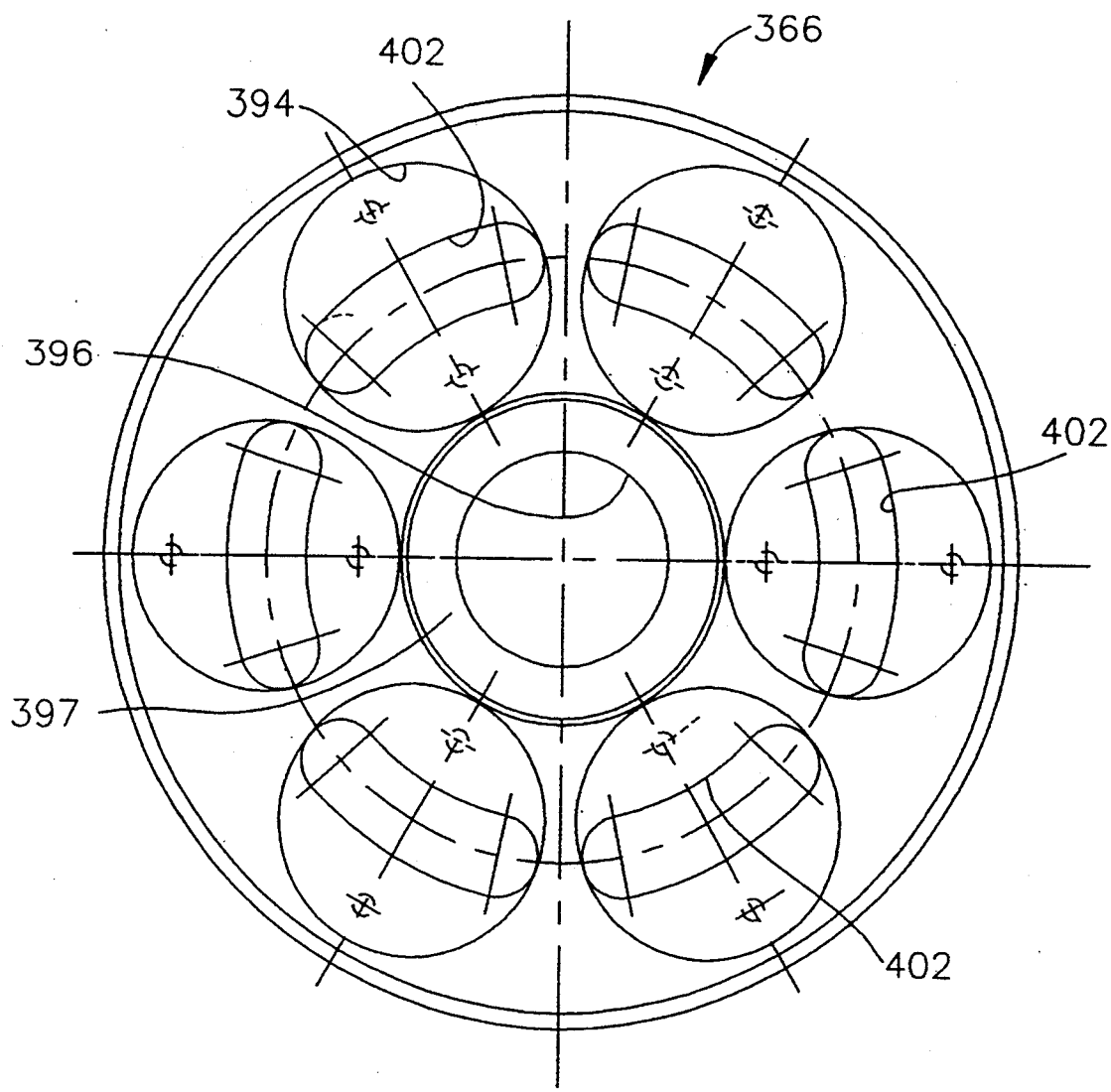
FIG. 29 is an end elevation of the cylinder blocks for the pump and motor shown in FIG. 16.

The motor cylinder block 366 shown in FIG. 29 is an annular cylindrical unitary structure having a front well 393 and six equally spaced cylinders 394 bored into the back side of the structure. The cylinders 394 open rearwardly in the cylinder block 366 therein to receive the six pistons 382 mounted on the spherical bushing assemblies 374 on the mounting posts 370. A central opening 396 is provided through which the input shaft passes. The central opening 396 is tapered from adjacent the axial center of the cylinder block 366 forwardly and rearwardly to provide clearance so that the cylinder block does not contact the output shaft or the central tube 360 of the motor piston carrier 342 as the cylinder block 366 nutates about the center of rotation 368 in operation. The tapering opening 396 in the region in which it contacts the spherical bearing 362 is ground with a spherical profile to provide a bearing race 397 which slides smoothly on the spherical bearing 364. A wavy washer spring 398 is provided between the spherical bearing 364 and the shoulder of the recess 362 in which the bearing 364 is seated to provide a forward bias force against the bearing 364 and hence against the motor cylinder block 366 to urge the motor cylinder block against the motor-side face 412 of the swashplate 260.

An annular groove 400 in the wall of each cylinder 394 contains a sliding seal for sealing the piston 392 in the cylinder and minimizing leakage of fluid under pressure from the cylinder out between the cylinder and the piston 392, while permitting a small degree of leakage to ensure lubrication between the piston and the cylinder wall. The piston wall thickness is held to a fairly thin dimension to prevent excessive fluid pressure force from acting on the piston 382 and forcing it axially against the cylindrical bushing 376. The dimension of the piston wall thickness is selected to provide an optimum tradeoff between a large axial force acting on the piston which would tend to seal it tightly against the bushing 376 but would increase the interfacial pressure between the spherical cavity 384 of piston and the bushing 376 which would tend to minimize the thickness of the lubricant layer and thereby possibly increase wear. A thinner piston wall thickness would decrease the interfacial pressure between the piston and the bushing, but would permit a greater degree of leakage between the two parts. By selecting the thickness of the piston wall, it is possible to select an optimal axial force for a given fluid pressure and piston diameter that will give adequate lubrication film thickness without excessive fluid leakage between the piston and the bushing.

As shown in FIG. 29, a kidney shaped port 402 through the front wall 393 in each cylinder 394 communicates between the front face 404 of the motor cylinder block 366 and the cylinder 394. The kidney shaped ports 402 in the motor cylinder block 366 lie on a circular center line about the longitudinal axis 257 (when the front face 404 of the motor cylinder block is normal to the axis 257) and the kidney shaped ports 402 overlap a pair of diametrically opposed kidney shaped slots 406 in the swashplate 260.

A pair of shallow circular recesses 408 are cut into the front face 404 of the motor cylinder block 366 on a radial center line bisecting each of the kidney shaped ports 402. Each of the shallow circular lubrication recesses 408 communicates with the cylinder 394 by way of a narrow passage 410 which permits fluid, under pressure to flow from the cylinder 394 into the recesses 408 to provide a lubrication film and hydrostatically float the motor cylinder block on the face of the swashplate 260.

The swashplate 260, shown in FIGS. 30–33, has a motor-side face 412 facing the motor 262, and a pump-side face 414 facing the pump 258. The motor-side face 412 and the pump-side face 414 are at an oblique angle, producing a wedge shaped swashplate 260 having a peripheral edge 416 which is relatively narrow on one side 418 and relatively thicker on the diametrically opposite side 420. The slots 406 in the swashplate 260 extend from adjacent the narrow side 418 on a circular centerline 407 around to adjacent the thick side 420 and thus are disposed on the! ramp sides of the swashplate. That is, when following the circular centerline 407 through the kidney shaped slots 406, the swashplate becomes progressively thicker or progressively thinner as one proceeds around one kidney shaped slot and then around the other kidney shaped slot. In this way, relative angular translation of any one particular cylinder 394 and its captured piston 382, angularly around the swashplate will be "uphill." along the swashplate for the length of one slot and "downhill" on the swashplate for the length of the other slot. "Uphill" means that the swashplate becomes thicker as the cylinder rotates from the narrow side 418 of the swashplate toward the thick side 420 and "downhill" means that the swashplate becomes thinner as the cylinder rotates from the thick side 420 of the swashplate toward the narrow side 418. Relative movement of a cylinder and piston around the swashplate in the uphill direction drives the cylinder block over the piston towards the piston carrier and reduces the open volume of the cylinder 394 to pressurize the fluid in the cylinder as the piston translates into the cylinder. Likewise, translation of the cylinder toward the swashplate and away from the piston expands the open volume within the cylinder 394 as the piston retracts out of the cylinder to suck fluid into the cylinder in preparation for the next stroke.

The slots 406P and 406S in the swashplate 260 are mirror images of each other on both side of a vertical longitudinal plane 421, lying along the longitudinal axis 257 and bisecting the swashplate into two symmetrical halves through the top of the swashplate at its narrowest dimension, and the bottom of the swashplate at its thickest dimension. Therefore, a description of one slot 406P will also constitute the description of its mirror image 406S, except as noted. The slot 406P includes two kidney-shaped ports 424, one at each end of the slot 406P and extending completely through the swashplate and communicating between the two faces 412 and 414. A web 426 in the center between the ports 424 provides a structural connecting between the radially separated sides of the slot 406P in line with the boss 482 for structural integrity. The slots 406 are aligned with the kidney shaped ports 402 in the cylinder block 366 to provide for fluid communication between the cylinders 294 and the slots 406 in the swashplate 260. Thus, the fluid pressurized in the cylinders 394 of the pump can communicate through the overlapping kidney shaped slots 406 in the swashplate and the kidney shaped slots 402 in the motor cylinder block with the cylinder 394M of the motor.

A pair of lubrication distribution grooves is machined in each face of the swashplate 260. The grooves are the same on both faces of the swashplate, and are mirror images of each other on the right and left hand sides of the swashplate, on opposite sides of the longitudinal vertical plane 421, on each face. Therefore, one set of grooves will be described, with the understanding that the other three sets of grooves will be identical. The grooves are on circular center lines, the outer one 428 of which is radially outside of the kidney shaped slots 406.

Both grooves are quite shallow, typically on the order of 0.025 inch deep, and extend around the swashplate symmetrically with respect to the longitudinal vertical plane about 150°. The inner groove 430 also extends about 150° but is considerably more narrow than the outer lubrication distribution groove 428. Both are of the same depth, typically 0.025", and are for the same purpose, namely to provide a lubricating fluid film to support the cylinder block for movement over the face of the swashplate.

The grooves 428 and 430 align with the shallow cylindrical lubrication recesses 408 and 409 respectively and are pressurized by the fluid pressurized in the cylinders of the pump and motor. Thus, a film of pressurized fluid is provided over and around the grooves 428 and 430 to assist in floating the motor cylinder block 366 and the pump cylinder block 422. The pressure of the supporting fluid film matches the axial pressure exerted by the cylinder block against the swashplate since the source of the pressurized fluid pumped into the grooves 428 and 430 is the fluid in the cylinders 394 which exerts the fluid pressure on the cylinder blocks. The pressure of the lubricating fluid film tends to be self regulating by virtue of the narrow dimensions of the passages 410 and 411 extending from the interior of the cylinder to the lubrication recesses 408 and 409. When the film is too thick, the space between the flat face of the cylinder block and the flat face of the swashplate increases and allows the fluid in the film to flow out of the interface between the swashplate and the cylinder block, thus increasing the fluid flow through the passages 410 and 411 and increasing the pressure drop across the passage thereby decreasing the pressure in the fluid film. This allows the fluid film to decrease in thickness and the cylinder block to resume its designed position distance! from the face of the swashplate. When the fluid film between the cylinder block and the swashplate becomes thinner than designed, the fluid flow away from the film decreases and the fluid flow through the passages 410 and 411 decreases, which decreases the pressure drop across the passage 410 and 411 allowing the pressure in the fluid film to increase closer to the system pressure, thereby increasing the fluid pressure in the interface between the cylinder block and the swashplate. Since the pressure of the lubricating fluid film is determined primarily by the pressure in the cylinder opposite the film, therefore the lubricating film pressure on the high pressure side of the swashplate, that is the side of the swashplate containing the high pressure slot 406D, will be greater than the pressure over the low pressure slot 406S. The lubrication system over the swashplate is thus self-regulating by providing a fluid film of greater pressure over the two axial faces of the swashplate on the diametrical side containing the high pressure slot 406P than on the opposite diametrical side containing the suction slot 406S.

A blind cylindrical bore 432 is drilled into the thick side 420 of the peripheral edge of the swashplate 260 as shown in FIG. 32 and is counterbored at 434. The bore 432 is threaded at 436 and threadedly receives a threaded section of a pressure relief valve 438 for venting the pressure from the high pressure kidney slots 406P when the pressure exceeds the design specification. The pressure is communicated to the pressure relief valve 438 through a passage 440 drilled from the through port 424PT into a axial bore from the motor-side face 412 of the swashplate, and communicates with the end of the bore 432 to communicate fluid pressure from the high pressure kidney slot 406P into the pressure relief valve 438. The vent from the pressure relief valve 438 vents into an annular chamber 442 in the bore 432 which communicates through a passage 444 with the suction side of the swashplate 260 to the suction slots 406S. The operation of this pressure relief valve 438 will occur only infrequently at very shallow angles of the swashplate pump-side face 414 and does not constitute a significant leakage of pressurized fluid. It is primarily only a protective device to prevent over pressure from causing damage in the transmission.

Figure 34:
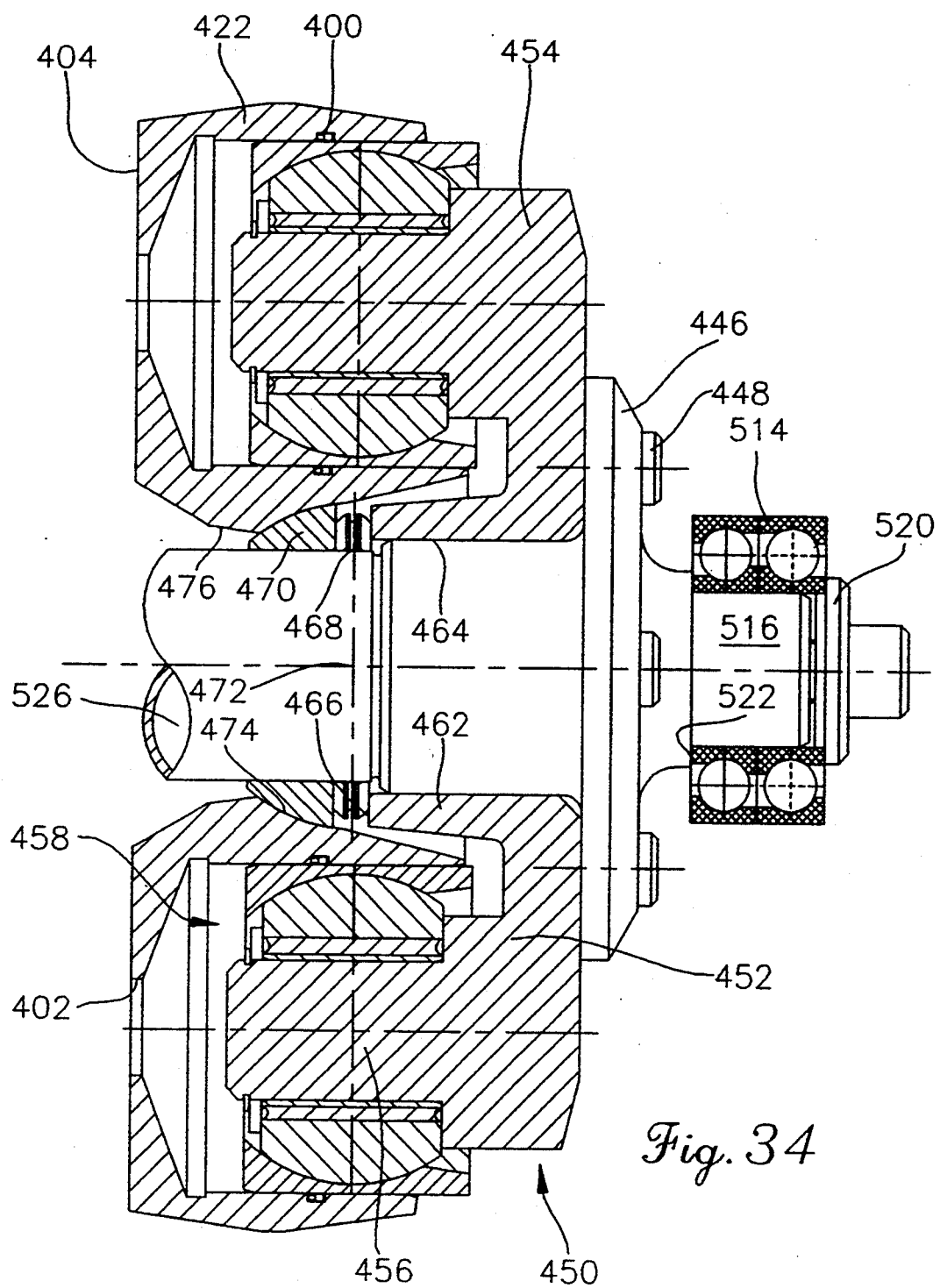
FIG. 34 is an enlarged sectional elevation of the pump in FIG. 16.

The swashplate 260 is coupled through an output sleeve 264 to an output shaft 266, and is also coupled to a control sleeve 268 for controlling the tilt angle of the swashplate and thereby controlling the input/output ratio of the transmission. The description of these structures will follow the description of the pump which will now be described in connection with FIG. 16 and FIG. 34.

The input shaft 256 has a flange 446 adjacent the output end of the input shaft 256 which is connected by bolts 448 to a pump piston carrier 450. The pump piston carrier includes a flat base 452 at which the piston carrier 450 is connected to the input shaft flange 446. Six equally spaced cylindrical pedestals 454 project from the flat base 452 toward the swashplate 260 and a mounting post 456 projects from the center of each pedestal. Each mounting post 456 has a piston and spherical bushing assembly 458 mounted on it which is identical to the pistons 382 and spherical bushing assemblies 374 described in connection with the motor 262. A cylinder block 460, identical to the cylinder block 366 mounted on the motor pistons, is mounted on the pump piston assemblies 458. The pump piston carrier 450 has a central tube 462 having an axial bore 464 which receives the input shaft with a snug fit for stability on the input shaft. The inner end of the central tube 462 is flat and presents a vertical surface 466 against which a wavy washer spring 468 bears. A spherical bearing 470 is mounted on the input shaft and is biased toward the swashplate 260 by the wavy washer spring 468. The spherical bearing 470 has a spherical bearing surface with a spherical center 472 on the longitudinal axis 257.

The pump cylinder block 422 has a spherical bearing race 474 on the tapered surface of the central opening 476, identical to the corresponding surface on the cylinder block 366. The spherical contour of the spherical bearing race 474 matches exactly the spherical contour of the spherical bearing 470 so that the spherical bearing 470 provides guidance for precessing motion of the cylinder block 422 in operation, as will be described below. The spherical center of each of the spherical bushings 376 and 470 lies on a plane which intersects the spherical center of the spherical bushings 376 so that the pistons 382 can swivel about the bushings 376 as the cylinder block 422 precesses, and all pistons 382 remain coaxial with and slide freely in each of the cylinders 394 without binding. Thus, the center of the precessing motion of the cylinder block 422 coincides with the spherical center 472 of the spherical bearing 470.

The pump-side face 414 of the swashplate 260 is identical to the motor-side face of the swashplate, and has the same configuration of kidney shaped slots opening in the face 414 as does the face 412 of the motor side of the swashplate. In this way, the fluid pressure pressurized in the cylinders 394 of the pump will pass through the high pressure slot 406A to pressurize the interior of the cylinder 394 of the motor to drive the motor in a manner to be described below.

A torque exerted on the swashplate 260 is output to the output shaft 266 through the output sleeve 264 which is coupled to the swashplate by a pair of drive pin assemblies 265 projecting radially from diametrically opposite sides to the swashplate 260 on the neutral axis thereof, that is, midway between the narrow side 418 and the thick side 420 of the swashplate 260. The axis 480 through the pins 478 constitutes the tilt axis of the swashplate about which the swashplate 260 is tilted for input/output ratio control of the transmission.

Figure 35:
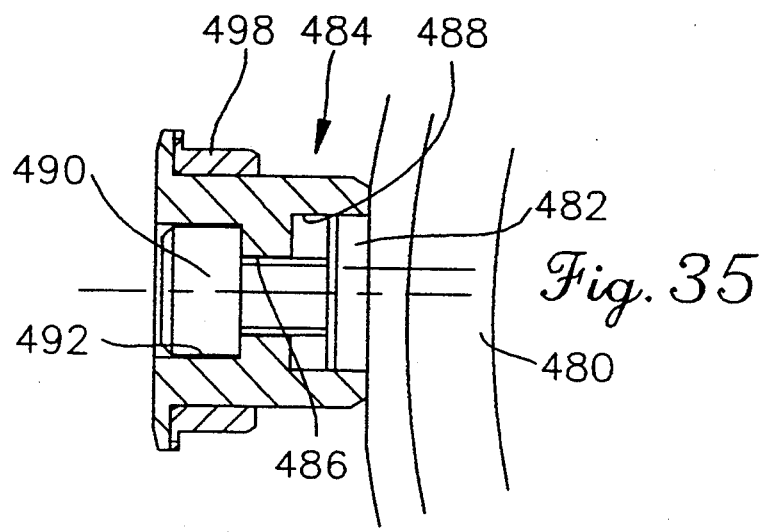
FIG. 35 is an enlarged sectional elevation of the drive pin assemblies and related structure shown in FIG. 17.

As shown in FIGS. 17 and 35, the two drive pin assemblies 265 are identical to each other and so only one will be described with the understanding that the description applies to the other as well. The drive pin assembly 265 attaches to the swashplate on a cylindrical boss 482 integral with and projecting radially beyond the peripheral edge 416 of the swashplate on the neutral axis 480. A spool pin 484 having an axial bore 486 and an axial counterbore 488 fits over the cylindrical boss 482 with the counterbore 488 snugly receiving the cylindrical boss 482. A cap screw 490 is threaded into a drilled and tapped hole extending radially into the center of the cylindrical boss 482 and the swashplate along the tilt axis 480. The head of the cap screw 490 is seated in an outer counterbore 492 in the spool pin 484 to hold spool pin in place on the cylindrical boss 482 and against the peripheral surface of the swashplate 260.

The output sleeve 264 has an elongated cylindrical section 494 through which extend two diametrically opposed radial holes 496. A bushing 498 of low friction material such as phosphor bronze is pressed into each of the holes 496 and the spool pin 484 and cap screw 490 are pushed into the bushing 498 and secured to the cylindrical boss 482 to complete the driving connection between the swashplate 260 and the output sleeve 264.

The output sleeve 264 is connected to an output flange 500 of the output shaft 266 by a series of cap screws 502 which are threaded through a series of holes adjacent the outer periphery the output flange 500 and are threaded into a series of threaded holes in a thickened end rim 506 of the output sleeve 264. The output flange 500 is a shallow conical structure which tapers forwardly to a cylindrical bearing mount 508. The bearing mount 508 has an outside cylindrical surface which receives the inner race of the bearing 310, the outer race of which is held in the bearing pocket 308 opening inwardly in the inside surface of the endcap 306. The inside surface of the cylindrical bearing mount 508 is recessed to receive and capture a pair of ball bearings 514 which are mounted on a projecting end 516 of the input shaft 256. A retainer cap 518 is screwed into a drilled and threaded axial hole 519 in the projecting end 516 of the input shaft 256 and has a flange 520 which engages the edge of the bearings 514 to hold them against a shoulder 522 of the input shaft adjacent to the flange 446. In this way, the axial position of the flange 500 and its attached output sleeve 264 is fixed with respect to the input shaft 256, but the assembly of the input shaft and the output sleeve 264 has an axial compliance as permitted by the depth of the bearing pocket 512 in the end cap 306.

Figure 36:
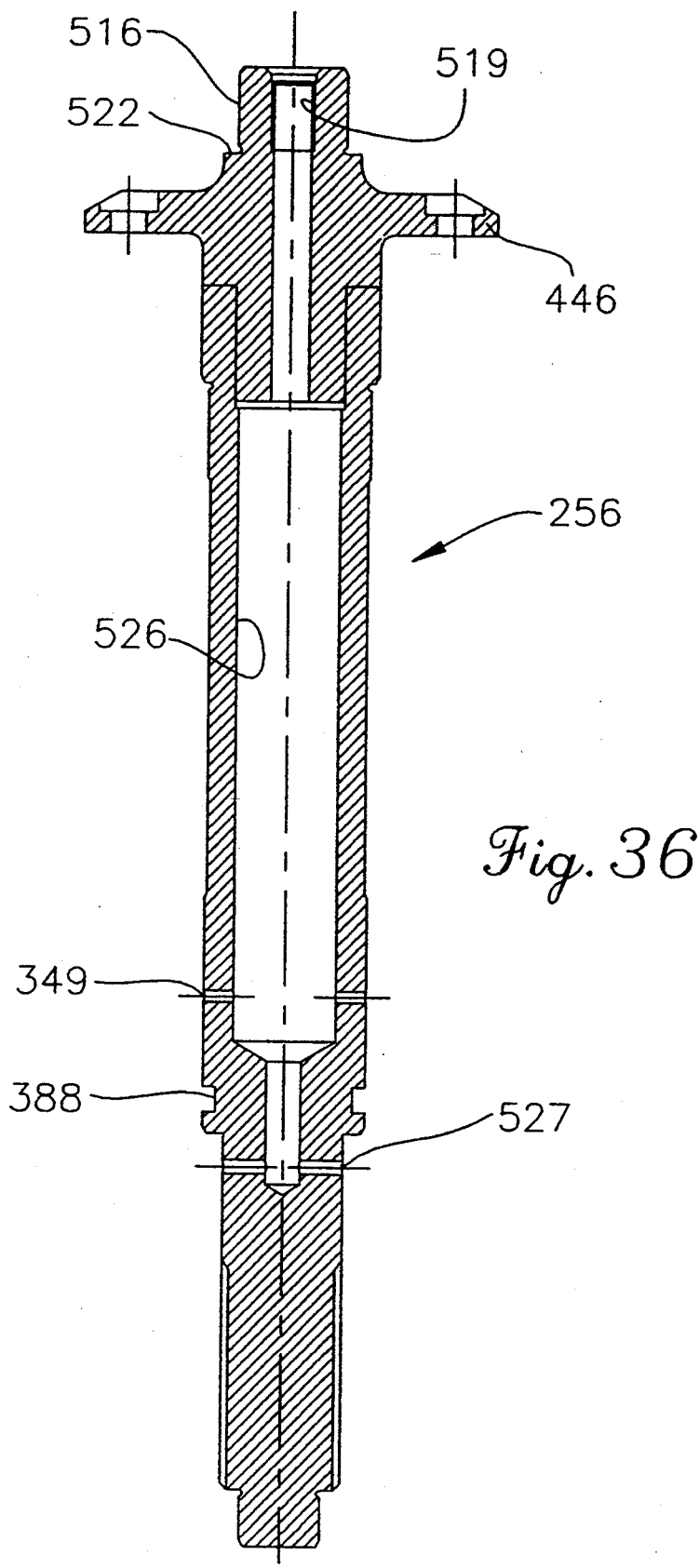
FIG. 36 is a sectional elevation of the input shaft shown in FIG. 16.

The bearings 310 and 514 are lubricated and cooled by oil delivered through a hole 524 byway of a main lubrication channel 526 provided by the hollow center of the output shaft 256, as shown in FIG. 36. The oil is pressurized by the charge pump 330 and delivered through a passage 530 in the pump housing 320 from the charge pump 330 to a manifold 529 between the input shaft 256 and the axial bore 326 through the pump housing 320. Oil from the manifold 529 flows through a hole 527 through the wall of the input shaft 256 into the lubrication channel 526. The hole 527 is narrow and acts as a pressure lowering restriction for oil flow into the interior of the input shaft 256. The hollow interior 526 of the input shaft 256 extends for the entire length of the shaft from the region of the charge pump 330 all the way to the output end of the shaft where it is restricted by an axial hole 524 through the bearing retainer 520. The bearings 310 and 514 are lubricated and cooled by oil supplied through the hole 524.

The control sleeve 268 is coaxially disposed within and rotates with the output sleeve 264, but is also axially slidable with respect to the output sleeve under the influence of the control cylinder 270 by virtue of a bearing 528 which couples the control cylinder 270 to the control sleeve 268, permitting relative rotation therebetween but insuring that axial movement of the control cylinder 270 will cause corresponding axial movement of the control sleeve 268, which movement is transmitted to the swashplate 260 by the coupling mechanism 267. The coupling mechanism 267, shown in FIG. 37, includes a pod 532 having a cylindrical barrel 534 which extends into and fits closely in the counterbore 434. The cylindrical barrel 534 surrounds the body of the pressure relief valve 438, but the cavity within the barrel is dimensioned to clear the relief valve 438 so there are no loads transferred between the pod 532 and the relief valve 438. A set screw 538 is threaded through a hole in the pump side of the swashplate and extends into a slight recess in the side of the cylindrical barrel 534 to secure it into position. There are no significant radial loads on the pod 532 and therefore the set screw is primarily to prevent the pod 532 from rotating about its axis for a purpose which will be described presently.

A cylindrical knob 540 projects radially outward from a neck 542 at the end of the barrel 534. The spherical knob 540 has a central axial cylindrical recess 544 for receiving a stud 546 for a purpose to be described. The stud 546 is secured in the axial recess 544 with a cap screw 548 which is threaded into a tapped hole extending axially through the neck 542.

Figure 37:
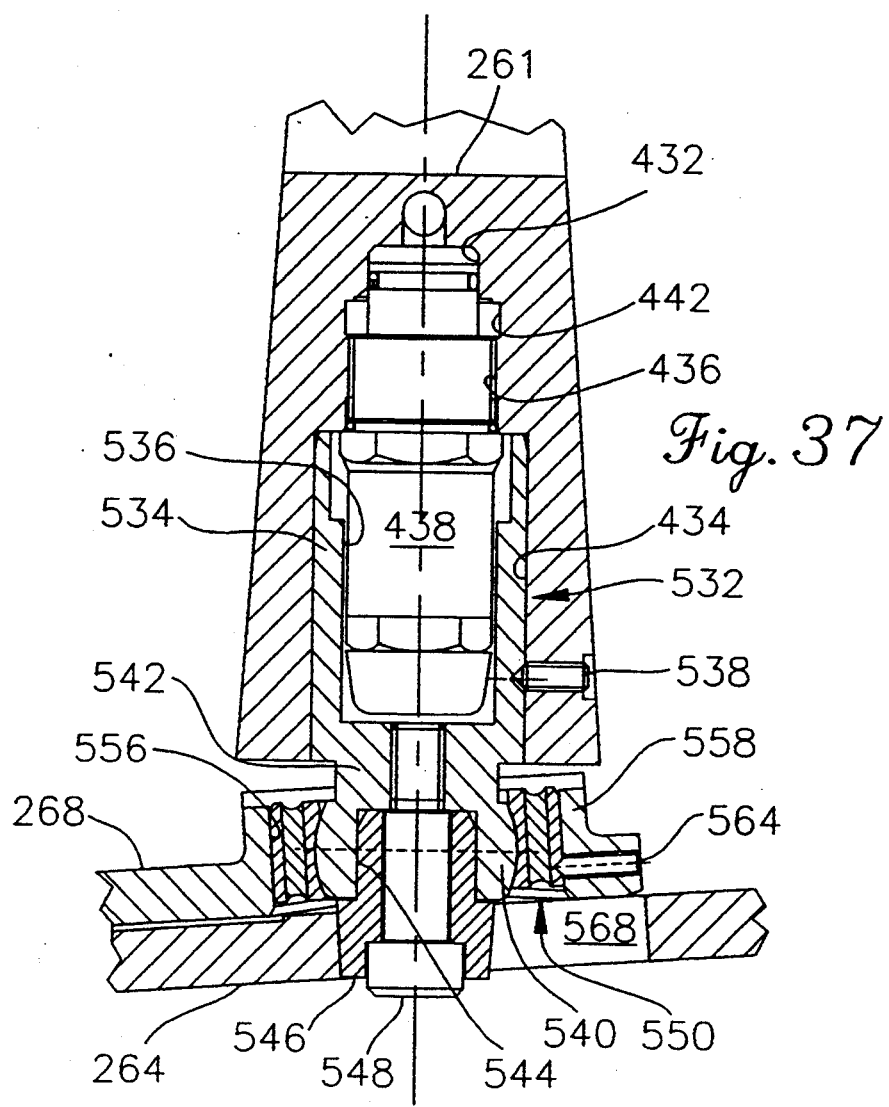
FIG. 37 is an enlarged sectional elevation of the coupling mechanism shown in FIG. 16.
Figure 39:
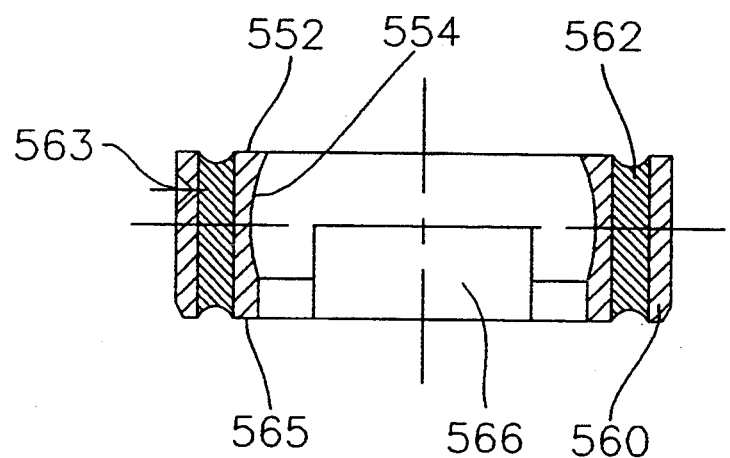
FIG. 39 is a sectional elevation along lines 39—39 in FIG. 38.
Figure 38:
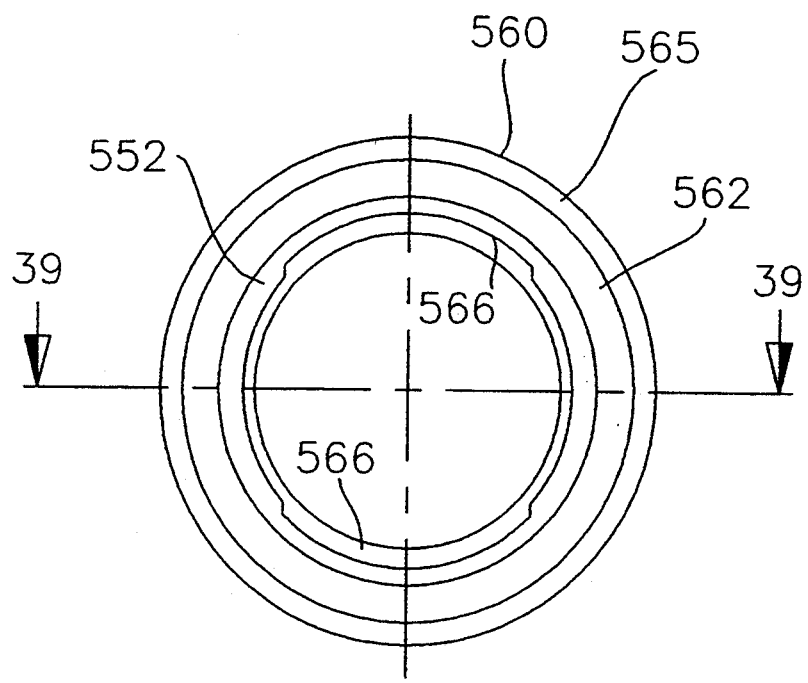
FIG. 38 is an end elevation of the socket shown in FIG. 37.

A socket 550, shown in FIGS. 38 and 39 as well as FIG. 37, is mounted in a cylindrical opening 556 through an inwardly projecting boss 558 on the control sleeve 268 adjacent the output end thereof. The socket 550, as shown in FIGS. 38 and 39, includes an inside shell 552 having an inside spherical cavity 554. The shell 552 is secured to a radially spaced surrounding coaxial cylindrical metal sleeve 560 by an elastomeric annulus 562 bonded between the metal sleeve 560 and the shell 552. The metal sleeve 560 has a shallow recess 563 in its outside surface which receives the end of a set screw 564 threaded into a hole through the end of the control sleeve and communicating with the opening 556 in the boss 558 to hold the socket 550 in place and prevent it from rotating about its axis for a purpose which will be explained presently. The elastomeric annulus 562 provides radial compliance of the shell 552 in the sleeve 560 to accomodate the slight radial translation of the knob 540 when the swashplate 260 is tilted by the control sleeve 268. The elastomeric annulus 562 also isolates the control sleeve 268 and the bearing 528 from a slight flutter at the frequency of the swashplate rotation speed that the swashplate 260 experiences. This flutter is caused by a periodic angular offsetting of the center of pressure of the rotating pressure fields on the two sides 412 and 414 of the swashplate 260 relative to each other as the ports 402 in the precessing cylinder block 422 pass the corresponding ports in the nutating cylinder block 366 on the pressure side of the swashplate 260.

Two cylindrical recesses 566 are machined in the inside surface of the shell 552 and extend from the maximum diameter of the inside spherical contour of the inside surface 554 radially inward to the inside edge 565 of the shell 552. The radius of the cylindrical recesses 566 is equal to the radius of the spherical contour of the inside spherical surface 554 and the width of the recesses 566 is equal to the width of the spherical knob 540 between two radial flats 567 machined on opposite sides of the spherical knob 544. In this way, the socket 550 may assembled to the spherical knob 540 by rotating the socket 550 90° about its axis to align the cylindrical recesses 566 with the spherical surface of the knob 540 between the flats 567 on the knob 540. The socket 550 can now be slipped radially onto the knob 540 and secured in place by rotating the socket 550 90° about its axis to align the spherical surfaces of the knob 540 with the spherical portions of the inside spherical surface 554 on the shell 552.

With the socket 550 assembled to the spherical knob 540 of the pod 532, the assembly is oriented so that the spherical surfaces of the shell 552 and the knob 540 face in the axial direction and the flats 567 and 566 of the knob 540 and cylindrical recess 566 respectively face in the circumferential direction. The pod 532 is pushed into the counterbore 434 in the swashplate and the socket 550 is simultaneously pushed into the opening 556 in the boss 558. The set screws 564 and 538 are screwed into the holes through the control sleeve 268 and the swashplate 260 respectively and are peened into position to prevent them from backing out during operation.

The stud 546, shown in FIG. 37, secured in the cylindrical recess opening in the end of the knob 540 with a cap screw 548 extends into a slot 568 through the output sleeve 264. The stud has a head which is rectangular in cross section and the slot 568 in which the stud extends is likewise rectangular in cross section. The function of the stud is to prevent the swashplate from tilting beyond its designed tilt limits and therefore the axial dimensions of the slot 568 are set to limit the tilt angle of the swashplate 260 by engagement of the flat ends of the stud head 570 with the ends of the slot 568.

The forward edge 569 of the control sleeve 268 has a pair of forwardly opening notches 571 which provide clearance for the drive pin assemblies 265 when the forward edge 569 of the control sleeve 268 slides forward beyond the axis 480 through the drive pin assemblies 265.

Figure 40:
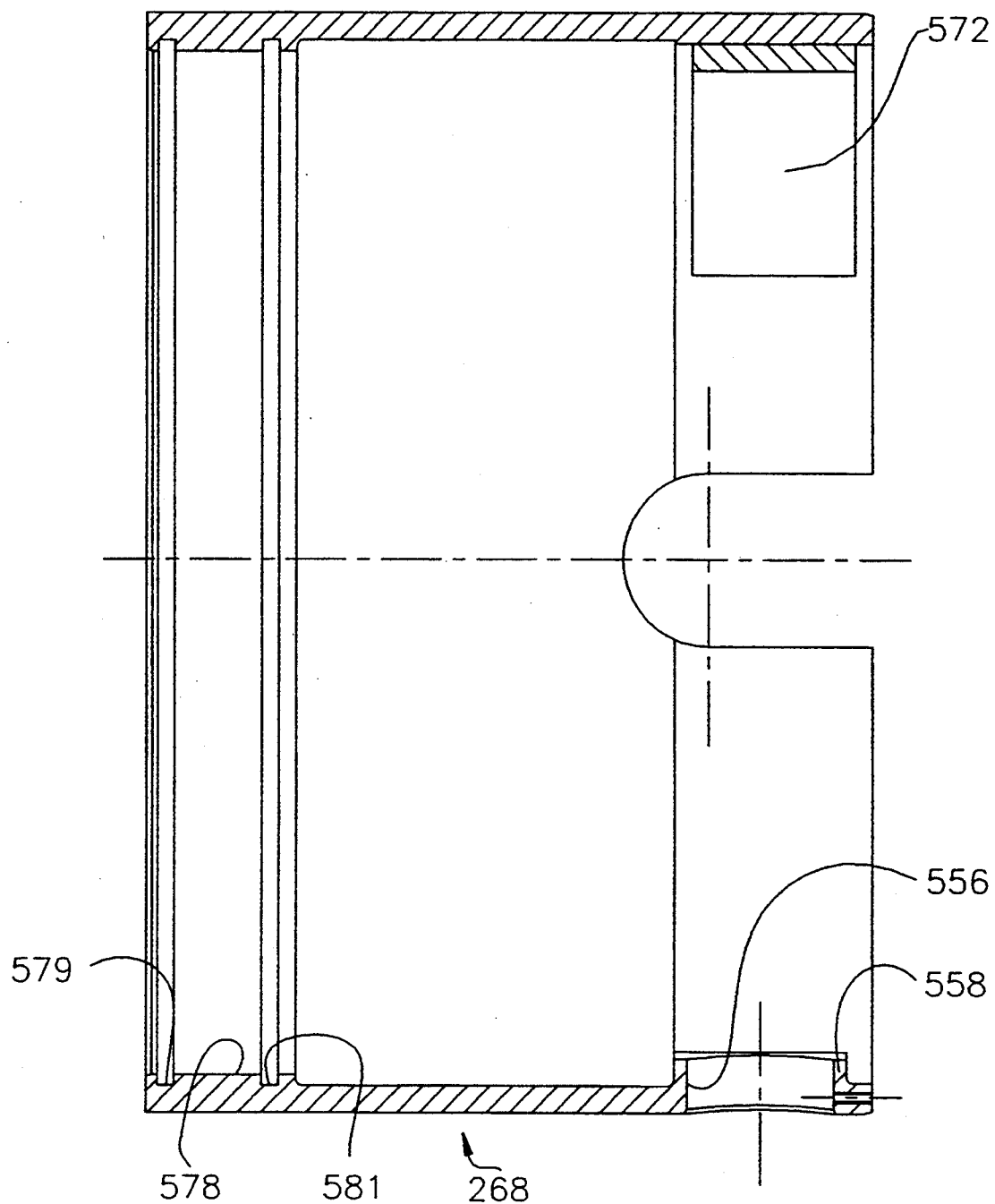
FIG. 40 is a sectional elevation of the control sleeve shown in FIG. 16.

As shown in FIG. 40, a counterweight 572 of semicylindrical arcuate form is attached to the inside surface of the control sleeve 268 adjacent to the front end thereof, to counterbalance the eccentric mass of the swashplate 260 and the nutating and precessing cylinder blocks 366 and 422. The eccentric mass of the swashplate 260 is located on the central lateral plane bisecting the swashplate 260 into two equal axial halves and is positioned radially slightly beyond one third of the radius of the swashplate out from the longitudinal axis 257. The center of mass of the counterweight 572 is positioned diametrically opposite the center of mass of the swashplate. As the swashplate tilts about the axis through the drive pins 265, the eccentric center of mass of the swashplate 260 will swing through an arcuate path centered on the intersection of the axis through the drive pins 265 and the longitudinal axis 257. The swashplate 260 is coupled to the control sleeve 268 at its outer periphery and therefore the control sleeve 268 and the attached eccentric counterweight 572 will move axially farther than the eccentric center of mass of the swashplate 260. This additional axial motion is provided to counterbalance an additional eccentric mass caused by the nutating cylinder block and the precessing pump cylinder block 422. The center of mass of the cylinder blocks 366 and 422 is positioned on the longitudinal axis of the cylinder blocks since they are symmetrical about their own axis, but the center of mass is located closer to the front wall 393 of the cylinder block. This locates the center of mass of the cylinder blocks 366 and 422 at a point offset from the longitudinal axis 257 when the axis of the cylinder blocks are at an angle to the longitudinal axis 257, and constitutes an eccentric mass that is balanced by the arcuate counterweight 572.

When the swashplate tilts from the position shown in FIG. 16 to a position in which the central plane of the swashplate is normal to the central axis 257, the eccentric masses of the two cylinder blocks 366 and 422 will be equally eccentric and at that point the axial position of the eccentric mass of the balancing counterweight 572 on the control sleeve 494 is bisected by the central plane of the swashplate 260. As the control sleeve 268 moves farther forward, the angle of the face 414 of the swashplate increases with respect to the longitudinal axis 257, the eccentricity of the mass of the cylinder block 366 becomes smaller because the angle of the swashplate face 412 on the motor side becomes closer to perpendicular, whereas the face 414 tilts to a greater angle with respect to the longitudinal axis 257. This greater tilt of the motor cylinder block 422 increases the eccentricity of the eccentric mass of the motor cylinder block and requires that the axial position of counterweight 572 be farther forward to be axially closer to the axial position of the eccentric mass of the cylinder block 422. This does occur because the control sleeve 268 moves axially with the swashplate 260 when the swashplate tilts and therefore the axial position of the counterweight 572 closely tracks the axial position of the combined eccentric mass of the swashplate and the two cylinder blocks 366 and 422.

The inside surface of the cylindrical portion 494 of the output sleeve 264 is machined to provide a shallow wide cylindrical relief 574 extending in the central portion of the cylindrical portion 494 for over half of the length of the central cylindrical portion, lying roughly centered on the control sleeve 268. The machining of the recess 574 leaves a cylindrical land 576 and 577 on the two portions of the cylindrical portion 494 adjacent the ends of the control sleeve 268. These lands 576 and 577 provide stabilizing contact for the output sleeve 264 which is otherwise cantilevered at the output end, and also provides stabilizing contact for the control sleeve 268 at its front end adjacent the swashplate. The cylindrical relief also minimizes the frictional drag of the control sleeve 268 when moving axially relative to the output sleeve 264 to make angle adjustments to the swashplate 260.

The rear end of the control sleeve, shown in FIG. 40, is thickened at 578 by decreasing the internal diameter of the sleeve 268 at that point, to strengthen the end of the control sleeve for mounting of the bearing 528. Two grooves 579 and 581 are machined into the thickened portion 578 to receive snap rings 580 which capture the bearing 528 and insure that axial movement of the bearing 528 is transmitted to and causes movement of the control sleeve 268.

The inner race of the bearing 528 is mounted on the central portion of the control cylinder 270 as shown in FIGS. 16 and 28, and is held in place thereon between a snap ring 582 in a groove in the exterior surface of the control cylinder, and a shoulder 584 formed at the junction of the forward portion of the control cylinder 270 and a second larger diameter rear portion 586.

The plinth 340 at the forward end of the charge pump housing 320 has an outwardly projecting flange 588 which has a radially facing outer peripheral cylindrical surface 590 having a diameter about equal to the internal diameter of the control cylinder 270. The cylindrical ring 318 projecting axially forward from the mounting flange 278 has an outer radially facing cylindrical surface 592 with an outside diameter about equal to the inside diameter of the rear end portion 586 of the control cylinder 270.

The axially facing outer end 319 of the cylindrical ring 318 and the axially facing inner surface 593 of the flange 588 enclose between them a section 594 of the cylindrical radially facing surface on the charge pump housing 320 which is radially offset from the radially inwardly facing surface 595 of the control cylinder between the surfaces 590 and 592. The control cylinder 270 lies over and in contact with the surface 590 and 592 and is sealed thereto by seals 596 and 598 which permit the control cylinder 270 to slide axially but prevent fluid from escaping from an expansible chamber 599 defined between the radially facing surfaces 594 and 595, and the axially facing surfaces 318 and 593. A inwardly extending annular vane 600 projects radially inward from the center portion of the control cylinder 270 into the chamber 599 and has a seal 602 mounted in the inner radial facing surface of the vane 600 which contacts the surface 594 of the charge pump housing 320 to divide the chamber 599 into two axially separated chambers 599F and 599R. The position of the control cylinder 270 can be controlled by admitting fluid under pressure into chamber 599F or 599R to exert fluid pressure on one axial face or the other of the radial vane 600. The pressurized control fluid is admitted through suitable passages to one end or the other of the chamber 596.

An axially extending groove 606 is machined in the outer surface of the thickened portion 586 of the control cylinder 270 to receive a locating pin 608 which is positioned in a counter bore 610 in the mounting flange 278 and is secured in position by a cap screw 612 which is threaded through a bore coaxial with the counterbore 610 and is threaded into a drilled and tapped hole in the locating pin 608. The locating pin has an o-ring seal to prevent leakage of hydraulic fluid out of the housing through the bore and counter bore 614 and 610. The locating pin 608 insures that the motion of the control cylinder 270 will be straight axial motion and that the rotation of the control sleeve 268 is not transmitted through the bearing 528 to the control sleeve 270.

A control linkage for coupling the control sleeve 270 to the spool valve 274 includes a lever 618 pinned in a recess 620 opening in the input face of the mounting flange 278 by a pin 622. The lever bears at a radially inner end against an axially facing rounded shoulder 624 on the thickened end portion 586 of the control cylinder and thereby feeds back position information regarding the axial position of the control cylinder 270 to the radially outer end of the lever 618 which is in contact with a rod 626 axially slidable in an axial hole 628 drilled in the flat top boss 292 to receive the rod 626. The forward end of the rod 626 is pinned to a lever 630, the other end of which is pinned to an extending piston rod 632 of spool valve element 634 which is mounted in the spool valve 274. The center of the lever 630 is pinned to a control rod 636, the forward end of which is connected to a control device such as the manual micrometer control 637, which provides precisely controlled axial movement of the control rod 636 under automatic or manual control to change the input/output ratio of the transmission.

The spool valve 274 is a commercially available item conventionally known as a directional control spool valve. A suitable example is a Rexroth Model 4 WMR6E5X. The spool valve 274 together with the control linkage and the control cylinder 270 constitutes a follower valve system which enables the control cylinder 270 to be moved under hydraulic control to a position unique to the position of the control rod 636 so that the input/output ratio of the transmission may be controlled by control of the axial position of the control rod 636. A major advantage of this control system is that the system is hydraulically self-balancing so that no forces are transmitted from the transmission through the linkage to the control rod, so the only force that the control rod must overcome is the spring force bearing on the control element 634 in the spool valve 274 itself.

Figure 41:
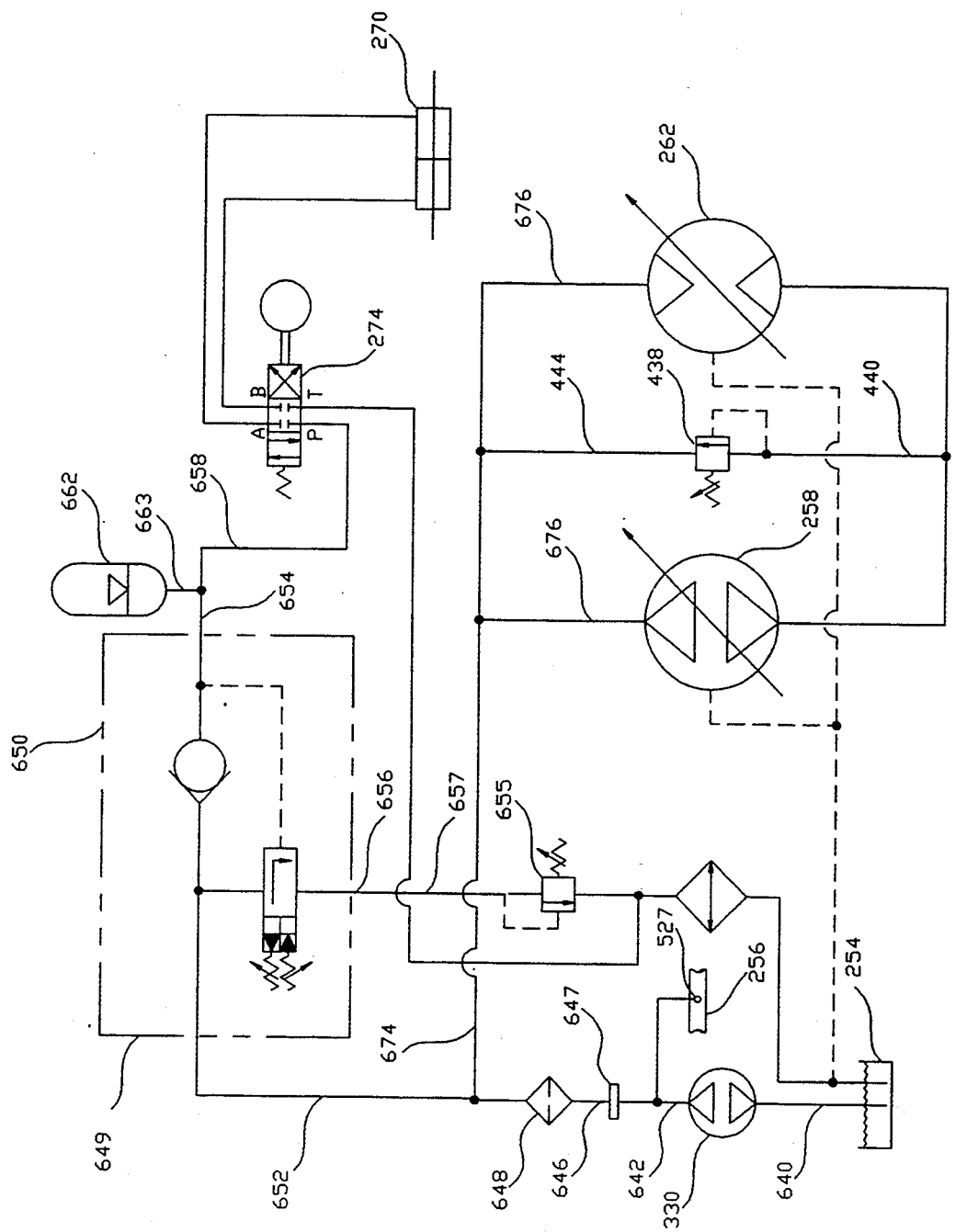
FIG. 41 is a schematic diagram of the hydraulic system of the transmission shown in FIG. 16.

The hydraulic feed and control system is shown in the schematic in FIG. 41. The fluid reservoir is labeled 254 which is the housing 254 since the housing acts as the fluid reservoir in this transmission. However, a separate reservoir could be provided for hydraulic fluid and the hydraulic schematic indicates that possibility as a generic tank. The fluid intake from the sump could be a separate pipe from a separate sump but in this transmission, as shown in FIGS. 18-20, it is an opening 638 in the mounting flange 278 into the lower end of the housing 254 which is below the level of transmission fluid in the housing 254. A radial passage 640 within the mounting flange 278 leads from the fluid intake 638 to the charge pump 330 by which fluid at atmospheric pressure in the housing 254 or in a separate sump or reservoir may be drawn into the charge pump 330 where it is pressurized and output to a radial passage 642 in the mounting flange 278 leading to a fluid port 644 in the portion of the mounting flange radially beyond the radius of the main housing 280. A fluid line 646, coupled with a fluid coupling 647 to the port 644 conveys fluid pressurized in the pump to a filter 648, the output of which is connected to an input port 649 into an accumulator charging valve 650 by a second fluid line 652.

The accumulator charging valve 650 is an adjustable valve which feeds fluid under full pressure to a first output port 654 unless the back pressure at that port exceeds a set value, in which case the fluid from input port 649 is diverted to a second output port 656 which is connected to a return line 657 through a pressure relief valve 655 to the sump. The pressure relief valve 655 acts to reduce the pressure in the line 652 whenever the back pressure at the port 654, from which the swashplate angle control system is pressurized, is above its minimal set pressure, which is most of the time. This allows the pump 330 to run at a lower pressure to feed the lubrication and make-up lines which do not require the higher pressures needed in the swashplate angle control system.

Figure 22:
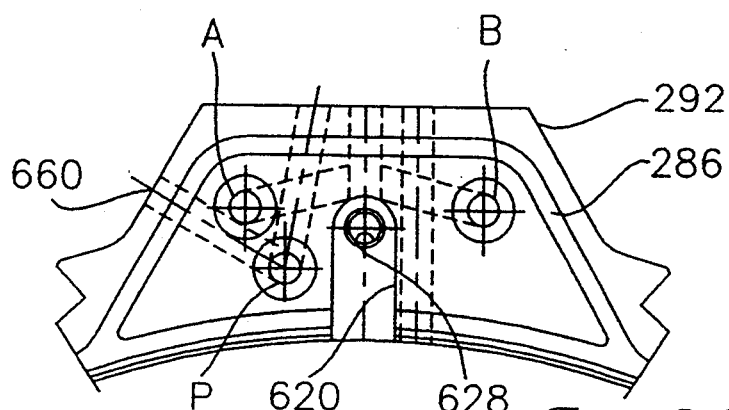
FIG. 22 is an enlarged fragment of the end of a boss on the body shown in FIG. 21.

A fluid line 658 from the port 654 in the accumulator charging valve 650 runs to a pressure port 660 in the flat top boss 292 which connects through internal passages in the boss 292, as shown in FIG. 22, to a pressure orifice in the top of the flat boss 292, which matches with a four hole pattern of ports in the bottom surface of the spool valve 274. This way, fluid under pressure is conducted into the valve 274 through the pressure port P and is selectively fed by the valve element 634 to the A or B ports to control the movement of the control cylinder 270 as will be described below.

The pressure in the line 658 is maintained at the desired control pressure by a fluid control accumulator 662 connected to the fluid line 658. The accumulator 662 ensures that the control pressure for controlling the input/output ratio of the transmission is available even if the prime mover that powers the transmission is not operating. The accumulator 662 is charged from the fluid pressure from the valve port 654 through a line 661 connected to the fluid line 658 and maintains the control pressure at relatively uniform values.

Figure 42:
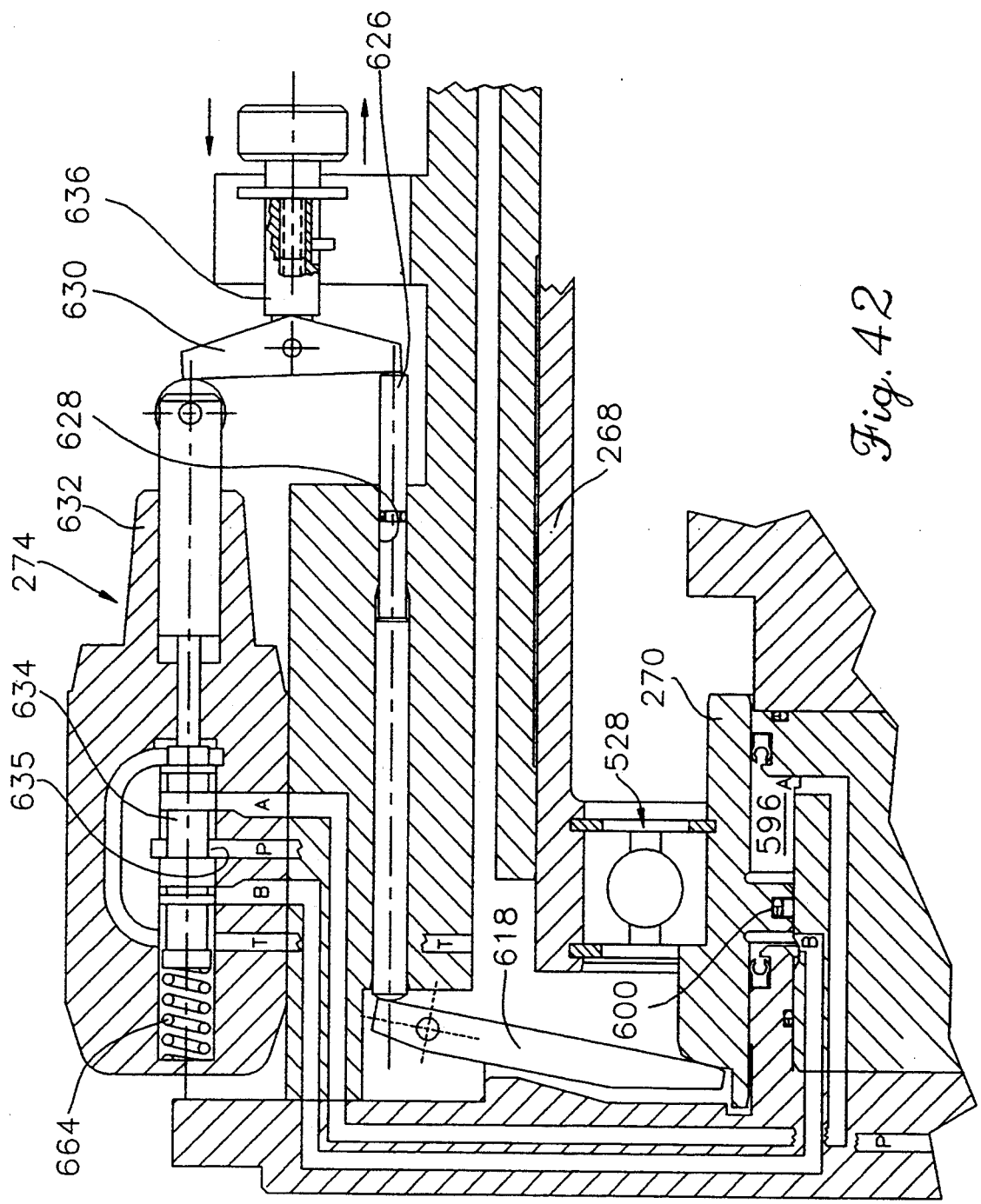
FIG. 42 is a schematic diagram of the follower valve system shown in FIG. 16.

Operation of the follower valve system 269 will now be described, with reference to FIG. 42. Fluid under pressure delivered through the line 658 to the port 660 and conveyed to the P-port on the boss 292 pressurizes a central chamber 635 between the A and B pistons of the spool valve element 634. When the spool valve element 634 is centered in the housing of the spool valve 274, the A and B pistons cover the A and B passages to prevent fluid under pressure from passing from the central chamber 635 into either the A or B port. When it is desired to move the swashplate from its neutral position as shown in FIG. 16 to some intermediate input/output ratio, the control rod 636 is moved to the left to a position uniquely corresponding to the desired input/output ratio. The movement of the control rod 636 causes the lever 630 to pivot about its connection with the rod 626, pushing the piston rod 632 to the left in FIG. 41. This uncovers the B port allowing fluid under pressure to flow from the central chamber 635 into the B port, and simultaneously establishes communication between the A port and the T ports, allowing pressure from the line connected to A port to vent out through the T port.

As shown in FIG. 41 and FIGS. 23-25, the B port is connected to the chamber 596B on the rear side of the vane 600 through a pair of radial passages 659A and 659B in the mounting flange 278, shown in FIG. 20, extending from Ao and Bo ports opening in inner face of the mounting flange 278 and aligned with A and B ports in the vertical face of the boss 292. Control fluid flowing through the A and B ports of the spool valve 274 flows through the coupled ports A and B in the vertical face of the boss 292 and the face of the mounting flange and radially through the radial passages 659A and 659B to a pair of inner Ai and Bi ports opening in the inner face of the mounting flange 278. Two axial passages 663A and 663B in the charge pump housing 320 are aligned with the inner ports Ai and Bi in the mounting flange 278 and convey fluid between the chamber 596A and 596B, respectively, and the A and B ports in the spool valve 274. Pressurizing the chamber 596B through the passage 663B drives the control cylinder 270 and control sleeve 268 to the right, thereby tilting the swashplate 260 about its drive pins 265 to an angle unique to the position of the control rod 636.

As the control cylinder 270 moves to the right, a spring 664 in the spool valve 274 pushes the valve element 634 back to the right, maintaining the end of the lever 618 in contact with the end of the control cylinder 270. When the control cylinder 270 has reached the position corresponding to the position of the control rod 636, the spring will have pushed the valve element 634 back into its central position as the rod 626 moves to the left and the lever 630 pivots about the pin connection to the control rod 636 to the point where the control element 634 is again centered in the housing blocking the flow pressurized fluid from the pressurized chamber 635 through the B port and blocking flow of fluid in through the A-port and out the T-port. This halts the movement of the control cylinder 270 at the desired position as set by the position of the control rod 636. Likewise, movement of the control rod to the right to decrease the input/output transmission ratio moves the control element 634 to the right as the lever 630 pivots about its connection to the rod 626. Fluid under pressure flows from the chamber 635 out through the A-port to pressurize the chamber 596A. Simultaneously, the B-port is uncovered and vented through the T-port, allowing fluid under pressure to flow out of the chamber 596B, thereby driving the control cylinder 270 and the coupled control sleeve 268 to the left, thereby tilting the swashplate 260 about the axis through the drive pins 265 to bring the swashplate face 414 toward a more vertical orientation. When the position of the control cylinder 270 reaches the desired position as set by the axial position of the control rod 636, the lever 618 pushes the rod 626 to rotate the lever 630 about its connection to the control rod 636 to push the piston rod 632 of the control element 634 back to its central position, blocking the passage of pressurized fluid through the A-port and also disconnecting the communication between the T-port and the B-port so that the movement of the control cylinder 270 comes to a halt at a position corresponding to the position of the control rod 636. In operation of the transmission, input torque is applied to the input shaft 256, typically in the clockwise direction as indicated by the arrow 666 as is the convention for motor vehicles. The input shaft 265 drives the charge pump rotor 330A through the key 331 to pressurize fluid for control of the swashplate tilt angle control system, for makeup fluid to the pump and motor cylinders, and for lubrication. The lubricating fluid enters the hollow interior 526 of the input shaft 256 through the oil hole 527 which acts as a restriction in the oil flow to cause a pressure drop across the hole 527 so that the lubrication pressure is reduced from the maximum pressure output of the charge pump 330.

The input shaft 256 rotates on its needle bearing 358 and its double ball bearing 514 and drives the pump piston carrier 450 through the flange 446. At the position of the swashplate 260 shown in FIG. 16, with the pump-side face 414 of the swashplate at a perpendicular orientation to the longitudinal axis 257, the pump and its cylinder block 422 turn in a circular path with no axial component of motion to the cylinder block 422, and therefore no pumping of fluid occurs. This is the neutral position of the transmission and the only power consumed by the machine is in the pumping of control and lubricating fluid by the charge pump 330 and whatever small frictional losses are consumed by the bearings and the interface between swashplate 260 and the pump cylinder block 422.

When output torque is desired from the output shaft 266, the control rod 636 is moved to the left to admit pressurized fluid from the chamber 635 of the spool valve 274 through the B-port, charging the chamber 596B with pressurized fluid and driving the control cylinder 270 and the coupled control sleeve 268 to the left. The control sleeve 268, acting through the coupling mechanism 267, tilts the swashplate 260 to a position uniquely determined by the position of the control rod 636.

With the pump-side face 414 of the swashplate 260 at an oblique angle to the longitudinal axis 257, rotation of the pump piston carrier 450 causes the pump cylinder block 422 to precess about the center of rotation 472 as it is driven about the swashplate 260 by the rotating pump piston carrier 450. The cylinders 394 of the precessing cylinder block 422 reciprocate axially with respect to the revolving piston and spherical bushing assembly 458, to pressurize the fluid in the cylinders 394 and pump the pressurized fluid through the kidney-shaped port 402 in the front face of the cylinder block 422. The elastomeric sleeves 380 accomodate a slight radial translation of the pistons 382 as they follow the elliptical projection of the cylinder blocks 377 and 422 on a vertical plane normal to the longitudinal axis 257. The torque exerted by the rotating pump piston carrier 450 through the pump cylinder block 422 on the face of the swashplate 260 is a mechanical component of input torque delivered to the swashplate by the pump, and is zero or close to zero when the pump-side face 414 of the swashplate is perpendicular to the axis 257 and gradually increases to 100% of the output torque when the motor-side face 412 of the swashplate 260 is perpendicular to the longitudinal axis 257. This is because, at the perpendicular orientation of the pump-side face 414 of the swashplate, there is no fluid output for the pumping action of the pump pistons in the cylinders of the pump, so they are essentially locked up hydraulically in their position with respect to each other. Therefore the output of the transmission in the vertical position of the motor-side face 412 of the swashplate 260 is 1:1 transmission ratio configuration with a straight mechanical transmission of torque from the input shaft 256 to the output shaft 266.

At intermediate angles of the swashplate between the neutral position in which the pump-side face 414 of the swashplate 260 is vertical and the 1:1 transmission ratio position in which the motor-side face 412 of the swashplate is vertical, the fluid pressurized by the pump 258 passes through the pressure ports 406 P and through the kidney shaped slots 402 in the cylinder block 366 to pressurize the cylinders 394 in the motor cylinder block 366. The pressurized fluid in the motor cylinders 394 exerts an axial force against the inside axially facing surface of the front wall 393 of the cylinder 394. This axial force on the motor cylinder block 366 is exerted against the wedge-shaped face 414 of the swashplate, producing a torque on the swashplate which is about equal to the tangent of the angle of the swashplate relative to the longitudinal axis 257 times the axial force exerted by the cylinder block 366 on the swashplate. This torque is a second component of torque and is contributed hydromechanically by the motor 262 on the swashplate 260.

A third component of torque exerted on the swashplate 260 is a pure hydraulic component and is a function of the system hydraulic pressure inside the pressure port 406P multiplied by the differential area (406t minus 406n) of the circumferentially facing ends 406n and 406t of the slot 406P, as shown in FIG. 31. This third component of torque, the pure hydraulic component, constitutes about 85% of the torque transmitted through the transmission when the transmission is in an intermediate transmission ratio between zero and 1:1.

Driven by the first torque component from the pump, the second torque component from the motor, and the third torque component from the fluid system pressure acting on the differential area of the ports 406, the swashplate 260 rotates about the longitudinal axis 257 and drives the output sleeve 264 through the drive pin assemblies 265. The output sleeve 264 is attached to and supported by the output flange 500 of the output shaft at the output end of the drive sleeve 264, and is supported at the input end of the drive sleeve 264 by the control sleeve 268. The output flange 500 rotates between its bearings 510 and 514 and transmits output torque to the output shaft 266.

Rotation of the pump in the "uphill" direction on the swashplate causes the pump cylinders to move axially towards the pump piston compressed fluid in the cylinder to exert torque on the swashplate as described previously. On the diametrical side of the swashplate on the other side of the vertical longitudinal plane 421, the pump cylinders are moving "downhill" on the swashplate, that is the swashplate becomes progressively narrower as the cylinders proceed around that side of the swashplate. On that other side, which is the suction side of the swashplate, the pump cylinders are moving axially away from the pistons on the pump side and are moving toward the pistons on the motor side so that fluid is being transferred from the motor side cylinders through the suction ports 406S in the swashplate 260 to the pump side cylinders. Any leakage of fluid that has occurred which would reduce the overall volume of fluid in the cylinders and kidney slots in the swashplate is made up during the suction stroke by a fluid makeup system including a slot 670 in the mounting flange (shown in FIGS. 18–20) communicating between the passage 642 pressurized by fluid from the pump 330, through the mounting flange at a radius equal to the radius of an annular groove 672 in the rear face of the pump housing 320, shown in FIGS. 23–25. The annular groove 672 is sealed on the inner and outer radial sides by a pair of concentric o-rings to prevent leakage of pressurized fluid from the annular groove 672. Three slanting passages 674 are drilled from the annular groove 672 through the pump housing 320 to the plinth 340 where they connect with passages 676 through three of the mounting posts 370 to provide fluid communication from the annular groove 672 to the interior of the cylinders 394. The make-up fluid is distributed between the cylinders 394 as required through the ports 402 in the cylinder blocks and the slots 406 in the swashplate 260. An enlarged counterbore 678 of each axial passage 676 in the flat base 344 each receives a one way valve 680 to prevent fluid pressurized in the motor cylinder 394 from being forced out of the cylinders 394 through the passages 676 and back into the pump 330. The one way valve 680 allows fluid to pass freely from the charge pump 330 into the cylinders 394 when the pump and motor cylinders 394 are in their suction phase.

Obviously, numerous modifications and variations of the disclosed embodiments will occur to those skilled in the art on reading this disclosure and examining the drawings. Accordingly, it is expressly to be understood that these modifications and variations, and the equivalents thereof, may be practiced while remaining within the spirit and scope of the invention as defined in the following claims, wherein I claim:

1. A hydraulic machine, comprising:

an output shaft;

a wedge-shaped swashplate coupled to said output shaft and rotatable therewith about a common axis of rotation, said swashplate having a thick edge at one diametrical side, and tapering to a thin edge on the opposite diametrical side;

means in said swashplate defining a series of arcuate slots extending entirely through said swashplate;

means for delivering fluid under high pressure to said slots on one diametrical side of said swashplate, and means for delivering fluid under low pressure to said slots on the other diametrical side of said swashplate;

said slots having circumferentially facing walls which are greater in area on one circumferential side of the slot than on the other circumferential side;

said swashplate delivering torque to said output shaft in the direction exerted by said high pressure fluid on said greater area side of said slots on said one diametrical side of said swashplate.

2. A hydraulic machine as defined in claim 1, wherein:

said high pressure fluid delivery means includes a plurality of pistons in cylinders facing said swashplate on at least one side thereof and revolving relative to said swashplate about said swashplate axis in the same direction as the direction of rotation of said output shaft;

whereby rotation of said piston and cylinders around the face of said swashplate forces said pistons into said cylinders as said pistons move toward said thick edge of said swashplate, said inward motion of said pistons into said cylinders acting to pressurize fluid in said cylinders, said pressurized fluid passing through said axial piston bores into said slot to pressurize said slots and exert torque on said swashplate in the direction of said output shaft rotation.

3. A hydraulic machine as defined in claim 2, further comprising:

a port plate having ports communicating between said pistons and said slots, said port plate lying between said pistons and said swashplate and rotating with said pistons relative to said swashplate to seal said slots against fluid loss, said piston holding said port plate tightly against said swashplate to produce the necessary interface pressure between said port plate and said swashplate to prevent fluid leakage out of said slots.

4. A hydraulic machine as defined in claim 2, further comprising:

a second set of pistons in cylinders facing said swashplate on the other axial side thereof from said first set of pistons, each of said pistons in said second set having an axial bore therethrough;

said second set of cylinders communicating with said slots through said axial bore in said piston in that cylinder;

said second set of pistons exerting an axial force on said swashplate, approximately balancing the axial force exerted by said first set of pistons on said one side of said swashplate.

5. A hydraulic machine as defined in claim 4, further comprising:

two port plates, one on each side of said swashplate between said pistons and said swashplate;

said port plates having ports therethrough communicating between said pistons and said slots and sealing against leakage of fluid under pressure from said piston axial bores and said slots;

said pistons exerting opposed axial forces on said port plates to hold said port plates tightly against said swashplate to produce the interface pressure between said port plates and said swashplate necessary to prevent significant leakage of fluid out of said slots and said pistons.

6. A hydraulic machine as defined in claim 5, wherein:

said first set of pistons and cylinders comprise part of a fluid pump connected to and driven by an input shaft;

said pump being driven by an input shaft having means for connection to a prime mover for applying input torque to said input shaft;

said input torque from said input shaft being applied to said pump to cause said pistons to pump fluid into and through said slots into said motor cylinders;

said pump pistons revolving against said swashplate producing a reaction torque on said swashplate in the direction of rotation of said input shaft which constitutes a mechanical component of torque on said swashplate;

said motor pistons exerting an axial force on said swashplate in opposition to the axial force exerted by said pump pistons, said motor piston force being resolved into a balancing axial force in opposition to said pump pistons and a circumferential force which constitutes a hydromechanical component of torque contributed by said motor;

whereby said fluid component of torque contributed by said fluid pressure acting on the differential area of said slots in said swashplate, said mechanical component of torque contributed by said reaction torque of said pump, and said hydromechanical component of torque contributed by said motor are all summed in said swashplate and applied to said output shaft as output torque.

7. A method of converting fluid pressure into mechanical energy, comprising:

injecting fluid under pressure into a series of slots in one diametrical side of a wedge shaped swashplate, said slots having one circumferential surface greater in area than the opposite circumferential surface because of the wedge shape of said swashplate;

sealing said slots against fluid leakage therefrom;

exerting pressure of said fluid against said circumferential surfaces and producing a net torque on said swashplate in the direction of said greater surface area of said slots; and outputting said torque through an output shaft connected to said swashplate.

8. A method as defined in claim 7, wherein said injecting step includes:

revolving a plurality of pump pistons around one axial side of said swashplate about an axis of rotation which lies at an acute angle to the plane of said one axial side of said swashplate to push said pistons into cylinders and pressurize fluid in said cylinders; and conveying said pressurized fluid from said cylinders into said slots.

9. A method as defined in claim 8, wherein said injecting step further includes:

conveying said pressurized fluid from said cylinders through axial bores in said pistons directly into said slots.

10. A method as defined in claim 9, wherein:

said sealing step includes pressing said pistons against a port plate over said slots to hold said port plate against said one axial side of said swashplate to minimize fluid leakage out of said slots between said port plate and said one axial side of said swashplate; and said conveying step further includes conveying said pressurized fluid through holes in said port plate that are aligned with said pistons.

11. A method as defined in claim 7, further comprising:

filling said pump cylinders from said scavenge pump during a suction phase of said pump; and blocking fluid communication between said scavenge pump and said pump cylinders during a pressure phase of said pump cycle.

12. A method as defined in claim 11, wherein:

said filling step is accomplished by rotating a fluid distributor between said pump and said scavenge pump to establish fluid communication through fluid channels in said distributor between openings in said pump cylinder block to said pump cylinders and said scavenge pump.

13. A hydraulic machine, comprising:

an input shaft journaled in a housing and adapted to receive input torque from a prime mover;

a pump unit coupled to said input shaft and having a plurality of axial pistons in a plurality of pump cylinders;

a motor unit grounded to said housing and having a plurality of axial pistons in a plurality of motor cylinders;

an output shaft journaled in said housing and having means for outputting torque to a load;

a single swashplate disposed between said units and having an input face facing said pump and an output face facing said motor, said input face and said output face being at an acute angle to each other;

means for coupling said swashplate to said output shaft to provide for torque transfer therebetween;

means defining a plurality of circumferentially spaced slots extending axially through said swashplate for fluid communication therethrough and into said cylinders of said units;

control means for adjusting the angle of said swashplate relative to the axis of said output shaft for controlling the transmission ratio between said input shaft and said output shaft;

whereby input torque on said input shaft at some intermediate angle of said swashplate drives said pump unit around said input face to pump hydraulic fluid through said swashplate slots to said motor unit cylinders, thereby causing said motor pistons to exert an axial force against said output face of said swashplate and exert a hydromechanical component of torque on said swashplate, and the reaction torque of said pump is exerted on said swashplate as a mechanical component of torque transmitted to said output shaft in the same direction as said hydromechanical component.

14. A hydraulic machine as defined in claim 13, wherein:

said means defining circumferentially spaced slots includes circumferentially facing slot sides which are greater in area on one circumferential side of said slots than on the other;

whereby fluid under pressure from said pump exerts a fluid pressure against said circumferentially facing sides of said slots and generates a hydraulic component of torque on said swashplate in the same direction as said hydromechanical component and said mechanical component.

15. A hydraulic machine as defined in claim 14, further comprising:

means for confining fluid flow into and out of said slots to said pump and motor cylinders and for sealing said slots against leakage of fluid under pressure out of said slots.

16. A hydraulic machine as defined in claim 13, further comprising:

a scavenge pump coupled to said input shaft for pressurizing fluid in said machine to scavenge pressure; and means for fluid communication between said pump cylinders and said scavenge pump during a suction phase of said pump during which said pump pistons are moving outward in said pump cylinders, and said pump cylinders are filling with fluid.

17. A hydraulic machine as defined in claim 16, further comprising:

means for blocking fluid communication through said fluid communication means between said scavenge pump and said pump cylinders during a pressure phase of said pump cycle during which said pump pistons are moving into said cylinders to pressurize fluid contained therein.

18. A hydraulic machine as defined in claim 17, wherein said fluid communication means and said blocking means includes a rotating fluid distributor positioned between said pump cylinder block and said scavenge pump, said distributor having fluid channels there-through which communicate with openings into said pump cylinders during said suction phase of said pump cycle, but which are sealed from said openings during said pressure phase of said pump cycle.

19. A hydraulic machine as defined in claim 13, wherein said control means includes:

a control member, movable to vary the transmission ratio between said input and output torque to and from said input and output shafts;

a control valve movable by said control member;

a follower valve in a follower valve cylinder;

means for coupling a source of fluid pressure to said follower valve cylinder through said control valve;

said follower valve being movable under fluid pressure to a position set by said control member;

a swashplate control sleeve coupled to said follower valve and operatively bearing against said swashplate to control the angle of said swashplate relative to said output shaft axis.

20. A hydraulic machine as defined in claim 19, wherein:

said source of fluid pressure includes a fluid accumulator in communication with said coupling means, and a one way valve for charging said accumulator from a scavenge pump, and for holding said pressure against loss of pressure back through said scavenge pump.

21. A continuously variable transmission, comprising:
a housing having an input end and an output end;
an input shaft extending through said input end and mounted in said housing for rotation therein about a longitudinal axis;
a pump in said housing coupled to said input shaft and rotatable therewith, said pump having a pump piston carrier connected to said input shaft, and a plurality of pump pistons mounted on said pump piston carrier by swiveling pump piston mounts;
said pump including a pump cylinder block having a plurality of pump cylinders disposed in an annular array and opening in one axial face of said pump cylinder block, said pump cylinder block having a flat surface on an axial face opposite said one axial face;
a plurality of ports opening in said flat surface of said pump cylinder block, each of said ports communicating through said flat surface to a respective one of each of said pump cylinders, said ports lying on a circular centerline at a certain radius from said longitudinal axis when said flat surface is normal to said longitudinal axis;
a wedge-shaped swashplate having an outside peripheral edge which is thicker on one diametrical side than on the opposite thinner diametrical side, said swashplate having two flat faces on opposite axial sides of said swashplate, said flat faces lying at an acute angle to each other, one of said flat faces lying flat against said flat surface of said pump cylinder block;
said swashplate having a plurality of kidney-shaped slots extending axially therethrough, said slots opening in said two swashplate flat faces on a circular centerline around said swashplate at a radius from said longitudinal axis about equal to said certain radius such that said ports communicate with said slots when said ports and said slots overlap;
said swashplate slots each defined by inside slot walls, including two circumferentially facing end walls, one of which is closer to said thick side of said swashplate and has a greater circumferentially facing area than the other end of said slot, which other end of said slot is closer to said thin side of said swashplate, said slots thereby having a differential in the circumferentially facing end areas against which fluid pressure in said slots can act;
a motor having a motor piston carrier grounded on said, housing, and a plurality of motor pistons mounted on said piston carrier by swiveling motor piston mounts;
a motor cylinder block having a plurality of motor cylinders arranged in an annular array, said motor cylinder block having a flat surface in face contact with the other flat face of said swashplate, on the axial side thereof opposite said one face;
a plurality of ports opening in said flat surface of said motor cylinder block and communicating therethrough with said motor cylinders, said motor cylinder block ports lying on a circular centerline around said motor cylinder block at a radius from said longitudinal axis about equal to said certain radius when said flat face of said motor cylinder block is normal to said longitudinal axis such that said motor cylinder ports communicate with said swashplate slots when said motor cylinder ports overlap said swashplate slots;
whereby rotation of said input shaft rotates said pump piston carrier and drives said pump pistons around said swashplate, thereby exerting a first torque on said swashplate in the direction of rotation of said input shaft and causing said pump pistons to reciprocate in said pump cylinders and pressurize fluid in said pump cylinders, said fluid flowing through said pump cylinder block ports and into said swashplate slots, thereby pressurizing fluid in said slots and, by virtue of the differential area of said slot end walls, exerting a second torque on said swashplate in the direction of rotation of said input shaft, said fluid flowing through said swashplate slots and into said motor cylinders through said motor cylinder block ports to pressurize said motor cylinders and force said motor cylinder block against said swashplate which, by virtue of the angled face of said swashplate, exerts a third torque on said swashplate in the direction of rotation of said input shaft.

22. A continuously variable transmission as defined in claim 21, further comprising:
an output shaft coupled to said swashplate, whereby rotation of said swashplate drives said output shaft.

23. A continuously variable transmission as defined in claim 22, wherein:
said pump and motor piston carriers each include a plurality of piston mounting posts to which said swiveling piston mounts are attached.

24. A continuously variable transmission as defined in claim 23, wherein said swiveling pump piston mounts each include:
a spherical bushing on which said piston is swivelingly mounted, whereby said pump piston is free to swivel on said spherical bushing to remain coaxial with said cylinder in which said pump piston is disposed while said pump cylinder block precesses about said longitudinal axis; and
an elastomeric sleeve between said spherical bushing and said mounting post for accommodating a radial component of the elliptical motion of said pump pistons in said pump cylinders as said pump cylinder block precesses about said longitudinal axis.

25. A continuously variable transmission as defined in claim 24, wherein:
said elastomeric sleeve is bonded between a metal sleeve, having an internal diameter about equal to the external diameter of said mounting posts, and an axial bore through said spherical bushing, whereby said spherical bushing, said elastomeric sleeve, and said metal sleeve may be slid as a unit onto said mounting post for ease of assembly and replacement.

26. A continuously variable transmission as defined in claim 25, further comprising:
a removable fastener connected to said mounting post for holding said spherical bearing/elastomeric sleeve/metal sleeve unit on said mounting post.

27. A continuously variable transmission as defined in claim 22, wherein:
said output shaft is coupled to said swashplate through a pair of drive pins projecting radially from said outside peripheral edge of said swashplate into laterally extending openings in an output sleeve which is coupled to said output shaft.

28. A continuously variable transmission as defined in claim 27, wherein:

said drive pins each include a bearing bushing of low friction material mounted in said laterally extending openings in said output sleeve, and a spool pin concentrically disposed within said bearing bushing and secured to said swashplate, whereby rotation of said swashplate drives said output sleeve through said spool pin and said bearing bushing while permitting said swashplate to tilt about an axis through said drive pins for control of the input/output speed/torque ratio of said transmission.

29. A continuously variable transmission as defined in claim 27, further comprising:

a stud projecting from said outside peripheral edge off said swashplate at a position therearound normal to the axis through said drive pins, said stud projecting into a slot in said output sleeve to limit the angular tilt of said swashplate to the extent of the dimensions of said slot in said output sleeve.

30. A continuously variable transmission as defined in claim 22, further comprising a control system for controlling the input/output speed/torque ratio of said continuously variable transmission by controlling the angle of said swashplate relative to said longitudinal axis, said control system including:

a control sleeve coupled at one end thereof to an outer peripheral edge of said swashplate by a coupling mechanism, and coupled at the opposite end of said control sleeve to a control cylinder;

said control cylinder having two cylindrical surfaces radially offset from each other and a radially extending surface therebetween, said two cylindrical surfaces being slidably sealed to facing cylindrical surfaces fixed relative to said housing, said control cylinder surfaces and said facing surfaces enclosing therebetween a chamber, one surface of which is said radially extending surface of said control cylinder against which fluid pressure can bear when said chamber is pressurized.

31. A continuously variable transmission as defined in claim 30, further comprising:

a valve having a valve element controlling flow of pressurized fluid to said chamber and coupled to said control sleeve by a control linkage;

a control rod attached to said control linkage whereby movement of said control rod moves said valve element to pressurize said chamber, causing movement of said control cylinder, said control linkage feeding back said movement of said control cylinder to said valve element to shut off flow of said pressurized fluid at a position of said control cylinder which is unique to the position of said control rod.

32. A continuously variable transmission as defined in claim 30, further comprising:

an arcuate mass attached to said control sleeve at a position thereon diametrically opposite said thick side of said swashplate, said control sleeve and said swashplate being coupled to rotate and move axially together to comprise a swashplate/control sleeve rotating system;

said arcuate mass having a weight selected to dynamically balance the unbalanced mass of said swashplate, said arcuate mass moving axially with said control sleeve to maintain the axial position of its center of mass diametrically opposite the center of mass of said swashplate to maintain dynamic balance of said swashplate/control sleeve rotating system at all tilt angles of said swashplate.

33. A continuously variable transmission as defined in claim 30, wherein said control cylinder includes a cylindrical portion and an annular, radially projecting intermediate ridge having a radially facing top surface, said cylindrical portion having one of said two offset cylindrical surfaces, and said radially facing top surface of said ridge comprising the other of said offset cylindrical surfaces.

34. A continuously variable transmission as defined in claim 33, further comprising:

a cylindrical recess in a structure fixed with respect to said housing, said cylindrical recess having at least one radially extending axially facing surface and a radially facing recessed cylindrical surface offset from a fixed cylindrical surface, into which said recess is set, a portion of said fixed cylindrical surface comprising one of said two facing cylindrical surfaces;

said control cylinder being coaxially juxtaposed around said fixed cylindrical surface with said ridge projecting into said recess and said radially facing top surface of said ridge in contact with said radially facing recessed cylindrical surface and said one of said two offset cylindrical surfaces slidably sealed to said fixed cylindrical surface of said structure;

whereby said control cylinder can be moved by pressurizing said chamber, which pressure is contained by said seal between said radially facing top surface of said ridge and said radially facing recessed cylindrical surface in said recess, and by said seal between said one of said two offset cylindrical surfaces and said fixed cylindrical surface of said structure.

35. A continuously variable transmission as defined in claim 22, further comprising a control system for controlling the input/output speed/torque ratio of said continuously variable transmission by controlling the angle of said swashplate relative to said longitudinal angle, said control system including:

a control sleeve coupled at one end thereof to an outer peripheral edge of said swashplate by a coupling mechanism, and coupled at the opposite end of said control sleeve to a control cylinder axially movable under control by a hydraulic position control system;

said coupling mechanism including a spherical knob projecting from said outside peripheral edge of said swashplate and engaged with a socket having a spherical opening therein for receiving said knob;

said socket having means for accommodating a radial component of movement of said knob as said swashplate angle is changed.

36. A continuously variable transmission as defined in claim 30, further comprising:

a bearing between said control cylinder and said control sleeve for coupling said control cylinder and said control sleeve for axial movement while permitting said control sleeve to spin about said longitudinal axis with said swashplate relative to said control cylinder.

37. A continuously variable transmission as defined in claim 21, further comprising:

a first resilient element compressed between said pump cylinder block and said pump piston carrier for urging said pump cylinder block against said swashplate, and a second resilient element compressed between said motor cylinder block and said motor piston carrier for urging said motor cylinder block against said swashplate.

38. A continuously variable transmission as defined in claim 21, further comprising:
a first spherical bearing mounted on said input shaft and engaged with a spherical bearing race on said pump cylinder block for guiding said pump cylinder block in a precessing motion about a center of rotation coinciding with the spherical center of said first spherical bearing.

39. A continuously variable transmission as defined in claim 38, further comprising:
a second spherical bearing mounted on said motor piston carrier and engaged with a spherical bearing race on said motor cylinder block for guiding said motor cylinder block in a nutating motion about a center of rotation coinciding with the spherical center of said second spherical bearing.

40. A continuously variable transmission as defined in claim 38, further comprising:
a plurality of spherical bushings mounted on said pump piston carrier, each of said spherical bushings having a piston swivelingly mounted thereon;
said spherical bushings each having a spherical center lying on a circular centerline, the center of which circular centerline coincides with said spherical center of said first spherical bearing.

41. A continuously variable transmission as defined in claim 21, further comprising:
a plurality of spherical bushings mounted on said pump piston carrier for swivelingly mounting said pump pistons;
said pump pistons each have an annular wall concentric with a longitudinal piston axis and with a front axial end and a rear axial end, said annular wall having an outside cylindrical surface and an inside spherical surface defining a spherical cavity with an internal diameter about equal to the external diameter of said spherical bushings;
said spherical cavity having a cylindrical relief in said annular wall on diametrically opposite sides of said spherical cavity beginning at the widest portion thereof and extending all the way to said rear axial end of said piston, said cylindrical relief having a lateral width slightly greater than the axial length of said spherical bushing;
whereby each of said spherical bushings may be assembled to a respective one of said pistons by orienting said spherical bushing with the longitudinal axis thereof normal to said piston axis and perpendicular to said cylindrical relief in which position said spherical bushing may be moved axially straight into said spherical cavity until said bushing contacts said inside spherical surface of said spherical cavity, and then rotating said spherical bushing 90° to orient said bushing axis coincident with said piston axis.

42. A continuously variable transmission as defined in claim 21, further comprising:
a charge pump coupled to and driven by said input shaft, said charge pump having an intake connected to a fluid reservoir and a pressure output coupled by way of a fluid passage through an accumulator charging valve to a control valve of a follower valve swashplate angle control system for controlling the angle of said swashplate;
an accumulator communicating with said fluid passage between said control valve and said accumulator charging valve;
said accumulator charging valve having one position, permitting flow therethrough at a high pressure when the fluid pressure in said accumulator drops below a predetermined high value, while preventing fluid flow to a second fluid passage connected to said accumulator;
said second fluid passage having a pressure relief valve communicating therewith for permitting flow of fluid from said second fluid passage to said fluid reservoir to maintain the fluid pressure in said second fluid passage at a preselected lower value, lower than said predetermined high value, for purposes of supplying make-up fluid to said cylinders and lubricating fluid to relatively moving parts;
said second fluid passage communicating through a one-way valve with said motor cylinders to provide make-up fluid to said motor cylinder and said pump cylinder during a suction phase of the operation of said transmission.

43. A continuously variable transmission as defined in claim 21, further comprising:
a thrust ring mounted on and axially fixed to said input shaft between said input end of said housing and said motor piston carrier;
a thrust bearing disposed between said thrust ring and said motor piston carrier and bearing axial thrust exerted by said thrust ring through said thrust bearing on an end of said motor piston carrier opposite to the end on which said motor pistons are mounted;
whereby the axial force exerted by fluid pressurized by said pump and exerted on said pump and motor piston carriers tending to push said pump piston carrier toward said output end of said housing is reacted through said connection between said input shaft and said pump piston carrier to said input shaft and thence to said thrust ring and through said thrust bearing to said motor piston carrier, balancing out an axial force of about equal magnitude exerted by said fluid pressure in the opposite direction on said motor piston carrier.

* * * * *